United States Patent
Griffiths et al.

(10) Patent No.: US 8,539,336 B2
(45) Date of Patent: *Sep. 17, 2013

(54) SYSTEM FOR LINKING TO DOCUMENTS WITH ASSOCIATED ANNOTATIONS

(75) Inventors: Peter Griffiths, Los Angeles, CA (US); Andrew Rutter, Malton (GB)

(73) Assignee: Scrawl, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,512

(22) Filed: Oct. 4, 2011

(65) Prior Publication Data

US 2013/0031449 A1    Jan. 31, 2013

Related U.S. Application Data

(63) Continuation of application No. 13/193,402, filed on Jul. 28, 2011.

(51) Int. Cl.
*G06F 3/00* (2006.01)
(52) U.S. Cl.
USPC ............................ 715/230; 715/200; 715/233
(58) Field of Classification Search
USPC .......................... 715/230, 231, 232, 233, 200
See application file for complete search history.

(56) References Cited

U.S. PATENT DOCUMENTS

| | | | |
|---|---|---|---|
| 6,081,820 A | 6/2000 | Holowko |
| 6,081,829 A | 6/2000 | Sidana |
| 6,697,838 B1 | 2/2004 | Jakobson |
| 6,973,616 B1 | 12/2005 | Cottrille |
| 7,308,643 B1 | 12/2007 | Zhu |
| 7,536,713 B1 | 5/2009 | Bartholomew |
| 7,559,017 B2 | 7/2009 | Datar |
| 7,865,815 B2 | 1/2011 | Albornoz |
| 7,913,162 B2 | 3/2011 | Hansen |
| 8,276,060 B2 | 9/2012 | Hong |
| 8,443,280 B2 | 5/2013 | Noyes |
| 2004/0078757 A1 | 4/2004 | Golovchinsky |
| 2005/0210393 A1 | 9/2005 | Maeng |
| 2006/0143560 A1 | 6/2006 | Gupta |
| 2007/0283241 A1 | 12/2007 | Baldonado |
| 2008/0133584 A1 | 6/2008 | Nishino |
| 2008/0134083 A1 | 6/2008 | Farouki |

(Continued)

OTHER PUBLICATIONS

"Awesome Highlighter," Dec. 2, 2010, available from: http://swiss-miss.com/2010/12/awesome-highlighter.html and http://awurl.com/SNGMcpUwT, pp. 1-24.*

(Continued)

*Primary Examiner* — Kyle Stork
(74) *Attorney, Agent, or Firm* — Robert Plotkin, P.C.

(57) ABSTRACT

An annotation system includes first annotation data for annotating a manifestation of a first instance of a first XML document. The first instance of the first XML document is served by a document system. The first annotation data includes a first XML document identifier for the first XML document. The first annotation data is uniquely identified by a first annotation data identifier. The document system is configured to respond to a request containing the first XML document identifier with a manifestation of a second instance of the first XML document. The annotation system: (A) receives a request containing the first annotation data identifier; (B) issues a request containing the first XML document identifier to the document system; and (C) in response to the request containing the first annotation data identifier, manifests the first annotation data in connection with a manifestation of a second instance of the XML document.

20 Claims, 18 Drawing Sheets

(56) References Cited

U.S. PATENT DOCUMENTS

| | | | |
|---|---|---|---|
| 2008/0201651 | A1 | 8/2008 | Hong |
| 2009/0199082 | A1 | 8/2009 | Hollander |
| 2009/0319885 | A1* | 12/2009 | Amento et al. ............... 715/230 |
| 2009/0327855 | A1* | 12/2009 | Le ................................. 715/230 |
| 2010/0070845 | A1* | 3/2010 | Facemire et al. ............. 715/230 |
| 2010/0153835 | A1* | 6/2010 | Xiong et al. .................. 715/230 |
| 2010/0278453 | A1 | 11/2010 | King |
| 2010/0306242 | A1* | 12/2010 | Chow ............................ 707/769 |
| 2010/0318893 | A1* | 12/2010 | Matthews et al. ............. 715/230 |
| 2011/0022942 | A1* | 1/2011 | Flemings et al. ............. 715/230 |
| 2011/0083068 | A1* | 4/2011 | Chan et al. .................... 715/230 |
| 2011/0113320 | A1* | 5/2011 | Neff et al. ..................... 715/230 |
| 2011/0154178 | A1* | 6/2011 | Cragun et al. ................. 715/230 |
| 2011/0239102 | A1* | 9/2011 | Tanaka et al. ................. 715/230 |
| 2011/0246502 | A1* | 10/2011 | Aguera y Arcas et al. ... 707/769 |
| 2012/0011428 | A1* | 1/2012 | Chisholm ...................... 715/230 |
| 2012/0066576 | A1 | 3/2012 | Zhu |
| 2012/0084634 | A1* | 4/2012 | Wong et al. ................... 715/233 |
| 2012/0089629 | A1 | 4/2012 | Koll |
| 2012/0330963 | A1 | 12/2012 | Bartholomew |

OTHER PUBLICATIONS

Byrne, Richard, "Free Technology for Teachers," Feb. 24, 2010, available from: http://www.freetech4teachers.com/2010/02/awesome-highlighter-is-awesome.html, pp. 1-6.*

"TechMalaya.com—tech updates, tech tips, free software, blogging, photo editing," "Use Awesome Highlighter for Quick Note Taking," Mar. 22, 2008, available from: http://www.techmalaya.com/2008/03/22/awesome-highlighter-review/, pp. 1-5.*

"Web annotation," Wikipedia, accessible at http://en.wikipedia.org/wiki/Web_annotation, visited on Jan. 20, 2012.

"Social bookmarking," Wikipedia, accessible at http://en.wikipedia.org/wiki/Social_bookmarking, visited on Jan. 20, 2012.

M. Roscheisen, C. Mogensen, T. Winograd, "Beyond Browsing: Shared Comments, SOAPs, Trails and On-line Communities". Proceedings of the 3rd International World Wide Web Conference, Darmstadt, Germany, Apr. 10-14, 1995, available online at http://diglib.stanford.edu:8091/diglib/pub/reports/brio_www95.html.

Wayne C. Gramlich, "Public Annotation Systems," Sep. 15, 1995, available online at http://gramlich.net/projects/public_annotations/index.html.

Xin Fu, Tom Ciszek, Gary Marchionini, Paul Solomon, "Annotating the Web: An Exploratory Study of Web Users' Needs for Personal Annotation Tools," 2006, Proceedings of the American Society for Information Science and Technology, vol. 42, Issue 1.

"XML Linking Language (XLINK) Version 1.0," Jun. 27, 2001, World Wide Web Consortium (W3C), available online at http://www.w3.org/TR/xlink/.

Tony Hammond, Timo Hannay, Ben Lund, and Joanna Scott, "Social Bookmarking Tools (I) A General Review," Apr. 2005, D-Lib Magazine, vol. 11, No. 4, Nature Publishing Group, available online at http://www.dlib.org/dlib/april05/hammond/04hammond.html.

Charnita Fance, "Top Web Annotation and Markup Tools," Hongkiat.com, date unknown, available online at http://www.hongkiat.com/blog/top-web-annotation-and-markup-tools/, visited on Jan. 20, 2012.

"Annotate, Archive, Organize," Diigo.com, 2011, available online at http://www.diigo.com/learn_more, visited on Jan. 20, 2012.

"Shiftspace User Manual," Shiftspace.org, date unknown, available online at http://www.shiftspace.org/about/user-manual/, visited on Jan. 20, 2012.

Martin Roscheisen et al., "Shared Web Annotations as a Platform for Third-Party Value-Added, Information Providers: Architecture, Protocols, and Usage Examples," Stanford University, 1994.

* cited by examiner

SYSTEM FOR LINKING TO DOCUMENTS WITH ASSOCIATED ANNOTATIONS

CROSS REFERENCE TO RELATED APPLICATIONS

This application is a continuation of co-pending and commonly-owned U.S. patent application Ser. No. 13/193,402, filed on Jul. 28, 2011, entitled, "System for Linking to Documents with Associated Annotations," which is hereby incorporated by reference herein. This application is related to the following commonly owned and co-pending patent applications, identified below by their titles and attorney docket numbers:

"System for Annotating Documents Served by a Document System without Functional Dependence on the Document System," Ser. No. 13/193,378;

"System for Creating and Editing Temporal Annotations of Documents," Ser. No. 13/193,385; and "System for Programmatically Accessing Document Annotations," Ser. No. 13/393,394.

BACKGROUND

Massive computer networks, ready access to such communications by consumers and businesses alike, and the prevalence of personal computing devices have made access to multimedia documents widespread. Computers supporting graphical user interfaces and audio have made web pages incorporating multi-media content a common form of document and web pages represent a common interface for computer programs. Gigantic numbers of online multimedia documents constitute a massive amount of content accessible to hundreds of millions of users. Currently however, as is well understood by those skilled in the art, whilst the user may view such online documents, and thereby passively consume such content, the user's ability to actively engage with such content is extremely limited. There has been a trend for site publishers to encourage user engagement by such means as blogs, forums and bulletin boards and such means have indeed resulting in a massive explosion of user generated content but such attempts to go beyond the passive consumption of packaged content do not represent a powerful general model for interaction with content because the user's ability to comment on content in such cases is limited, typically constrained to features provided by the web site implementation and authorised by the website publisher. Such limitations dictate which content can be commented on at what time and in what way. The general definition of 'annotation' is extra information associated with a particular point in a document and hence we note that such limited user interaction with online content constitutes a weak form of annotation—the forms of extra information are limited, the points that may be annotated are limited, and the documents that may be annotated are limited.

SUMMARY

In one embodiment, an annotation system includes first annotation data for annotating a manifestation of a first instance of a first XML document. The first instance of the first XML document is served by a document system. The first annotation data includes a first XML document identifier for the first XML document. The first annotation data is uniquely identified by a first annotation data identifier. The document system is configured to respond to a request containing the first XML document identifier with a manifestation of a second instance of the first XML document. A method for use with the annotation system includes: (A) receiving a request containing the first annotation data identifier; (B) issuing a request to the document system, wherein the request contains the first XML document identifier; and (C) in response to the request containing the first annotation data identifier, manifesting the first annotation data in connection with a manifestation of a second instance of the XML document.

The first data may include first annotation data representing a first association between: (a) a first manifestation of first annotation content in connection with a manifestation of the first instance of the first XML document and (b) a manifestation of a first instance of a first target in the manifestation of the first instance of a first XML document. The first UALI may include a first Unique Annotation Identifier (UAI) that uniquely identifies the first annotation data. Operation (A) may include receiving a request containing the first UAI, and operation (C) may include, in response to the request containing the first UAI, manifesting the first annotation data in connection with a manifestation of a second instance of the first XML document. The first annotation data may include first annotation content data representing the first annotation content, first target locating data for locating the second instance of the first target, and first association data representing the first association.

The first data may include first annotation set data representing a first annotation set. The first UALI may include a first Unique Set Identifier (USI) that uniquely identifies the first annotation set. Operation (A) may include receiving a request containing the first USI, and operation (C) may include, in response to the request containing the first USI, manifesting the first annotation set data in connection with a manifestation of a second instance of the first XML document. The first annotation set may further contain second annotation data for annotating the first instance of the first XML document; and operation (C) may further include, in response to the request containing the first USI, manifesting the second annotation data in connection with the manifestation of the second instance of the first XML document. The annotation set data may further include second annotation data for annotating the first instance of the first XML document; and operation (A) may further include, in response to activation of the hyperlink, manifesting the second annotation data in connection with the manifestation of the second instance of the first XML document.

Operation (A) may include: (A)(1) at a client device: (A)(1)(a) receiving input containing the first UALI; (A)(1)(b) retrieving the first data from storage; (A)(1)(c) requesting the second instance of the first XML document from the document server; and (A)(1)(d) manifesting the first data in connection with the manifestation of the second instance of the first XML document. Alternatively, operation (A) may include: (A)(1) at a client device: (A)(1)(a) receiving input containing the first UALI; (A)(1)(b) transmitting a request containing the first UALI to an annotation server; (A)(2) at the annotation server (A)(2)(a) requesting the second instance of the first XML document from the document server; (A)(2)(b) creating a composite of the first data and the second instance of the first XML document; (A)(2)(c) transmitting the composite to the client device; and (A)(3) at the client device: (A)(3)(a) manifesting the composite. Alternatively, operation (A) may include: (A)(1) at a client device: (A)(1)(a) receiving input containing the first UALI; (A)(1)(b) transmitting a request containing the first UALI to an annotation server; (A)(1)(c) requesting the second instance of the first XML document from the document server; (A)(1)(d) transmitting the first data and the second instance of the first XML document to the annotation server; (A)(2) at the annotation server: (A)(2)(a) creating a composite of the first data and the first XML document; (A)(2)(b) transmitting the composite to the client device; and (A)(3) at the client device: (A)(3)(a) manifesting the composite.

The first annotation data may represent a first association between: (a) a first manifestation of first annotation content in connection with a manifestation of the first instance of the first XML document and (b) a manifestation of a first instance of a first target in the manifestation of the first instance of a first XML document. The first annotation content may include first manifestation data, and the first manifestation of the first annotation content may be a manifestation of the first manifestation data.

The first manifestation data may be or include at least one of text, an image, audio, video, a form element, a hyperlink, JavaScript, and an embedded object. The first annotation content may further include first manifestation control data include a specification of how the program manifests the annotation content. The first manifestation control data may include one or more of first manifestation timing data to specify the temporal behavior of the manifestation of the first annotation content; first manifestation realization data to specify manifestation behavior of the first annotation content; and first manifestation external interface specification data to specify conditions for access to the annotation data and annotation behavior in response to external events.

The first instance of the first target may be or include one or more of the following: text, an image, audio, video, a form element, a hyperlink, JavaScript, an embedded object, a document, a document object, a region in a document object, a point in a document object, a collection of related document objects, and a region which spans a collection of related document objects. The first instance of the first XML document may be a web page. The first instance of the first target may be the web page. The first instance of the first target may be or include one or more of the following: a page object, a region in a page object, a point in a page object, a collection of related page objects, and a region which spans a collection of related page objects.

The first annotation data may represent a first association between: (a) a first manifestation of first annotation content in connection with a manifestation of the first instance of the first XML document and (b) a manifestation of a first instance of a first target in the manifestation of the first instance of a first XML document, wherein the first association comprises a spatial association between the first manifestation of the first annotation content and the manifestation of the first instance of the first target. The first association may be a temporal association and/or a spatial association between the first manifestation of the first annotation content and the manifestation of the first instance of the first target.

The first annotation data may be stored: in a distinct file from the first instance of the first XML document; on an annotation server that is distinct from the document server; by the annotation system without modifying the document server; by the annotation system without modifying any software on the document server; by the annotation system without modifying any content on the document server.

Other features and advantages of various aspects and embodiments of the present invention will become apparent from the following description and from the claims.

DETAILED DESCRIPTION

Figure 1:
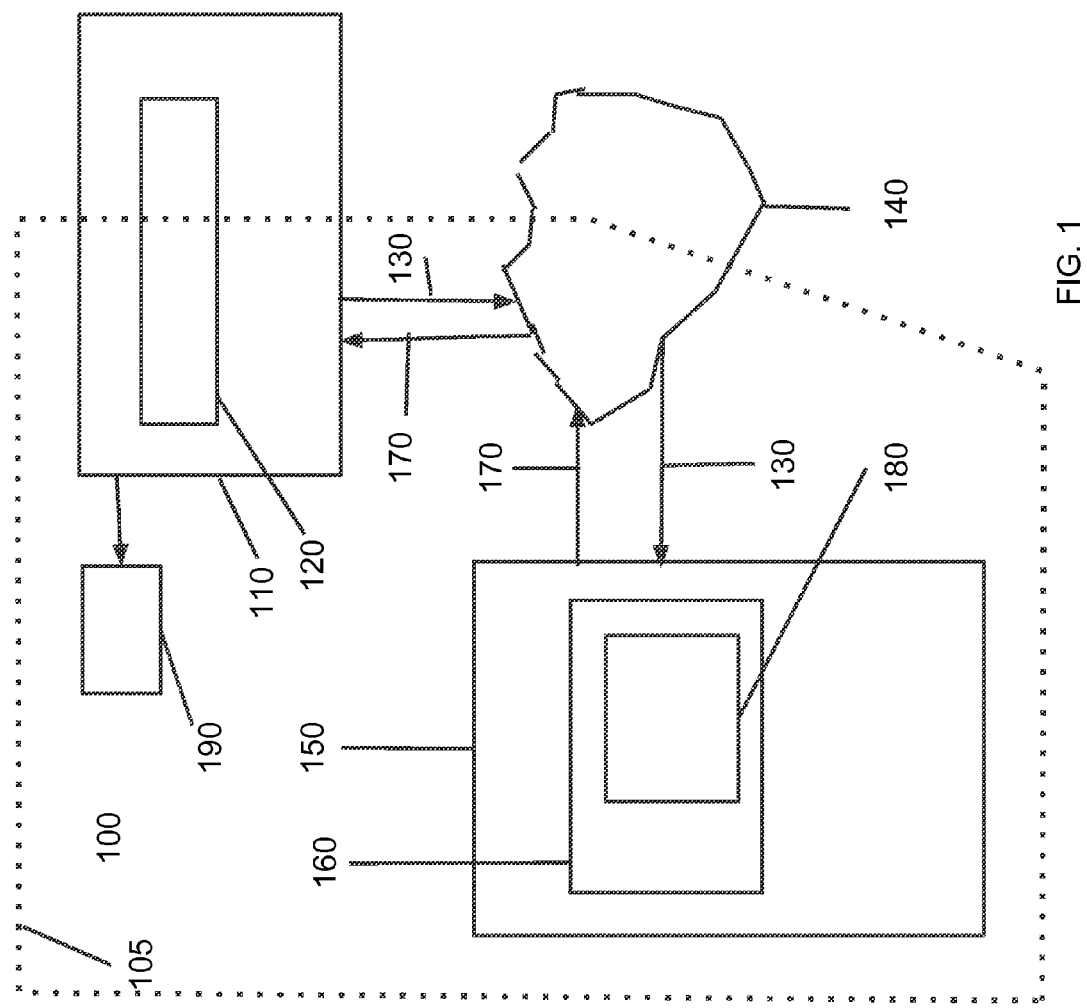
FIG. 1 is an exemplary high level block diagram of a system enabling the storage, retrieval, transmission, processing and display of documents according to one embodiment of the present invention.

A user should be able to annotate any web page content, of any media type, on any web page, on any website, at any time, with any number of annotations of any media type; to be able to save, retrieve and share such annotations, and to do all this without requiring the support, or even the permission, of the site publisher, without taking copies of the content, and without changing the content, the site itself (including any software being used to support the site) or the browser software used to view the content. As will be evident to those skilled in the art this is a much stronger model of annotation for web page content than currently exists.

The strong functional independence of the annotation system from the website and system that serves content to the website is an extremely important characteristic of certain embodiments of the invention; it means that such embodiments of the invention are able to provide valuable functionality to users without demanding changes to existing web infrastructure and may therefore readily made available. Furthermore, only with such independence may an annotation system enable users to interact with web page content without requiring the cooperation and permission of the site publisher.

In the case of embodiments of the present invention a document to be annotated may, for example, be a web page and the type of extra information which may be used to annotate web pages should be interpreted very broadly. Annotations may include not just text commentary on original page content, but much richer annotation such as multi-media augmentation of (or complete changes to) this content, linking the content to other web pages, and enabling additional interaction with content (e.g., by the introduction of new hyperlinks.).

Some systems exist that allow annotating web pages and saving annotations. For example, the most popular web page annotation modes supported by existing annotation systems have been (a) post-it style notes, (b) drawing, and (c) text highlighting. Post-it style notes enable the user to drop a notelet onto a web page, to edit that notelet and save and retrieve it. An example of such notelet technology may be found at www.mystickies.com. Drawing onto a web page is less common but may be found at www.drawhere.com. Perhaps the most common annotation mode is text highlighting which may be found, for example, at www.diigo.com or www.sharedcopy.com. Diigo further enables the association of notelets with highlighted text. The site www.shiftspace.com provides software to enable users to attach notes, highlight text, change photographs and edit underlying HTML.

There are also existing systems that recognise the utility of persistent annotations. Typically such annotations are saved to and restored from a server in a way obvious to one skilled in the art. An example would be U.S. Pat. No. 6,697,838 Method and System for Annotating Information Resources in connection with browsing, in both connected and disconnected States which enables someone browsing the web to create notes, link them to the displayed web page and automatically retrieve such notes on returning to the web page in question. Such persistence is also demonstrated in the implementations, for example, of www.shiftspace.org or www.mystickies.com. In such cases the annotation content is stored separately from the content being annotated and the annotation system is functionally independent of the web server system.

Despite such existing systems there remains a major issue which until now has had no general solution for such functionally independent annotation systems: the problem of semantic integrity. For annotation to have value its meaning must be preserved and in many cases this meaning lies not just in the content of the annotation, but in its relationship to the underlying content. In some cases that relationship is very general as when the annotation relates to the page as a whole. An example of this might be a sticky notelet with a text comment about the page. But in other cases the user may wish to annotate not the page in general but a specific element, or set of elements, on the page. An intuitively obvious example of this is text highlighting. The yellow highlighting annotation has meaning in relation not to the page but to a specific block of text. This is one instance of a much more general issue. We can envisage countless more styles of annotations a user might wish to make in which the relationship between the annotation content and the underlying page content is an integral part of the meaning. In such cases users will place annotation at a specific location for good reason. An arrow points to a specific word or image not to the page in general. A specific part of an image is circled. A user paints a picture of a tail onto the rear end of a dog. In such cases the meaning of the annotation is very sensitive to its location on the page. It is the challenge of ensuring that this relationship between annotation and content is preserved despite transformation of the page so that the true meaning of the annotation is preserved that is the problem of semantic integrity.

It might seem that the provision of semantic integrity is a trivial problem which may be readily solved by saving the annotation's position on the page. If a user were annotating a book this would work because book pages do not change. Web pages do change however and such changes can easily render annotations meaningless. For this reason the obvious solution does not work. Even in the early days of the World Wide Web, when most pages were static and their content did not change a great deal, problems of semantic integrity could easily arise. For example, if a user annotated a web page and that page was long enough to require scrolling to display page content, then the annotations become spatially misplaced. If the page employed fluid rather than fixed display so that when the browser display was resized the page layout changed, then the annotations become misplaced. Fluid display sites are not exceptional. An example of a popular such website is www.wikipedia.org. Furthermore, the same web page may be rendered differently by different platforms, and by different web browsers on the same platform, resulting in changing the rendered location of elements on the page. And of course, sometimes the publisher would change the page content.

With today's web, often referred to as Web 2.0, the problem is compounded because today's web is characterized by many technologies that result in pages changing continually. A large and growing percentage of today's web pages are implemented with a database driven design whereby updated content is pushed onto webpages, composed then rendered in real time. The web page retains its URL but its content changes regularly. Personalization may mean the page accessed by the same URL being displayed differently for different users. Pages may not only change from one instance of a user accessing the page to another but may even change whilst the same user is viewing the page. A high profile example is the newsfeed on www.facebook.com where a sub-section of the page, a nested viewport, scrolls continually. In this case any annotation that comments on an element of the newsfeed will quickly become meaningless as that item drops down the list of updates and then disappears from the screen. Another example is an annotated element of a scrollable region which is initially off-screen and then moved on-screen by page embedded action code; such an annotation will not be displayed as the element appears on the screen. Such dynamic behavior of web pages means that it is impossible to view today's web pages as static resources, their content must be assumed to be subject to continual change.

Furthermore, semantic integrity has temporal as well as spatial dimension. When an annotation appears can be just as important as where it appears. For example, if a user annotates a GIF image, but the annotation is only relevant for specific frames in the whole animation, then those are the frames (and the only frames) where the user would want the annotation to appear. The problem of temporal semantic integrity has become significant because web pages increasingly include not just static media types such as text and image but dynamic media types in which a timeline is important, for example audio and video. In any attempt to annotate a piece of such dynamic content the ability to address elements on a timeline and provide temporal semantic integrity is crucial. Furthermore, because as described above, an increasing percentage of pages are themselves dynamically updated by such means as in-page javascript, and because of timing delays caused for example by network lag, the state of such dynamic media types as audio and video can change in unpredictable ways that a naive treatment of the media timeline cannot reliably deal with.

The problem has become acute. Changes in page content and media with a temporal dimension are now so prevalent that without the ability to maintain semantic integrity the provision of web page annotation software is a license to create annotations that quickly appear broken or meaningless.

One approach to this problem is to restrict what users can do in the way of annotation. Prevent page layout problems due to resizing the browser window by enforcing a standard window size for annotation. Only allow annotation of pages with static design. Address content change by only allowing annotation styles less likely to quickly become meaningless, for example stickies which in some sense comment on the whole page rather than a page element. Don't allow annotation on media types with tricky timing issues. Analyse the structure of the underlying document and use this structure as a proxy for the on screen spatial relationships that the user cares about. Take a copy of the page to be annotated and annotate that copy. But such approaches are not foolproof and severely limit the ways in which users may annotate and copying raises potential copyright concerns. Hence such attempts fall far short of the ideal.

Due to this unresolved problem of semantic integrity today's annotation tools are weak. Annotations such as the notelets of www.mystickies.com that float above the whole page aren't specific enough for many applications. Users should be able to annotate specific page elements, and regions or points on such a page element, not just the page at large. Text highlighting is a step in the right direction but it is a small step indeed, as is associating notelets with such highlighted text blocks. Web page content is increasingly media rich and it is natural that user should wish to be able to annotate all page media types with content of any media type and be assured of spatial and temporal semantic integrity. The ideal is for users to have access to tools which can generate annotation content in any media and for those annotations to deliver semantic integrity where possible and graceful degradation if changes to the page are so radical that it is not possible; to be able to collaborate on such annotation creation both synchronously and asynchronously; and to be able to generate such content in a framework which can be extended to address unforeseen annotation requirements and media types.

Finally, existing systems do not comprehensively support annotations as programmable objects which may be accessed and modified not just by interaction with human users, but by other computer programs, through a well defined API. The provision of such an API is important because it enables programmers to develop applications that can create and modify multimedia annotations with semantic integrity.

As the description above makes clear, existing annotation systems have a variety of shortcomings. As the description below will make clear, various embodiments of the present invention overcoming these shortcomings and provide a variety of other advantages.

A prominent aspect of today's computing environment is networked computing. Client computing devices are connected over the Internet or an intranet to each other and to server computers. Such client devices include PCs running Microsoft Windows or Macs running MacOS, mobile phones running the Android operating system or the Apple iOS operating system, tablet computers such as Apple Computer's iPad running the iOS operating system, tablets running Android, or netbooks running Google's Chrome OS. Such server devices include computers running web server software such the Apache Foundation's Apache or Microsoft's Internet Information Server; database software such as Oracle's MySql or Microsoft's SQL Server; and application specific applications server software such a programs written in Ruby or Java.

In such an environment, computers issue requests for resources and servers respond to such requests and forward the requested resource. A common such resource is documents stored on servers and encoded in a scheme appropriate for consumption by a document client program. Commonly the client will translate such encoded documents into a format which may be rendered and then displayed.

One important instance of such network computing is the World Wide Web, commonly abbreviated to WWW or W3 and commonly known as "the web." In this case the document is a web page. Users use a web browser to view web pages which may well incorporate rich media and which typically include hyperlinks by means of which users may navigate between pages. The web is therefore a system of interlinked web pages.

Web pages are documents encoded in a markup language—a language with a syntax which adds structural information to a document by means of special character sequences, hereinafter the 'markup'. The markup languages typically used to structure documents (web pages) on the web are the HyperText Markup Language (hereinafter 'HTML') and the similar eXtended HyperText Markup Language (hereinafter 'XHTML'). XHTML is a stricter form of HTML with consistent rules about the format of markup and the nesting of document elements and both are derived from SGML (Standards General Markup Language) and the SGML derived XML (eXtensible Markup Language) which is widely used as a portable method for encoding document structure and encapsulating content. Web page structure (hereinafter 'structure') is specified by the markup which identifies the start and end of individual components of the document. These components form HTML/XHTML elements (hereinafter 'elements') and the page content is contained within the elements.

XML is a text based language, thus the content of an XML element is always text. However, the text content may be encoded to represent any media type, including, but not limited to images, audio, video. Furthermore, the text may contain an identifier used to access the actual content stored elsewhere; for example by using the Uniform Resource Locator (URL) to specify the location of the media data and the method for retrieving it.

For the sake of simplicity hereinafter we shall refer to documents that may be XML, HTML or XHTML in the context as 'XML documents' and similarly to document elements that may be XML, HTML or XHTML as 'XML elements.' Furthermore, we shall refer to 'HTML or XHTML' as 'HTML' where the two are interchangeable for practical purposes.

Web browsers can issue requests for web pages. Servers respond with a web page either taken directly from a local file specified by the request or encapsulates the output of an application component referenced by the request. Such requests and responses typically use the HyperText Transfer Protocol (hereinafter 'HTTP'), a client/server based protocol for requesting whole or partial documents.

A widely used technique for the implementation of applications that process XML documents is to first parse the XML structure into an in-memory representation using the Document Object Model (hereinafter 'DOM'). The DOM is well known to those skilled in the art as a cross-platform and language independent means of representing and interacting with objects in XML documents. The DOM has an application programming interface (hereinafter 'DOM API') by means of which programs may interact with and process well formed and hence valid such documents. The DOM is a tree structure which mirrors the XML document structure; nodes on the DOM tree represent XML document elements, their attributes and content. Thus, objects within the DOM representation correspond to XML elements and their content—hence, the XML element is often described, by those skilled in the art, as an XML object.

With the DOM API, programmers can build documents, navigate their structure, and add, modify, or delete elements and content. Anything found in an XML document can be accessed, changed, deleted, or added using the DOM API. Those skilled in the art will recognize the almost universal use of the DOM and DOM API for manipulating XML documents.

Those skilled in the art will recognize that a web browser is a specific implementation of an application which uses the DOM API to parse XML document structure in order to access and transform its content. Furthermore, web browsers are open platforms which support the extension of their functionality via third party components. The interface and protocol specifications to provide access to the inner operation of the browser, (which access is necessary to develop such extensions) is published and freely available to developers. Examples of extensions are: support for new media types; customised web page display behaviour; additional menu options and web page development tools.

FIG. 1 is an exemplary high level block diagram of a system 100 enabling the storage, retrieval, transmission, processing and display of documents The components of the system are enclosed in the dotted line 105. A high level description of a typical operation (document retrieval and display) using this system 100 follows. A user on a client computer 110 interacts with a web browser 120 and by interaction with that program generates a request 130 for an XML document 180 stored in a document store 160 on a document server 150. The request 130 is transmitted over the communication channel 140 to the document server 150 storing the document. Those skilled in the art will appreciate that the communication channel 140 may for example be the interne, an intranet or in the case wherein the client computer 110 and the document server computer 150 are the same, an internal system bus. The document server 150 locates the requested document 180 in its document store 160 and transmits it over the communication channel 140 as a response 170 to the client computer 110 and thence to the web browser 120. The web browser 120 parses the encoded document 180, processes it into a format suitable for representation in the DOM and inserts this formatted data into the DOM by means of the DOM API. The rendering engine module of the web browser 120 operates on the resultant DOM data structure(s) to create a rendered version of the document 190. This version of the document 190 is manifested.

Those skilled in the art will recognise that whilst this is only one use case and it is simplified for the purposes of exposition. It is nonetheless representative of the key components and processes of the document system.

The embodiment of the 'annotation system' (hereinafter 'program') comprises two components a) an annotation server, and b) an annotation client. These components are distinct from those of the document system. As the annotation system exists to annotate documents it presumes the prior existence of a document system.

The embodiment below is set in the context of the web. The annotation client is implemented as an extension to the user's web browser (hereinafter 'browser extension') and the annotation server is a server hosted collection of support functions (hereinafter 'server'). Such a browser extension component may be referred to as a 'plugin' or an 'add-on.' An example of a programming language used to extend browser functionality is JavaScript. Examples of server software hosting such support functions would include a database management system such as MySQL or PostgreSQL and programs written in languages such as Java or Ruby with (as required) support from an application framework such as Struts (for Java) or Rails (for Ruby).

Figure 2:
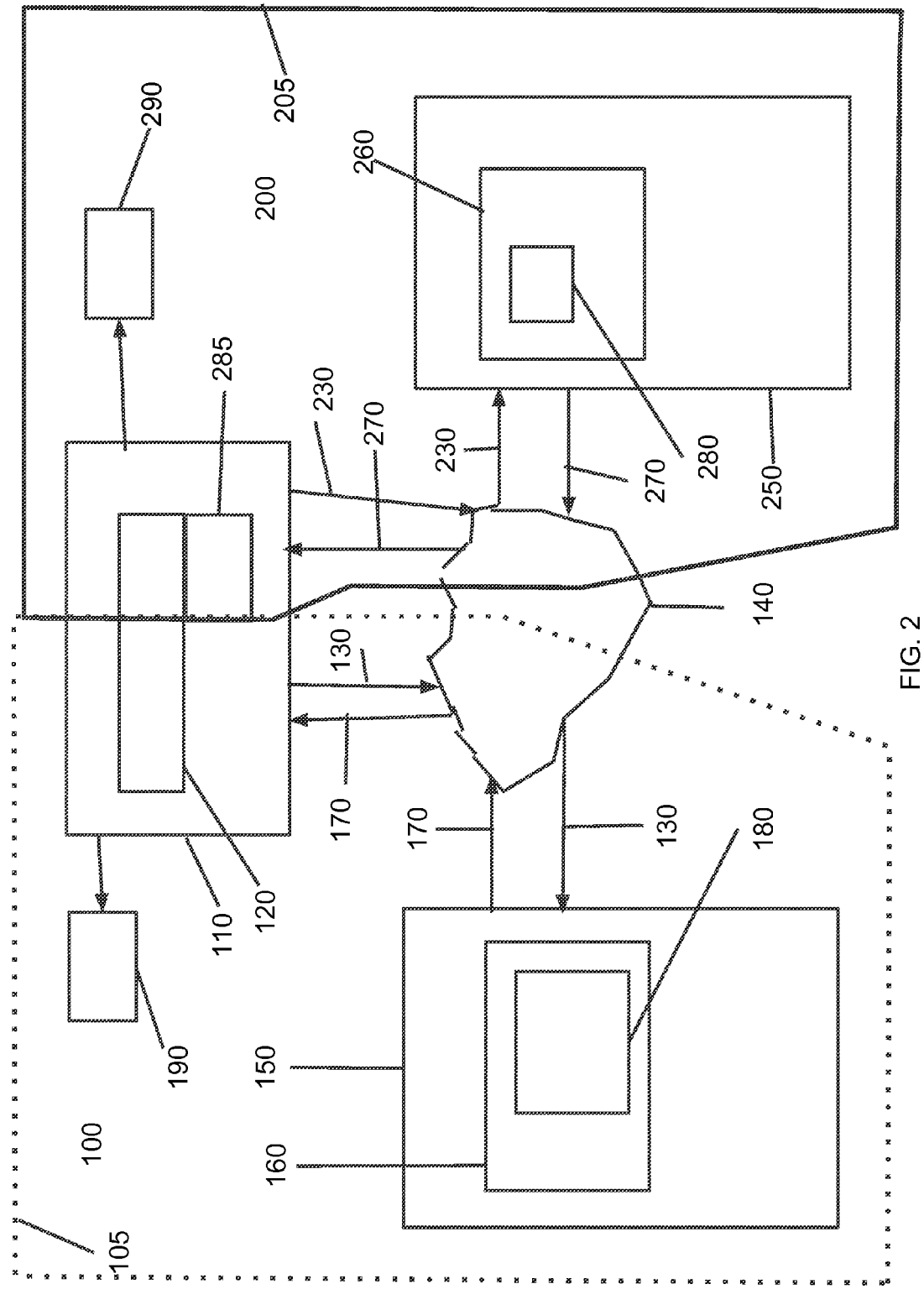
FIG. 2 is a high level block diagram of a document system and a functionally distinct annotation system, wherein the annotation system may annotate documents managed by the document system according to one embodiment of the present invention.

FIG. 2 is a high level block diagram of a document system 100, whose components are enclosed in the dotted line 105 and an annotation system 200, whose components are enclosed in the solid line 205. The annotation system 200 and the document system 100 share some resources: the client computer 110, the communication channel 140 and the web browser 120. The annotation system 200 has resources the document system 100 does not: the annotation server 250 with its annotation store 260 and the browser extension 285. The document system 100 has resources the annotation system 200 does not: the document server 150 with its document store 160.

The annotation system 200 assumes the existence of a document system 100 and enables the storage, retrieval, transmission, processing and display of annotations on documents served by the document server 150. A high level description of a typical operation (annotation retrieval and display of an annotation 280 and its display on its associated document 180 served by the annotation system 100) using this system 200 follows.

A user on a client computer 110 interacts with a web browser 120 and with the browser extension 285 and by that interaction generates a request 230 for an annotation 280 stored in an annotation store 260 on an annotation server 250. The request 230 is transmitted over the communication channel 140 to the annotation server 250 storing the annotation. The annotation server 250 locates the requested annotation 280 in its annotation store 260 and transmits it over the communication channel 140 as a response 270 to the client computer 110 and thence to the browser extension 285. The browser extension 285 parses the retrieved annotation 280 and processes it into a format suitable for representation in the DOM. As will be outlined in detail below, the browser extension 285 then inserts this processed data into the DOM by means of the DOM API thereby creating a composite of the document to be annotated 180 and the annotation 280 which is annotating document 180. The rendering engine module of the web browser 120 operates on the resultant composite DOM structure to create a rendered version of the composite, document 290. This version of the document 290 is displayed.

It will be recognized by those skilled in the art that notwithstanding shared components the document system 100 and the annotation system 200 are functionally independent. This point will be discussed in greater detail below.

Whilst the exemplary implementation describes a browser extension module and a particular division of labor between the extension module and the server modules it will be recognised by those skilled in the art that the functionality of browsers themselves continues to evolve as does technology to support browser extensions and server software. The invention may, for example, be implemented using any mechanism which supports extension of browser functionality such as Google's "Native Client" (NaCL). Furthermore, in an alternative implementation, the functionality of the extension may be incorporated into the core browser in its entirety. Indeed, as is obvious to one skilled in the art, in the light of such ongoing technical change, the division of labor between the browser, the browser extension and the server is itself subject to change and the program may therefore take the form of many embodiments. The functionality of the program may, for example, be heavily weighted to the server with a thin client or alternatively may, for example, be heavily weighted to the client with the server simply storing annotations created and edited by interaction with the client.

The invention enables powerful and novel annotations on web pages. Web page content may be as simple as text or it may be complex media such as video. XML elements specify how and where visible content is rendered on the browser's display area and how non-visible content is actioned e.g. how and when audio is played. These XML elements with their content form a rich set of objects. The content of XML elements are of various types. Hereinafter we refer to such types simply as 'media types'.

Web pages are structured compound objects that include objects of many media types. Many such objects are directly included, for example text and images with a data URI, but others may be included by reference and all are subject to dynamic modification.

Page objects may have spatial and or temporal dimension. Visual manifestations of page objects are spatially related to each other on the page. Those skilled in the art will recognise that page layout may change for many reasons and that as it does, for whatever reason, such spatial relations may also change. Similarly, the manifestation of page objects are temporally related on the page and such temporal relations may also change.

In an intuitive sense, annotations may be said to be placed "onto" a web page, thereby annotating the page. The location on the page to which the annotation is attached is the 'annotation target'. In placing the annotation, the user specifies a relationship between the annotation content and the annotation target. This relationship has meaning to the user and hence is a 'semantic relationship.' Recognizing that the importance of this semantic dimension of annotation, an important purpose of the described embodiment is to capture the semantic relationship and ensure that annotations are re-manifested with the semantic relationship intact on subsequent instances of the web page. Components of the embodiment undertake analysis of page content and structure to capture this semantic relationship. This analysis is hereinafter 'semantic analysis.' The property of preservation of this semantic relationship derived from semantic analysis (despite changes in the underlying document from one instance of its manifestation to another) is hereinafter termed 'semantic integrity.'

Figure 17:
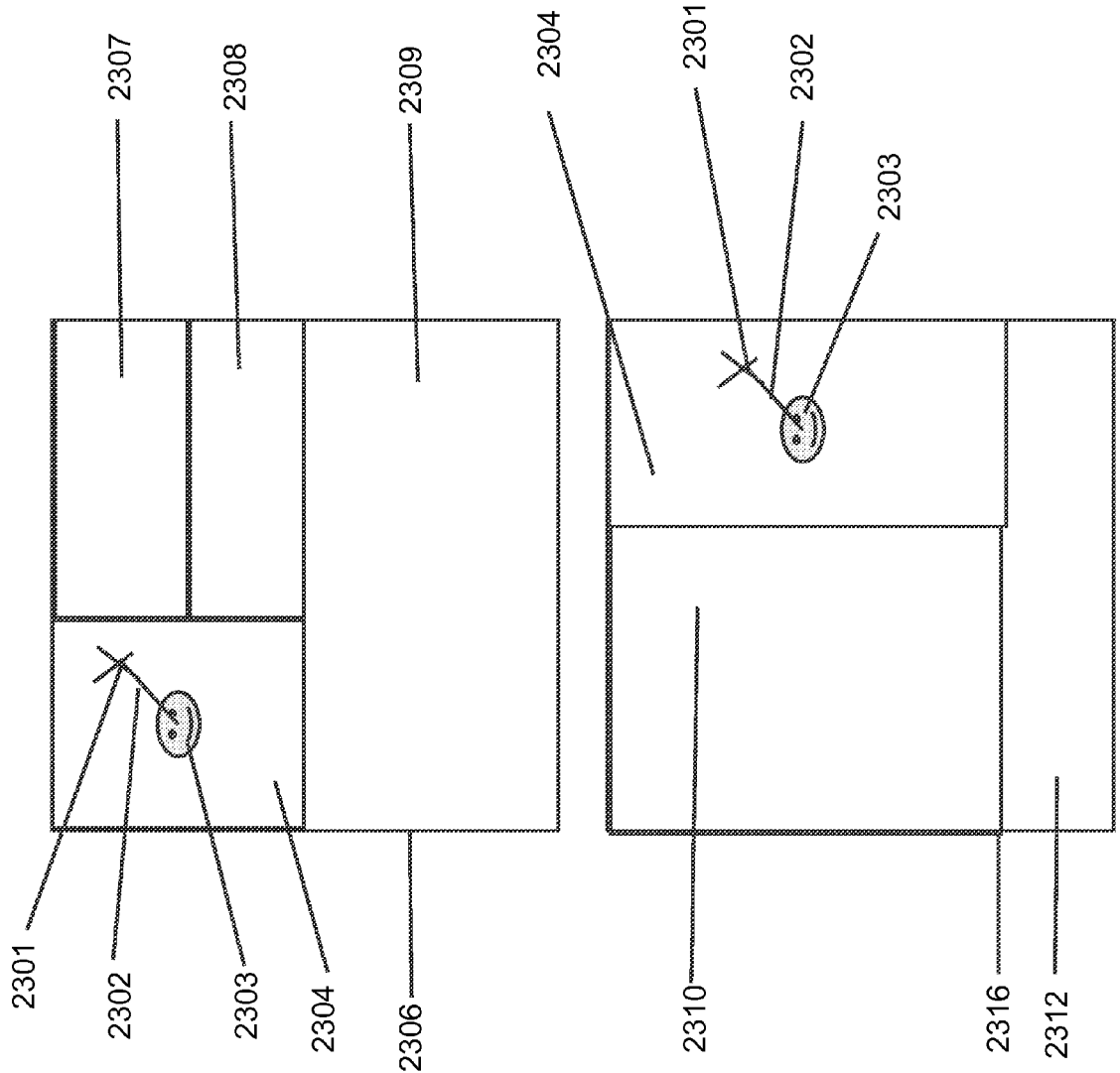
FIG. 17 is an illustration of semantic integrity according to one embodiment of the present invention.

FIG. 17 illustrates the property of semantic integrity. The FIG. 17 shows two instances of the same web page 2306 and 2316. Although they differ in layout and specific content, they are the same web page as they result from a retrieval of the same URL. The first instance of the web page 2306 shows the page comprising of four page objects, 2304, 2307, 2308 and 2309. Examples of such page objects are text blocks or images. Page object 2304 has been annotated. The annotation content 2303 has been placed onto the web page 2306 in a specific relationship 2302 to a point 2301 on the annotated page object 2304. This relationship 2302 is a semantic relationship, determined by the user, as described above. The second instance of the same web page 2316 shows the page has changed significantly: it now comprises three page objects, 2304, 2310 and 2312. Only the page object 2304 remains from the earlier instance of the web page 2306 and this page object is now shown to be a different size and in a different location on the page 2316. In this second instance the same annotation content 2303 has been placed onto the web page 2316 in the same specific relationship 2302 to the point 2301 on the annotated page object 2304. Hence the semantic relationship, determined by the user, between the annotation content 2303 and the location on the page 2301 is maintained. This example of the preservation of the semantic relationship created by the user, despite significant change in the web page being annotated is an example of the property of semantic integrity.

Content placed 'on' the page is what is typically naively thought of as the annotation. Familiar examples of annotations are notelets and text highlighting but the program enables annotation content of any media type or combination of such types. Whilst some annotations have a visual dimension e.g. notelets which are of type text or composite objects such as widgets, other annotations may not have such a visualization e.g. audio with no visualized player. Recognizing such differences, we say that different annotation media types are "manifested" differently. For example, visualizations such as images are manifested by being rendered and displayed, audio attached to a page with no visible player is manifested by being played, video is manifested by being rendered and played, and links are manifested by being followed. The act of manifesting annotation content creates a 'manifestation' of the annotation content (e.g., a rendered and displayed image in the case of image annotation content). It is this manifestation which the user experiences and it is such manifestations that the user manipulates to place the annotation in relation to a target manifestation to establish a semantic relationship. In the case of visual manifestations this is a direct and evident manipulation. In the case of non-visual manifestations it remains logically true, but the relationship is manipulated by means of a user interface representing this relationship.

The program enables the creation of annotation content in ways that range from the familiar and simple, for example typing text into a notelet, to the rich, for example 'painting'. The program allows for all such styles of annotation. Whilst some content is of very general applicability e.g. a notelet may be used to annotate practically any type of page object, other content is much more specific and only makes sense when applied to certain types of page objects e.g. a video annotation tool may only be applied to video.

The data which the program generates to describe the annotation content itself comprises one or two components (a) data required to manifest the content on the annotated web page, hereinafter the 'manifestation data' and optionally (b) data which controls elements of how the manifestation behaves; hereinafter 'manifestation control data' or 'MCD'. An annotation always has 'manifestation data' but may not have 'manifestation control data.'

The invention supports manifestation data of any type supported by the DOM. Annotation need not therefore be simple text or images but may be, for example, multimedia such as video, hyperlinks or form elements such as text fields, checkboxes, buttons and selection menus. Script and embedded object elements are also valid content media types and, as will be discussed in more detail below. Such dynamic elements within the annotation content may be used to implement 'annotation behavior' by interacting with the user, responding to external events and generating events to influence the behavior of other annotations. The manifestation may also be of combinations of such media types within an HTML fragment, e.g. a speech balloon image into which the user may input text or other data. In another example, the manifestation may not be visual at all, but may rather be an audio clip that is played. It is the manifestation of this manifestation data which may be naively considered to be the annotation.

The MCD is a specification of how the program manifests the annotation: it comprises i. manifestation timing data—used to control the temporal behavior of the manifestation e.g. how long the annotation should be manifested after it is 'started' or the maximum delay from loading of the annotation to the manifestation of the annotation. Such an 'MCD delay' MCD delay applies to all associations for that annotation;

ii. manifestation realization data—used to control the behavior of an annotation. For example, to control the visual behavior of an annotation with a visual manifestation e.g. the annotation abruptly appears and disappears, or the annotation fades in and out, the annotation may slide in from the edge of the browser display. In a further example, to control the audio behavior of an annotation with an audible manifestation e.g. to control the volume fading in or out; and iii. manifestation external interface specification data—used to control how the annotation interfaces with external objects e.g. how the annotation will respond to external events and what aspects of annotation data may be exposed for modification by other annotations.

In the event that an annotation has no MCD specification, a default behaviour is implemented for the annotation:

the annotation is manifested immediately with no realization modification the annotation continues to manifest until the underlying web page is changed the annotation responds only to the Annotation API (as detailed below), without behavior modification In the described implementation the program uses an event mechanism to implement operations on the annotation. Named events are sent to the annotation (e.g. 'start' event) and are interpreted according to declarations in the MCD. A core set of events (e.g.: timers, annotation start/stop) is generated by the program and annotations may define and dispatch their own events. Those skilled in the art will recognize that there are alternative mechanisms for annotation control, for example via direct calls to an Annotation API with dynamic methods corresponding to events consumed by the annotation.

The MCD may, in one example, include timing data specifying timing information about the manifestation, such as—display the speech balloon for five seconds, then make it invisible for 5 seconds, then display it again and so on (blinking). In another example, the external interface data may specify how the manifestation is to behave when a specified event occurs, such as—if the user clicks on this element of the content then dim the speech balloon. Those skilled in the art will recognize that by virtue of such control data the "same" content (i.e. the same manifestation data) can behave differently.

The MCD Specification comprises key/value pairs, for example:

start delay: <seconds from 'start' event to manifest commencement> manifestation duration: <seconds to manifest to the annotation> blink: <start/stop cycle, on time, off time> fade in: <seconds over which manifestation linearly taken from 0% to 100%> fade out: <seconds over which manifestation linearly taken from 100% to 0%> expose: <annotation attribute exposed for modification> consume: <event to action binding>

The user does not directly edit such key/value pairs. Such statements are typically manipulated by program components which present a suitable user interface. It will be recognized by those skilled in the art however that, subject to access control, such information may be accessed and edited programatically by other programs. Those skilled in the art will further recognize that there are viable alternative methods of expression of such control data and the selection of such alternative will not affect the viability of the embodiment.

Figure 3:
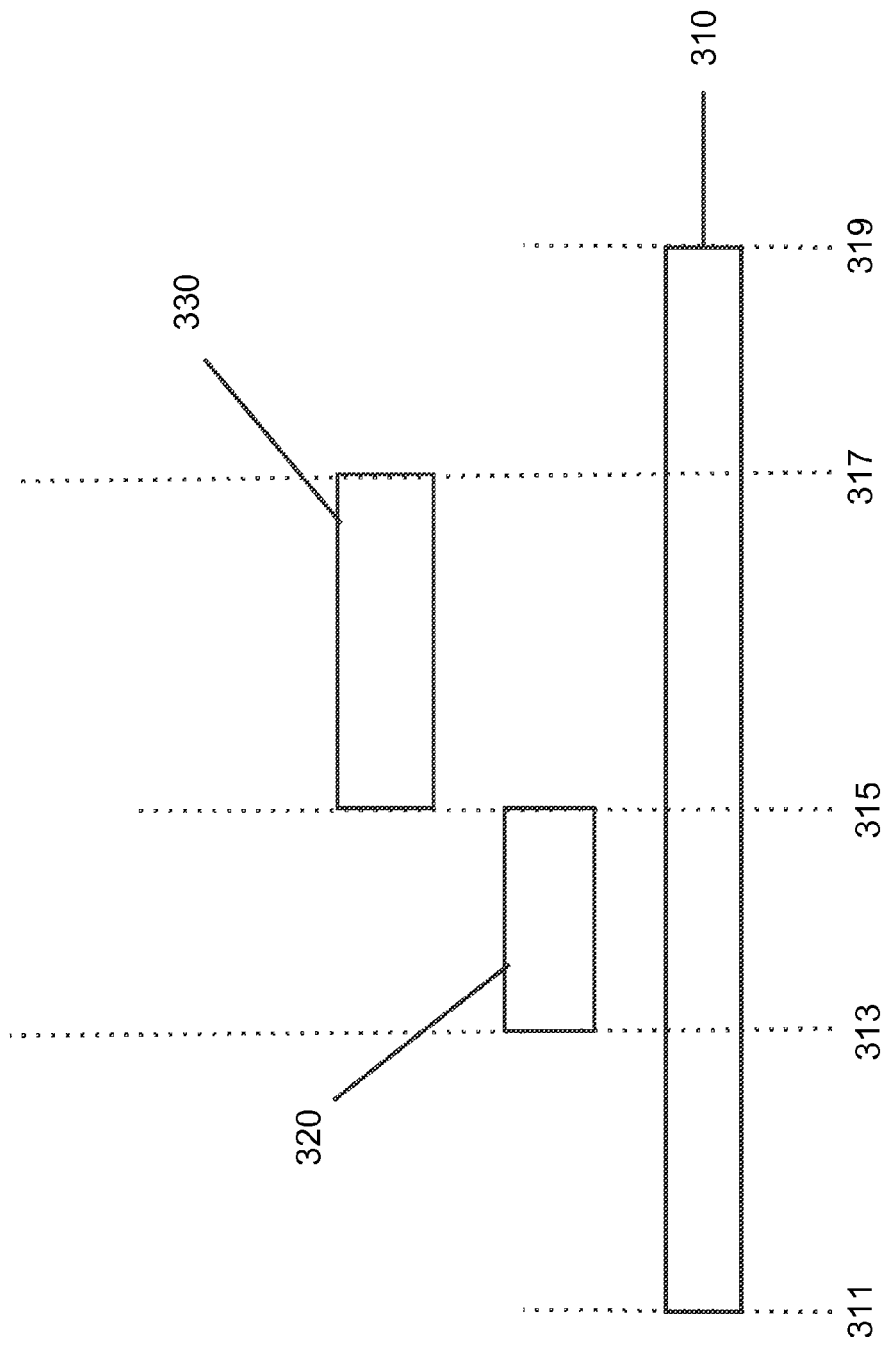
FIG. 3 illustrates the use of manifestation control data to influence the timing of the manifestation of annotations according to one embodiment of the present invention.

FIG. 3 illustrates the use of the MCD to influence the timing of the manifestation of an annotation. The elapsed time of the manifestation of the annotated page object is represented by 310. The annotated page object is manifested at time 311 and continues to be manifested until time 319. The time interval 310 may vary in real terms from one instance of the manifestation to the next. For example, if the targeted page object is a video clip, network lag may result in data streaming delays. The annotation is attached to a target on the annotated page object at time 313 on the elapsed time of the annotated page object 310 but the annotation has a manifestation delay 'MCD delay' 320 specified in the MCD. This delay applies to all associations for that annotation which means that even when the target is reached at time 313 on the elapsed time of the annotated page object the annotation does not manifest immediately but after the period of the MCD delay 320. Only once the MCD delay 320 is exhausted at time 315 on the elapsed time of the annotated page object 310 does the annotation manifest. The annotation continues to manifest until it terminates at the manifestation end point at time 317 on the elapsed time of the annotated page object 310. This termination of the manifestation at time 317 on the elapsed time of the annotated page object 310 overrides the default behavior described above (to continue manifestation until the annotated web page is unloaded or manifestation of the annotated page object ceases, whichever occurs first). Such an override of the default behavior may, for example, result from an MCD specification of the duration of the manifestation interval 330 or it may be determined by a 'stop' event communicated to the annotation.

Hence it may be seen that the program supports both rich annotation content and powerful control over both the spatial and temporal dimensions of the manifestation of such content. Furthermore, as will be detailed below, the program supports additional operations on annotations. They may, for example, be managed in sets, shared by groups, browsed, searched, saved and restored with semantic integrity and every aspect of their content and behavior may be programmatically edited. For the program, therefore, an annotation comprises not only the content (which is generally naively considered to be the annotation) but a significant amount of additional information and functionality.

Notwithstanding the above, the text below may use the term 'annotation' to refer to the manifestation of the annotation content when intuitively appropriate, thereby according with the naive use of the word.

The Annotation Point

To define the exact location of manifested content such content has to be represented by a point, (hereinafter the 'annotation point.') This is a known point on the annotation manifestation (spatial and/or temporal) which is used to represent the annotation manifestation's location in space and/or time.

Spatial annotation points will typically have an intuitive location 'on' the annotation manifestation. An example of such a point is the tip of a speech balloon. In the second example of an annotation such as a circle, the annotation point could be the center of the circle and by placing the annotation point 'on the page' one is, in effect, placing the circle in a precisely determined position on the page in relation to the page object being annotated.

Temporal annotation points are used to trigger events which influence the behaviour of the annotation. They are associated with temporal aspects of a target and may be identified by timer information which specifies a duration on the timeline of the page object containing the target e.g. 5 seconds after start of audio playback. They may alternatively be identified by recognition of information in the content e.g. an image on frame 57 of movie playback. The standard temporal annotation points are 'start' and 'stop'. Hence, temporal annotation points may identify the 'start' and 'end' of the manifestation of the annotation content. The 'start' annotation point is the trigger to start the annotation, for example, to render an image or to start playing an audio clip; the 'stop' annotation point is the trigger to stop manifesting the annotation, for example, to hide a visible annotation or to pause an audio clip.

An annotation may be associated with multiple targets, each of which references a different annotation point. Such annotation points may trigger multiple 'start', 'stop', 'start', . . . events which will have the corresponding effects in a time order specified by evaluation of the corresponding annotation associations discussed below. A temporal annotation point sequence of two 'start' triggers, or two 'stop' triggers, causes the second to have no effect (i.e. the annotation cannot be started again). These triggers are delivered to the annotation via annotation events and are interpreted according to specifications in the MCD. The default behaviour of the 'start' event is as described above, similarly for the 'stop' event. If there are no temporal annotation points specifying a 'start' event, then the program supplies one at the instant the annotation is selected for display. Temporal annotation points may be used to trigger any event exposed by a MCD 'consume' specification and hence to generate more complex behaviors than annotation start and annotation end.

In the case where an annotation with temporal annotation points, is selected for manifestation after any related target timeline has passed then one of the following recovery actions is executed: (1) if the target is timer based (e.g. 5 seconds after start of audio playback) then the program actions the associated annotation by sending the start event immediately; or (2) if the target is derived from an analysis of content then a dialog is presented to the user to ask if they wish to redisplay the page and hence replay the content; if the user declines the restart operation then the annotation start is not actioned Because the annotation point references the content multiple annotation points may reference the same content.

The Annotation Target

The program enables a user to place the content on the page and to anchor it onto a specific location on the page—the target. This target may be determined by a human user by interaction with the program or specified by a computer user programmatically by accessing an API (see below). The target is one of: the web page itself; a web page object, a collection of related web page objects, a region of a web page object; a region which spans a collection of related web page objects or a specific point within a web page object. (A 'region' is a section of an object where the start of the section does not necessarily coincide with the start of the object and the end of the section does not necessarily coincide with the end of the object.) Those skilled in the art will recognise that collections of related web page objects will typically be a sub-tree of the web page document.

All targets have a manifestation. The invention supports a broad range of targets (any media types addressable by the DOM) hence all annotations may be attached to targets of any such type so long as such an attachment is meaningful.

Annotation targets may be spatial and/or temporal. Hence annotations may be attached to a specified location on a visualized manifestation and/or attached to a manifestation at a specified instant during its manifestation. Hence an annotation may be said to have spatial and/or temporal dimension.

Examples of such targets are the whole page, a block of text, an image, a group of pixels in an image, a movie, a set of frames in a movie, a single frame in a movie or a point on such a frame. A collection of page objects comprising a sub-tree of the document structure may also be selected as a target, for example: a whole table, a single table row, or all XHTML elements enclosed within a <div>. Sub-trees as targets are of particular use where the program has used specialist knowledge of pages from a website to identify semantically associated large sections of the web page document—e.g. entries in a news feed. The target may also be non-visual, for example a point on the timeline of an audio track.

The target is defined by the program by means of analysis of the page object(s) content and optionally by its relationship to other objects on the page. The data generated by such analysis is used by the program to find the target again in subsequent instances of the web page and is hereinafter called 'Target Locating Data'.

Despite the fact that a target with a visualization may often be set by the user to be an area (page, object or region), just as the program uses the annotation point to represent the annotation content, so does it use a point in this target area to represent the precise location of the target. This point, hereinafter 'target point', may be a program default, determined from the type of target or it may be specified by the user. If the user specifies a point as a target then this is fixed such that target=target point. In the case where the user specifies a page object or region as target, information about the target area is stored and the program calculates an appropriate target point which is re-calculated should any of the target context change. For example, the point for a text phrase that occupies a single line on the display may be calculated as the centre of the phrase; if the display is resized so that the phrase now occupies multiple lines, the point must be recalculated and may now reference the centre of the display area occupied by the phrase. The target point for page objects with no visualisation (e.g. audio) is the page origin.

In the case of page content that has a temporal aspect (e.g. audio and video), the default temporal target is the first instant that the page manifests (but this may be overridden to be any point on the play timeline).

The invention's very general method and process enabling users to specify the target to a desired degree of detail is important. Firstly, a user may want to annotate a very specific piece of content on the page rather than the whole page or all of a page object. Targets referencing a collection of related objects (e.g. a document sub-tree) allow the user to annotate content spread across multiple page objects and which 'mean' something on the web page. It may be, for example, that he wants to draw attention to a couple of lines in a large text block or an entry in a newsfeed or a particular phrase in a piece of music or a specific location on a specific frame of a video. Because the target may be spatial and temporal the user may, for example, place a visual annotation on a specified point on a specified frame of a video. Secondly, as we shall see below, this capability is critical for the provision of semantic integrity.

The Annotation Association

The annotation association links the manifestation of the annotation content to the manifestation of the target by specifying one or more relationships between the annotation point and the target point and it thereby represents the semantic relationship described above. As also noted above, there are many relations, spatial and temporal, between page objects. The association however is unique in that it is the only such set of relations representing the user determined semantic relationship between the manifestations of the annotation content and annotation target. The relations specified in the association determine the offset between the annotation content and the target in space and time. Each association may have one or both of such spatial and temporal relations. (Whilst it is always more accurate to speak of the association between the manifestations of the annotation content and the target we will from time to time speak more intuitively of the association being between the annotation content and the target, or between the annotation and the target.)

The association with spatial dimension (hereinafter 'spatial offset') notes the distance and direction from annotation point to the target point, thereby determining where the manifested content is in relation to the target. The spatial offset has a default which may be zero, in which case the annotation point is co-incident with the target point in space. In future instances of the web page, the spatial offset enables the program to manifest the content in the same spatial relationship to the target as in the first instance of the document.

Figure 4:
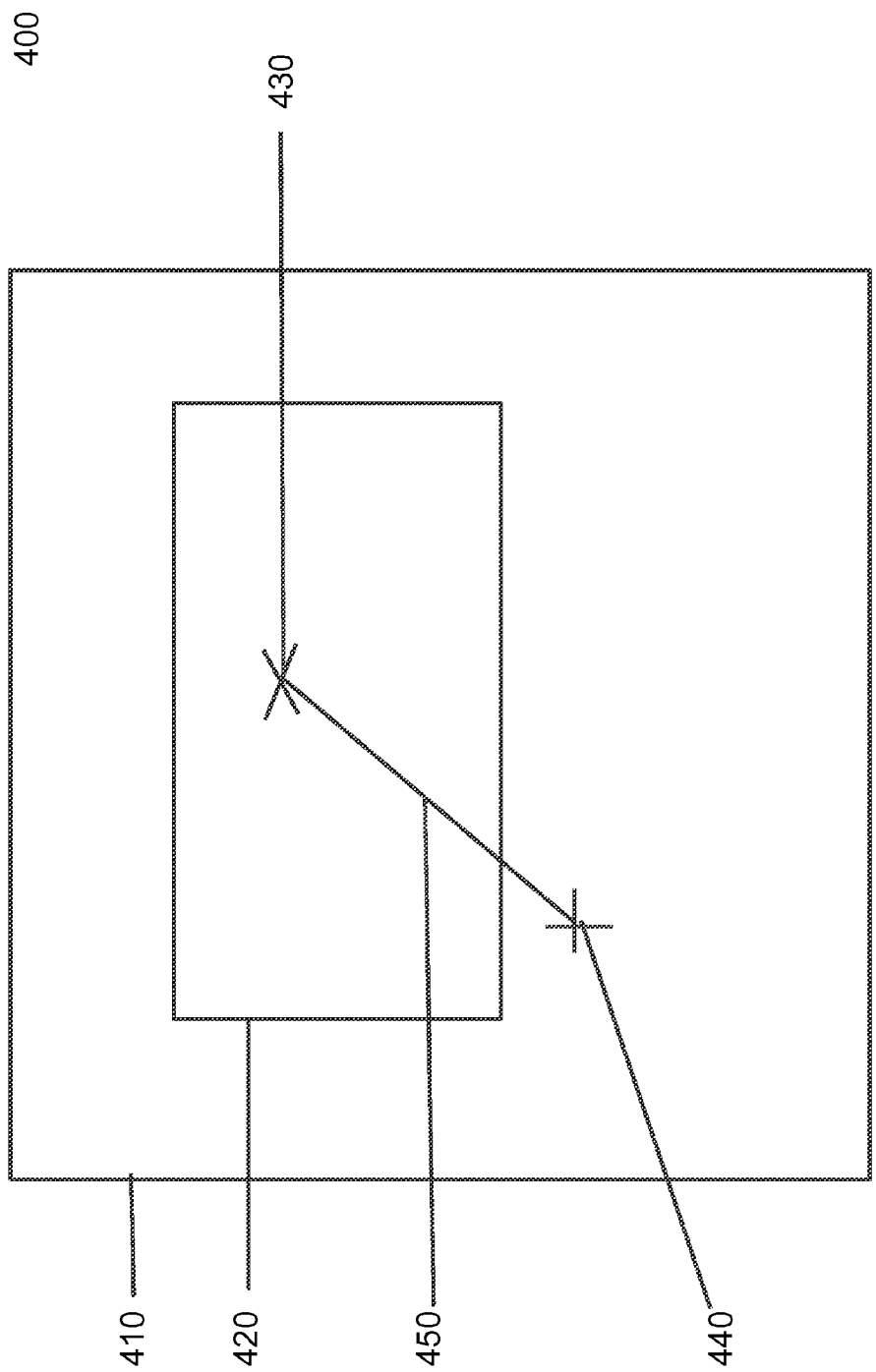
FIG. 4 shows how the position of manifested annotation content on the page is determined by its spatial offset from the target according to one embodiment of the present invention.

FIG. 4 shows how the position of manifested annotation content on the page is determined by its spatial offset from the target. Web page 410 contains a visually manifested page object 420. Examples of such page objects are text blocks and images. The annotation point 440 is related to the target point 430 by the spatial offset 450. If user interaction alters the position of the annotation then the annotation point 440 will change. Similarly, if user interaction alters the position of the target then the target point 430 will change. Changing the annotation point 440 changes the spatial offset 450; changing the target point 430 changes the annotation point 440 to maintain the spatial offset 450.

Given the target point and the spatial offset the annotation point may be located precisely and hence a second instance of the annotation may be manifested precisely in relation to the target. It will be understood by those skilled in the art that the spatial offset directly represents the semantic relationship determined by the user between the annotation content and the target. It will further be understood that non-visual annotation content (e.g. audio) has no spatial annotation point and no spatial offset.

All page objects with a visual manifestation are spatially related on the page. The spatial association is a special such relation—that between annotation point and target point.

Some page objects, such as audio or video players, manifest content with a timeline. Such content may have annotations attached to it at any point or points on its timeline. The association with temporal dimension (hereinafter 'temporal offset') notes when the annotation is manifested temporally in relation to a target. More specifically it specifies the difference between the instant on the page object timeline represented by the target and the instant on the page object timeline that the annotation is signalled to start. By default, the temporal offset is zero in which case the annotation point is co-incident with the target in time. In future instances of the web page, the temporal offset enables the program to manifest the content in the same temporal relationship to the target on the page object timeline as was the case in the original instance. (As noted above, the temporal offset is distinguished from the MCD delay in that the temporal offset applies to a single association whereas an MCD delay applies to all associations for that annotation.)

Figure 5:
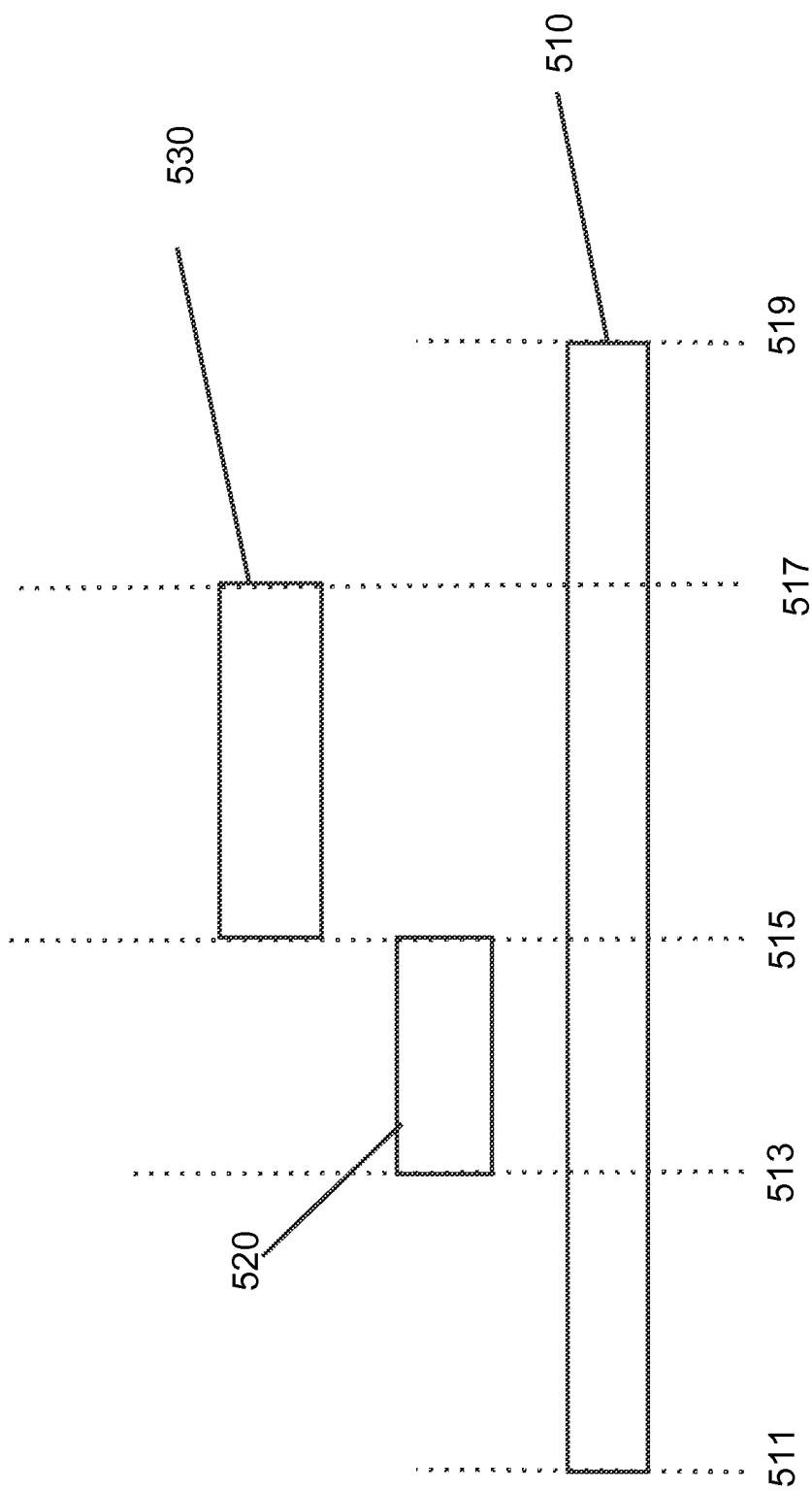
FIG. 5 shows how the time when the annotation content is manifested on the page is determined by its target on the annotated page object timeline and any temporal offset from this target according to one embodiment of the present invention.

FIG. 5 illustrates the use of the temporal offset to influence the timing of the manifestation of an annotation. The elapsed time of the manifestation of the annotated page object is represented by 510. The annotated page object is manifested at time 511 and continues to be manifested until time 519. The time interval 510 may vary in real terms from one instance of the manifestation to the next. For example, if the targeted page object is a video clip, network lag may result in data streaming delays. The annotation is attached to a target on the annotated page object at time 513 on the elapsed time of the annotated page object 510 but the annotation has a temporal offset 520 specified in the annotation association data. This temporal offset 520 means that even when the target is reached at time 513 on the elapsed time of the annotated page object the annotation does not manifest immediately but is delayed for the period of the temporal offset 520. Only once the temporal offset 520 is exhausted at time 515 on the elapsed time of the annotated page object 510 does the annotation manifest. The annotation continues to manifest until it terminates at the manifestation end point at time 517 on the elapsed time of the annotated page object 510. This termination of the manifestation at time 517 on the elapsed time of the annotated page object 510 overrides the default behavior described above (to continue manifestation until the annotated web page is unloaded or manifestation of the annotated page object ceases, whichever occurs first). Such an override of the default behavior may, for example, result from an MCD specification of the duration of the manifestation interval 530 or it may be determined by an event communicated to the annotation. Such an event may be triggered by a timer (measuring an interval from annotation 'start') or by content manifested on the page object timeline. By such means those skilled in the art will appreciate that the program allows a user to, for example, attach a voice comment 5 seconds from the start of a video clip or to attach an image to frame 157 of a video clip, and for those annotations to persist until either their duration as specified in the MCD elapses or an event signals the annotation to stop.

As those skilled in the art will recognize, and as noted above, temporal manifestations are affected by operating system, network and browser load; for example, an audio track that should start as soon as the web page is loaded may be delayed due to poor network performance. A temporal constraint specifies the limits on delay between target timeline point and annotation manifestation; for example the annotation 'start' event can be suppressed if more than a specified number seconds have elapsed since the target was manifested. Due to the possibility of lag it will be appreciated that attaching annotations to media of the form 'start annotation manifestation X seconds after page object manifests' may well result in annotations appearing at the wrong time, but that attaching annotations to targets embodied in the content overcomes this problem of annotation manifestation.

All page objects are temporally related. The temporal association is a special such temporal relation—that between annotation point and target point.

Some annotations may be moved spatially or temporally in relation to their targets, subject to constraints on the offset (hereinafter 'offset constraint'). Such constraints may be implemented either manually by the user or automatically by the program. An example of a constraint is a maximum distance from the target in space or time. Constraints may vary depending upon the style of annotation. Some annotation content may require pin-point accuracy with respect to its target (e.g. 'pin the tail on the donkey') whereas others may be offset with a considerable degree of flexibility (e.g. a notelet type text annotation). The invention supports multiple constraint policies and different annotation content may be constrained in different ways.

If the annotation content manifestation has a visualization and is exactly the same size (occupies the same display screen area) as the target and is co-incident with the target, then the target is covered by the annotation content and therefore disappears. This allows the effective replacement or apparent editing of web page objects or regions. In a similar manner non-visual manifestations such as audio may be apparently edited by removing underlying audio from the DOM then manifesting the replacement audio in its place. Because spatial and temporal offsets may edited and thereby updated, animations may be created by such updates to the offset and hence to the position in time and/or space of the manifested content.

The Annotation Triple

As noted above, for the program an annotation is not synonymous with the intuitive notion of an annotation as its manifestation content. An annotation comprises a triple of content, target and the association that determines the spatial and/or temporal relationship between the content and target.

The data defining an 'annotation triple' (uniquely identified by its 'triple identifier') is the combination of 'annotation point data', 'target locating data' and 'association data'.

The annotation point data is a reference to the annotation content data. Multiple triples may reference the same annotation content data. It further specifies a point on the manifestation of the annotation content which is used to generate the association.

The target locating data is that data generated by the program when an annotation is created or edited on a given document and which is designed to enable the program to find the target in a subsequent instance of that document. Such data enables a process whereby a target may be identified. Note that target locating data is not necessarily identical to the physical location of the target. Rather the program uses the target locating data to generate the target point which is a unique spatial and/or temporal location on the target. Hence, a target's position on a page may differ from one instance to the next but notwithstanding this change the target locating data is designed to enable the program to find the target location.

The association data is that data representing the spatial and/or temporal relationship between the annotation and the target. More specifically it specifies the spatial and/or temporal relationship between the annotation point and the target point by means of the spatial and temporal offsets.

Figure 6:
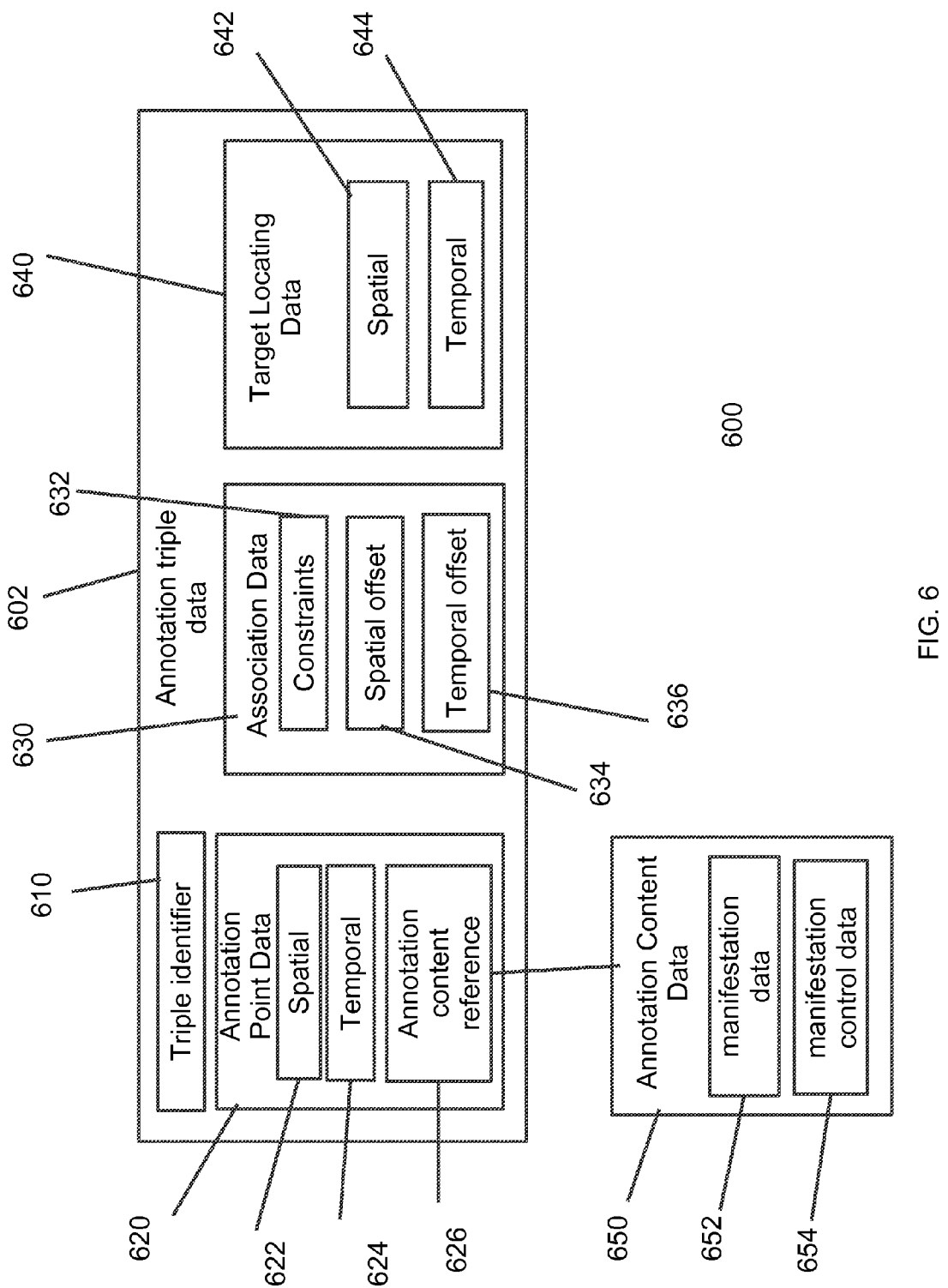
FIG. 6 is a diagrammatic representation of the annotation data structure according to one embodiment of the present invention.

FIG. 6 represents the annotation data structure as described above. The annotation data 600 comprises the annotation triple data 602, uniquely identified by the unique identifier 610, and the annotation content data 650 which is included by reference 626. The annotation triple data 602 itself comprises the annotation point data 620 comprising spatial data 622, temporal data 624 and annotation content reference data 626, the association data 630 comprising constraints data 632, spatial offset data 634 and temporal offset data 636 and the target locating data 640 comprising spatial data 642 and temporal data 644. The annotation content reference data 626 references the annotation content data 650 which comprises the manifestation data 652 and the manifestation control data 654. Multiple annotation triples 602 may have the same value for the annotation content reference data 626 and thereby share the annotation content data 650 in which case the set of such annotation triple data 602 together with the shared annotation content data 650 comprise the annotation data 600.

We may now consider some simple examples. The annotation content could be a notelet which is associated with a target which is an image on the web page. In another example, the content could be an audio clip, the start of which is associated with a specific frame of a movie clip on the web page. In a more complex example the annotation point of a speech balloon references the annotation content (manifestation data required to render the balloon and MCD data specifying that the content shall be displayed for five seconds and then vanish) and the association links the annotation content to the target spatially and temporally with zero offsets. Hence, the annotation point will be coincident with the spatial target and the annotation start will be coincident with the manifestation of the target start event. If the target for the speech balloon manifestation is the center of the movie display space and it is to be manifested starting at frame 198 then when the movie plays, the program identifies frame 198 and dispatches the annotation 'start' event. The annotation is manifested in accordance with the MCD. Hence the speech balloon is displayed in the center of the video display area for five seconds then becomes invisible. By editing the association and the MCD the balloon's position on the page and the time it manifests may be altered.

The program allows for annotations with multiple annotation triples. This is useful for content such as arrows that have a beginning and an end. Furthermore, multi-component annotation content may be chained from a single target, each with their own associations and constraints. This, for example, would be appropriate for the display of a note referring to a particular word or phrase in a text target—the first content is an arrow graphic, the second is the note itself. As the note is moved, the arrow graphic is automatically re-drawn to join the target to the note.

Figure 7:
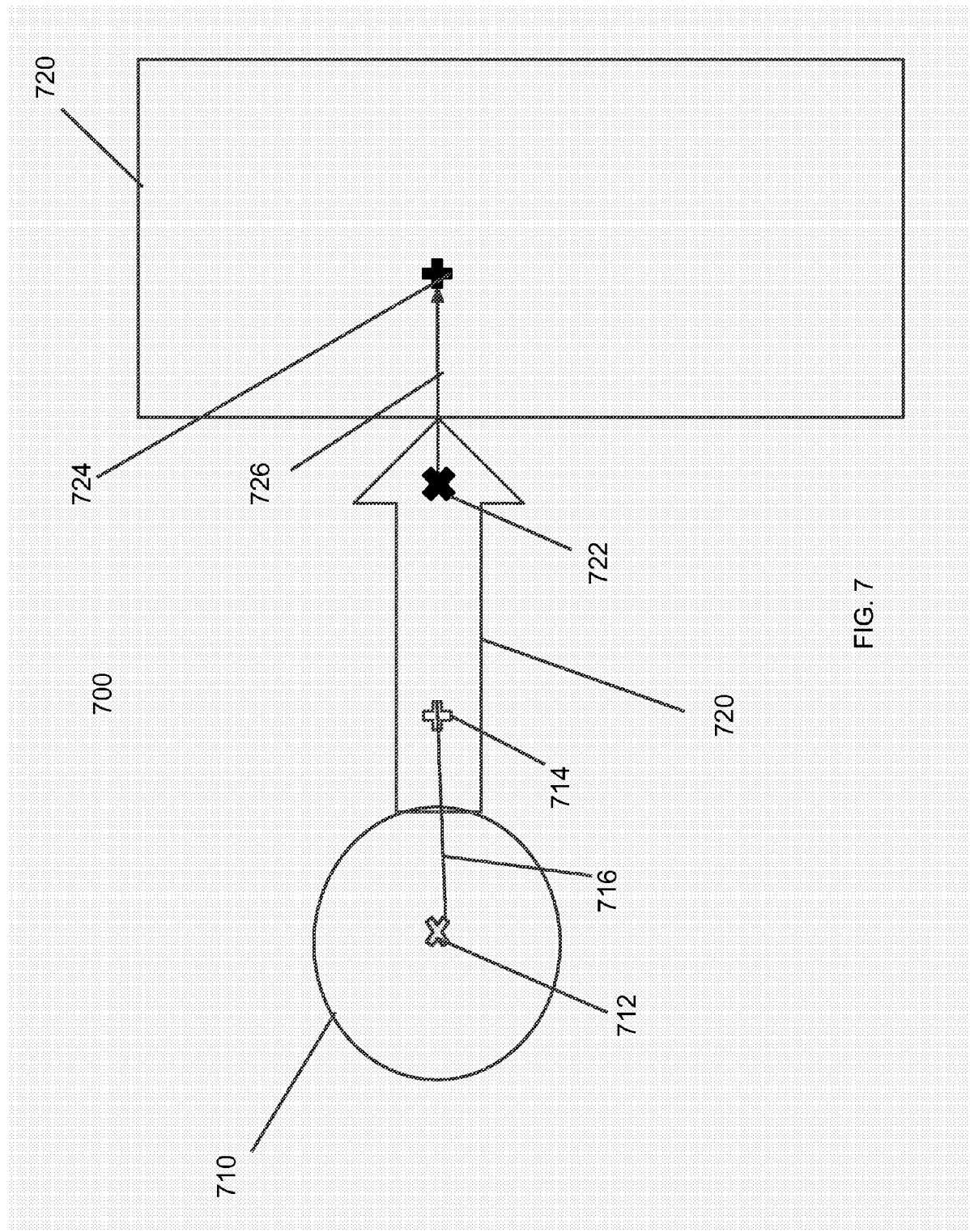
FIG. 7 shows a multi-component annotation on web page according to one embodiment of the present invention.

FIG. 7 shows a multi-component annotation 700 on web page object 720. Annotation_1 710 has annotation point 712, target 714 on annotation_2 720, and spatial offset 716. Annotation_2 720 has annotation point 722, target 724, and spatial offset 726. Annotation_2 720 is attached to the page object being annotated 720 and annotation_1 710 is attached to annotation 2. Together annotation_1 710 and annotation_2 720 comprise a multipart annotation attached to the target 724 on web page object 720.

Additional annotation triples may be defined to create a purely semantic dependency with content elsewhere on the web page. These triples, for example, would be appropriate where an annotation on one page object is relevant only if other page object(s) are present and contain specific content.

An annotation may have multiple triples, each with its own unique identifier, with the same content referenced by all the triples, by means of the annotation point. Where an annotation has multiple triples and, hence multiple spatial associations each with spatial constraints, in the event that the targets are manifested in locations which would cause one of more of the constraint checks to fail then the annotation is not manifested. It is marked as inactive and may not be started by any means. Should the page content change, for example as the result of in-page JavaScript execution, such that all spatial constraints may be satisfied, the annotation is manifested.

Annotations

The data for an annotation consists of all its annotation triple data i.e. the group of triples, plus the annotation content data. The content data is in this way shared between the one or more triples that are members of the annotation and the annotation has a unique group identifier.

Annotation Sets

A page may be annotated with one or more annotations intended to be seen together (hereinafter the 'annotation set'). The layout of multiple annotations displayed simultaneously on the same page is subject to constraints and layout policy. As will be understood by those skilled in the art, multiple layout policies may be realised by grouping annotations into collections for the purpose of applying such a policy. For example, there may be one collection for all annotations attached to the page and another collection for all annotations attached to page objects targets. Any number of annotations and annotation sets may be applied to any web page. Each annotation set is saved to the server as a discrete item.

Each annotation is assigned a unique identifier and its position within the ordering of all annotations in the set determines the sequence and layering precedence for visual annotations. Saving such information for each annotation fixes these relationships and allows for later restoration to recreate the same manifestation in the same relationship to the target (or a manifestation which whilst not exactly the same is the same subject to defined parameters). Such ordering and layering information is an example of an 'Annotation Set Attribute'. These attributes will be discussed in more detail below.

The total of such data required to describe the annotation set (but not the Annotation Data of the annotation members of the set) is hereinafter referred to as the 'Annotation Set Data.'

As used herein, data representing an annotation set may directly include data describing the annotation set members or may reference the member data stored elsewhere.

Annotation Programmability

Annotations and annotation sets may be edited by means of a programmatic interface. The Annotation Data API provides access to all data structures in an annotation i.e. the Annotation Data. Programs which are allowed access to this API may thereby programmatically control all aspects of the annotation.

Figure 15:
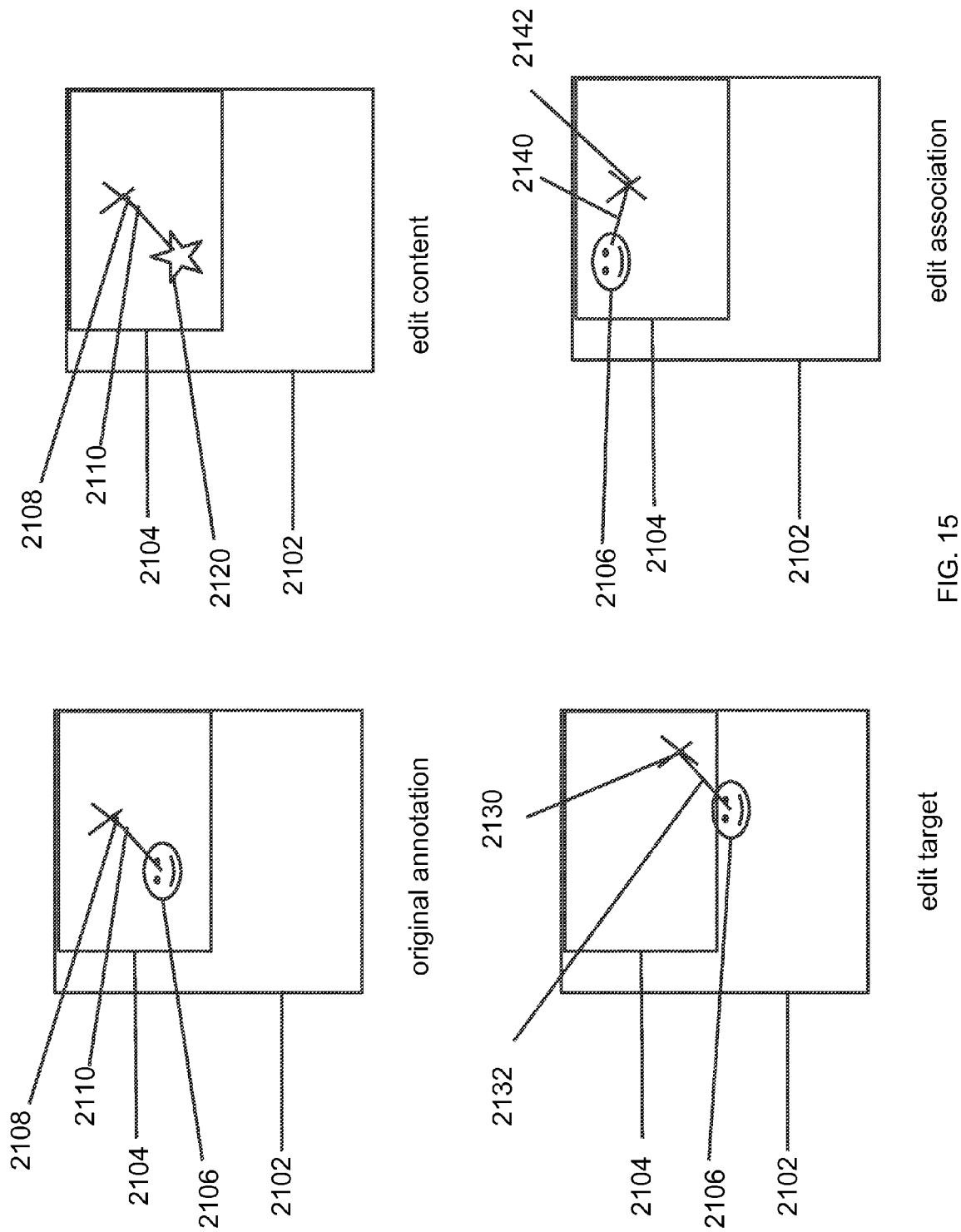
FIG. 15 is a depiction of the effects of programmatically editing elements of the annotation triple according to one embodiment of the present invention.

FIG. 15 illustrates the effect of editing elements of the annotation data triple by means of the Annotation Data API. The original annotation consists of content 2106 with association 2110 to target 2108. The target 2108 is on page object 2104 on web page 2102. It is possible to edit the content 2106, the target 2108 or the association 2110 programmatically. In the case where the content 2108 has been edited the new content 2120 is manifested but nothing else is changed—the position of the new content 2120 with respect to the target 2108 as defined by the association 2110 is identical. In the case where the target 2108 has been edited the new target is 2130; the content 2106 is unchanged but because the association 2132 is unchanged, the position of the content 2106 changes. In the case where the association 2110 has been edited to the new association 2140 the position of the content 2106 is changed accordingly.

The Annotation Set API provides access to all data structures describing an annotation set i.e. the Annotation Set Data. Programs which are allowed access to this API may thereby programatically control all aspects of the annotation set. These APIs together comprise the program's Application Programming Interface (hereinafter 'Annotation API'). By means of this API all the data structures defining an annotation set, and all data structures defining all annotation members of the set, may be accessed and edited. Specific annotation data may be protected against view and/or update access via 'expose' specifications in the MCD.

The Annotation API may be used by active components (e.g. JavaScript script elements) within an annotation manifestation data to modify other existing annotations within an annotation set. Thus, it will be recognised by those skilled in the art that the Annotation API provides a means by which the program may receive annotation input data representing annotation set content for annotating targets in web pages.

Hence, as will be appreciated by those skilled in the art, the annotations described in the invention are programmable. Editing and thereby changing the annotation data may, for example, move the annotation's location (in time and/or space) in relation to the target, make it visible for a shorter time or change its layering with respect to other annotations. It will further be appreciated that, subject to access control, programs other than those described below may be written which utilize the Annotation API to program annotations. For example, it is perfectly possible to write an application for an Android mobile phone which could alter an annotation's stored data and hence an annotation's manifestation or the behavior of the manifestation; or for JavaScript embedded within a web page to be aware of annotations placed onto the page.

Annotation Temporal Behavior

From the above description it will be recognized by those skilled in the art that the temporal behavior of the annotation can be specified by two mechanisms: the association temporal offset and the MCD timing data. Thus, there are two ways an annotation can be manifested with an initial delay, i.e. by means of:

1. the annotation triple: the target manifests and the association links to the 'start' event with delay specified in the association temporal offset, and 2. the MCD: the MCD specifies a start delay.

It is also possible for an annotation to employ both mechanisms.

3. the triple association links to 'start' event with a temporal offset (d1) and the MCD specifies a start delay (d2). The result of which is that the annotation starts at d1+d2 after the target appears on the object timeline.

Figure 8:
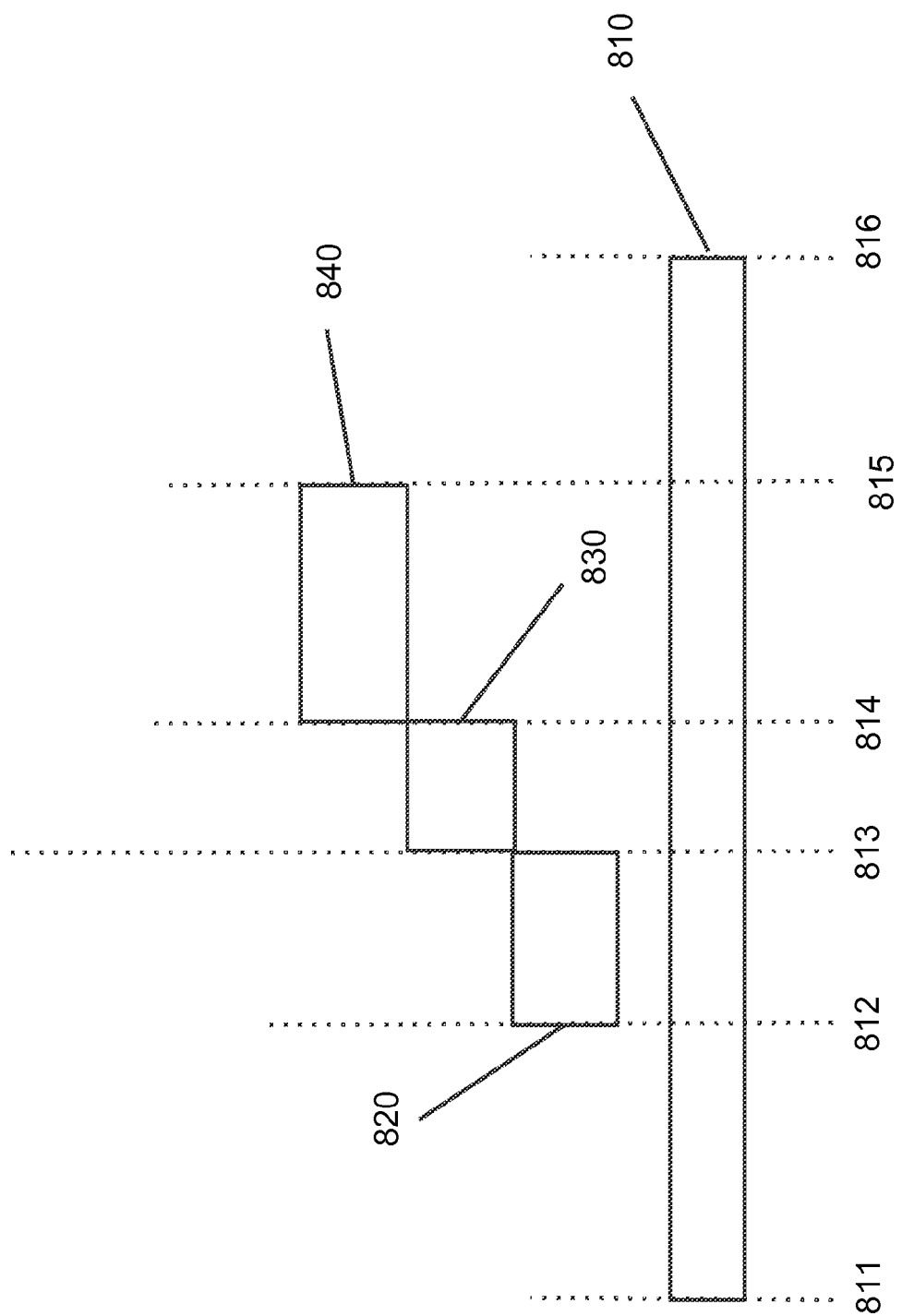
FIG. 8 illustrates the use of both the 'temporal offset' and 'MCD delay' for controlling the temporal behavior of an annotation according to one embodiment of the present invention.

FIG. 8 illustrates the use of both the 'temporal offset' and the 'MCD delay' for controlling annotation temporal behavior. The elapsed time of the manifestation of the annotated page object is represented by 810. The annotated page object is manifested at time 811 and continues to be manifested until time 816. The time interval 816 may vary in real terms from one instance of the manifestation to the next. (For example, if the targeted page object is a video clip, network lag may result in data streaming delays.) The annotation is attached to a target on the annotated page object at time 812 on the elapsed time of the annotated page object 810. In this instance however the annotation association data includes a temporal offset 820 so even when the target is reached at time 812 the annotation will not manifest until the temporal offset 820 is exhausted at time 813. At time 813 the temporal offset 820 expires and the 'start' event is sent to the annotation. This annotation has a manifestation delay 'MCD delay' 830 specified in the MCD. This delay means that even when the start event is sent at time 813 the annotation does not manifest immediately but delays for the time interval of the MCD delay 830. Only once the MCD delay 830 is exhausted at time 814 on the elapsed time of the annotated page object 810 does the annotation manifest. The annotation continues to manifest until it terminates at the manifestation end point at time 815 on the elapsed time of the annotated page object 810 after an annotation manifestation interval of 840. This termination of the manifestation at time 815 on the elapsed time of the annotated page object 810 overrides the default behavior described above (to continue manifestation until the annotated web page changes). Such an override of the default behavior may, for example, result from an MCD specification of the duration of the manifestation interval 840 or it may be determined by the 'stop' event being sent to the annotation.

It will be noted that, as described, there can be two ways to trigger the 'stop' event. The first one actioned will cause the manifestation to end, subsequent 'stop' events have no effect. This is also true for the general case of multiple 'start' or 'stop' events.

Using only the MCD to specify a start delay does not work in all cases as the delay is applied identically to all associations that link to the 'start' event and there are circumstances when this may well not be what the user wants. Hence those skilled in the art will recognize that the described architecture, which also supports temporal offsets, offers valuable functionality.

Annotation Persistence

All data for annotation sets may be saved to the server so that annotations may be searched, browsed, shared and retrieved and reconstituted on the annotated web page.

Annotation Sharing

Annotations may be saved with permissions which allow sharing. Hence groups of users may access annotations or the annotation may be made publicly visible. The permissions may be set to allow members of the specified group to modify the annotation and either save within a new annotation set or save back to the original annotation set.

Once an annotation set has been created and saved to the server, it is considered a 'template' for manifestation on future instances of the annotated web page. Each such manifestation is an 'annotation instance', it is allocated a unique ID which allows communication between annotations instances. Such communication could, for example, be used to support shared activity such as chat or co-operative drawing.

Alternative Implementations

It will be recognized by those skilled in the art that there can be alternative implementations of the above described modules and associated data structures. For example, rather than a triple which references the content, one could implement a 4-tuple which includes the content, or even a 5-tuple which includes the content and data about the target page and page objects. It will however, be recognised that such alternatives which embody the ideas of content and targets linked by association do not differ materially from the described implementation.

In another example of an alternative implementation, rather than modifying the behavior of the annotation content with MCD, such control could be implemented by other means, such as the use of control annotations. It will however, be recognised that such an alternative implementation strategy does not differ materially from the functionality embodied in the described implementation described.

Program Components

The browser extension with which the user interacts to create annotation content and place it on a web page consists of three co-operating modules. These modules are the 'core module', the 'semantic analyzer module' and the 'annotation module.'

The 'core module' provides functionality that is persistent from the time of installation of the browser extension although it may be modified by software updates. Such modification may be to fix software bugs or to extend and/or reduce the functionality of the core module. The core module is written in a programming language appropriate to the browser (such as JavaScript) and uses browser specific APIs (such as Mozilla's XUL—XML User Interface Language and XPCOM Cross Platform Component Object Model—for the Firefox browser) to access browser services.

The core module provides multiple functions. It is the primary interface to the browser, the operating system and communications capabilities for the other browser extension modules and delivers general purpose annotation functionality which is accessed by means of the Core Application Programming Interface ('Core API'). The Core API provides a single interface that hides the detail of the various client operating systems and browsers. Furthermore, dependence on the API of a particular client operating system such as Microsoft Windows or MacOS, or of a browser such as Microsoft Internet Explorer or Apple Safari is thereby localized facilitating program portability.

The core module implements common user interaction policies; provides layout management for annotations; co-ordinates communication between all other modules; provides annotation manifestation management; handles event management; allocates system resources, executes Annotation Access Protocol (AAP) handling (see below) and manages the save and restore of the annotations. All user interaction to place, attach, move, resize and delete annotations is handled by the core module. This ensures consistency of the program user experience. Layout management ensures that effective use is made of the browser display area and allows a user to re-position annotations when permitted. For example, page attached annotations could be stacked vertically down the right or left hand side of the browser display area and other annotations kept close to their attached object.

The core module allocates an identifier to each placed annotation. This identifier, unique within the set of annotations placed on the web page, is used by all modules to refer to the annotation when making API calls and is included in the data payload of events associated with the annotation. Other modules make requests on the core module using its API. Depending on the nature of the request, the core module may respond synchronously or asynchronously via the annotation event mechanism.

The 'semantic analyzer module' comprises an extensible set of 'semantic analyzers.' There may be more or less such components in the module. The purpose of semantic analyzers is to undertake semantic analysis by analyzing page content and structure to identify targets and generate target points. This is a two stage process and each stage is undertaken by a specialist sub class of semantic analyzer:
1. 'structure analyzers' identify candidate targets
2. 'content analyzers' refine or filter candidates When an annotation is first created, it is a structure analyzer that determines which page objects are viable candidates for annotation with the selected tool. When a candidate is selected it is the content analyzer, with its specialist knowledge of that target type, that enables the user to refine the target point.

When an annotation is subsequently manifested it is a structure analyzer that uses target locating data to identify candidate targets to which the annotation may possibly be attached. The structure analyzer then passes the set of viable candidates to the appropriate content analyzer which uses target locating data to filter the set to find the candidate target object and then uses its expert knowledge to generate the target point.

The structure analyzer discovers candidate targets based on:
1. the type of page object to which the annotation is to be attached.
2. the structure of pages of a particular web domain (e.g. facebook pages).

The generic structure analyzer can analyze any web page by mining the DOM to extract the set of XML element nodes which contain page content and thereby identify candidate targets by type.

Because all web pages are collections of objects of various types, analyzers may be written which understand such objects. Knowledge of any type may be embodied in a structure or content analyzer.

Specialist structure analyzers may be constructed with knowledge of the structure of a specific web page; for example the page www.zzz999.com. Such analyzers use their knowledge of the web page to identify collections of page objects as potential targets; for example, a news feed might comprise a <div> element enclosing several <p>, <img> and other elements. Such page object collections, forming a subtree of the web page document, are given a type which identifies the collection and allows selection of an appropriate content analyzer. Such types, that represent the structure and hence relationships of collections of document elements, are 'system defined types'.

Hence, it will be understood by those skilled in the art that structure analyzers may operate on both media types and system defined types (hereinafter 'type' or 'types'.)

Specialist content analyzers can embody knowledge not just of the types of objects included on a page (directly or by reference) but of the object's source to implement more detailed analysis of the content than would otherwise be possible. For example, a text content analyzer tied to www.zzz999.com (the source URL) could use its understanding not just of the text type but also of the detailed formatting of phrases, sentences and text blocks of the source to provide targets that have a semantic meaning within the context of information related to the page www.zzz999.com. It could, for example, understand that a particular phrase is not just text but is a news feed. All content analyzers have knowledge of types and (if relevant) sources and each such analyzer may be said to 'understand' its target object type and (if relevant) sources.

Using its above described specialist knowledge of the candidate type the content analyzer takes the set of candidate targets from the structure analyzer and refines targets down to the smallest appropriate piece of content, where 'appropriate' is an attribute of the semantic content analyzer. This could be a single word or phrase in the case of the default text semantic content analyzer, a single pixel in the case of the default image semantic content analyzer or a specific frame in the case of a video semantic content analyzer.

No matter how large or small the piece of content identified by a content analyzer, a distinct point is required for spatial association. The content analyzer is responsible for determining an appropriate spatial location for the piece of content. This could, for example be the center of a word or image, the top left corner of a paragraph, the 'centre of gravity' of a phrase that runs over multiple lines, and so on. Hence the content analyzer generates the target point.

During annotation create (with a human user), the content analyser uses visual feedback to interact with the user in refining the precision of the target and, hence, to generate a target point. The feedback mechanism is either a default provided by the core module or a specialist method implemented by the content analyzer.

The semantic analyzers play a critical role in the provision of semantic integrity because once the target point is generated by the semantic analyzer in the first instance the core module can calculate the association offsets from the annotation point and thereby specify the spatial and/or temporal relationship between the annotation and the target. This association is reproduced in subsequent instances of the document so that when the annotation is manifested in subsequent instances of the document the user's semantic relationship is maintained i.e. the annotation has semantic integrity.

The core module embodies a semantic analyzer factory that matches and instantiates the appropriate semantic analyzer as required by other modules. Semantic analyzers are loaded into memory as necessary. The specialist services of the semantic analyzers are provided via the Semantic Analyzer Application Programming Interface (SA API). The core modules instantiates structure and content analyzers as appropriate during annotation create. Annotation tools may also use the SA API to create additional targets and hence to implement multiple associations.

The semantic analyzer module (1) separates the logic for such association from the annotation—i.e. each annotation does not have to provide an implementation of semantic behavior, and (2) supports extension of the semantic behavior of such associations by downloading new or improved semantic analyzer components.

The invention provides a set of semantic analyzers covering a range of types and sources. Some are specialized by content and others by structure. This set, and hence the functionality of the program, may be extended by interacting with the server and downloading and installing further semantic analyzers. In like manner, semantic analyzers may be updated to fix bugs or enhance functionality. Those skilled in the art will recognize that new types and sources may be readily supported by writing new semantic analyzers. Whilst a given implementation of the program will not support all types and sources the ready extensibility of the described program architecture means it is, in principle, possible for the program to do so.

The 'annotation module' is the set of 'annotation tools' (hereinafter '(tools)') There may be more or less such components in the module. Unlike the core module, which delivers general purpose functionality, or even the semantic analyzers which are more specialized but most of which nonetheless embody knowledge of general applicability (e.g. a given semantic analyzer may provide services to many tools), the tools are more specialized. Each such tool implements a particular style of annotation.

Each annotation tool has configuration information which includes: unique identifier, name, icon, default target specification (optional), default annotation point, default manifestation control data, target type selector (optional), page source URL pattern (optional), page object URL pattern (optional). The server is responsible for allocating the tool identifier when the tool is registered. This configuration information is used to filter the applicability of the tool on the displayed page. The type selector specifies a set of web page object types that are candidates for annotation by the tool. It may be empty, in which case any visual page object, including the page itself, is a candidate for annotation. The page URL pattern is used to determine whether or not the tool can be applied to the current page—if the match fails, the tool is not made available for selection. The page object source URL pattern is used as a filter for page objects whose content is not contained directly within the displayed web page. If the match fails, the page object is removed from the set of candidate targets. If application of the page object source URL pattern results in an empty set of candidate targets, the tool is not made available for use. It will be recognised that there are many techniques for pattern matching on URL strings and choice of a particular technique is not material to successful implementation of the embodiment.

A tool is itself a set of components comprising the 'icon', the 'editor,' the 'media' and the 'helper'.

The 'icon' is a graphic element that represents the tool in menus, such as the user palette, and onscreen during the annotation process. The icon depicts an image to remind the user of tool functionality. The icon may be created by any one of the many available graphics programs. An open source example of such a program is GIMP. A widely used proprietary such program is Adobe's Photoshop. All tools in the described implementation have an icon although those skilled in the art will recognise that there are alternative means to refer to tools and that such alternatives are not material to the invention. Icons are used by human users to interact with the program but computers accessing the program programmatically by means of the Annotation API do not interact with icons.

The 'editor' implements the distinctive annotation capability of the tool. It creates the annotation and embodies tool specific user interface functionality. Hence, for example, if the tool is a paint program the editor implements the program's characteristic ability to execute paint operations. The editor is required only during creation and editing of an annotation. Should the user choose to modify an annotation then, assuming he has the necessary access permission, the appropriate editor is re-loaded into memory. If the media (see below) consists of a single non-revisable image (aka clip-art), then an annotation editor is not required. There is a distinction between editing an annotation and handling an annotation. The only program that ever edits an annotation, manipulating its content, is the editor. In the case of a visual annotation it may be said that the editor owns the canvas on which the annotation is created.

The 'media' is a collection of pre-created media objects from which the user can make selections to annotate web pages or will be used by the editor to assemble the annotation. Examples of such media objects would be a clip-art image of a speech balloon, a vector graphic element or a Flash movie element. Such media may be of many types and may therefore be created in many ways. A graphic image may be created using programs such as GIMP and Photoshop. Audio media may be a recording captured by a program such as Audacity's Audio Recorder. A video media object may be created using a program such as Apple's iMovie or it may be a URI reference to media on a website that hosts videos, such as www.youtube.com. An image may be a link to a website such as Flickr or may be an image file downloaded from a camera or phone in a format such as JPEG. Media objects may also comprise multiple media types either precomposed into a multimedia object or provided as individual items for composition by the editor. Those skilled in the art will recognize that many programs can be used to create many types of media objects and that such objects, however they may have been created, may be subsequently imported into and used by the program. There is a distinction between media which is revisable and media which is not. A notelet, for example, is revisable; users may type text into such an annotation. A piece of clip-art is typically not revisable; it may be handled but not edited. Tools that exclusively use non-revisable media will typically not use the editor. Not all tools include and use media.

The 'helper' component renders the annotation using non-revisable media or data created by the editor and is required for both creation and later display of the annotation. It also co-ordinates with the layout manager component of the core module to determine the positioning of the annotation. The helper specifies constraints determining how the annotation can be moved and/or resized and redraws the annotation if it is moved or resized, invoking the editor as necessary should the move or resize require changes to annotation content. The helper may render annotation content of two or more media elements in a sequence implemented by the helper. By this means the program can, for example, provide a visual animation or implement an audio playlist. Such annotation sequencing and control is enabled via the annotation event mechanism: the core module can provide timer events when so requested by the helper; the core module can also send named events when it enables, disables or moves an annotation; helpers can also generate events which may be consumed by other annotation helpers. A special type of tool, a control tool, has neither visual nor non-visual content. Its helper responds to and issues events to affect the behaviour of other annotation helpers as described above.

The separation of functionality between editor and helper ensures minimum browser memory space use for a user viewing annotations. This division of responsibility between 'editor' and 'helper' is:

1. editor
   a. interaction with the user to create and revise the annotation content
2. helper
   a. render the annotation within the area specified through negotiation with the core module;
   b. specification of annotation association constraints (if any)

It is possible for all tools to directly embody expertise of types. For example, tools that annotate text blocks could incorporate knowledge of text objects. The described implementation however places such common expertise about text objects into content analyzer(s) which are accessible to any number of such text annotation tools. Similarly, content analyzers for other media types encapsulate expertise about those media types. By this means the specialized knowledge about a given type or source may be made available to whole families of tools. This eases maintenance and the development of tools.

The invention provides for a set of tools covering a range of annotation media types and styles. Some tools can create content which may be used to annotate any type of page object e.g. notelets. Other tools can only be applied to specific content or specific web page(s) by using specialist knowledge of particular source URL content. For example: a text highlighter can only highlight text; an eBay auction notelet uses its specialist knowledge of eBay web pages to extract auction listing content to pre-populate notes for annotation of eBay auction pages.

The program includes a set of tools, suitable for annotating different types of content in different styles, and which are loaded into memory as necessary to support user annotation requirements. The invention provides for the development and integration of further such tools; they may be downloaded and installed by interaction with the server functionality. The ability to integrate add-on functionality as required by means of dynamically loaded annotation modules enables the program to support a broad range of annotation media and associated annotation techniques whilst managing the memory footprint of the user's browser. Furthermore, as will be recognized by those skilled in the art, the design of this embodiment enables the future integration of presently unanticipated annotation media types and techniques by means of new tools.

The invention enables the development of novel tools which are unknown in the prior art. For example, a tool which allows a user to pull a 'query' object onto any page on the web, ask a question about specific page content about which he may be unclear, and to publish that query to a group or set of groups. Such groups could include a study group, or it could be a social search engine such as www.quora.com which harnesses the intelligence and knowledge of people with access to the web. Replies to the query would automatically be routed back to the annotation and the user would see them displayed as answers to his query. By this means collective intelligence may be brought to bear across all content on the web.

It will be recognised by those skilled in the art that the support for annotation tools provides a framework for, and the pool of annotation tools provides a realization of, a means by which the program may receive annotation input data constituting annotation set content for annotating targets in web pages. It will be further recognized that the combination of such annotation tools, the Annotation API and the Core API represent a comprehensive means by which the program may receive input for modification of existing annotations or receive input for the creation of new annotations.

Tools access the core module and the semantic analyzers by means of the Core API and SA API respectively. The browser extension accesses operating system services, such as file access and communications, by means of the browser API thereby insulating the browser extension from the details of the various system call interfaces of the various operating systems.

Because the core module and semantic analyzers provide the functionality required to support semantic integrity, the burden of providing semantic integrity functionality when writing a new tool is eased for the developer. For example, the tasks of selecting and refining targets, evaluation of association offsets, re-finding targets and displaying annotations in accordance with their targets and associations is handled by the core and semantic analyzer modules. The tool developer need only access such functionality through the Core API and SA API.

Server functionality is implemented by storing all annotation set data in a backup store such as a database along with supplementary information about the annotation set in question. Examples of such supplementary information are: the URL of the web page associated with the annotation set; tags describing the nature of the annotation; and access control permissions. The server provides a set of programs to manage and access this data. The server allocates a unique identifier to the stored annotation set: the Unique Set Identifier (hereinafter 'USI'). This unique resource identifier enables:

the annotation set creator to later access, download and update the set or to delete it if required
annotation set sharing
annotation set linking Linking annotation sets implements a linked annotation space 'on top of' the world wide web. Hence, in much the same way that users on the world wide web may navigate from web page to web page by clicking on displayed links, users may navigate from annotated web page to annotated web page by clicking on displayed annotation link objects (a web page <anchor> element with a USI as its 'href' attribute value). If, for example, a user is on the page www.zzz999.com/123 and actions a USI link on this page then the user's browser will change the displayed page from www.zzz999.com/123 and will instead display the web page and associated annotation set referenced by the USI. This linked-to new page with its annotations could be any properly addressed web page with its annotations e.g. www.zzz999X.com/345.

Figure 16:
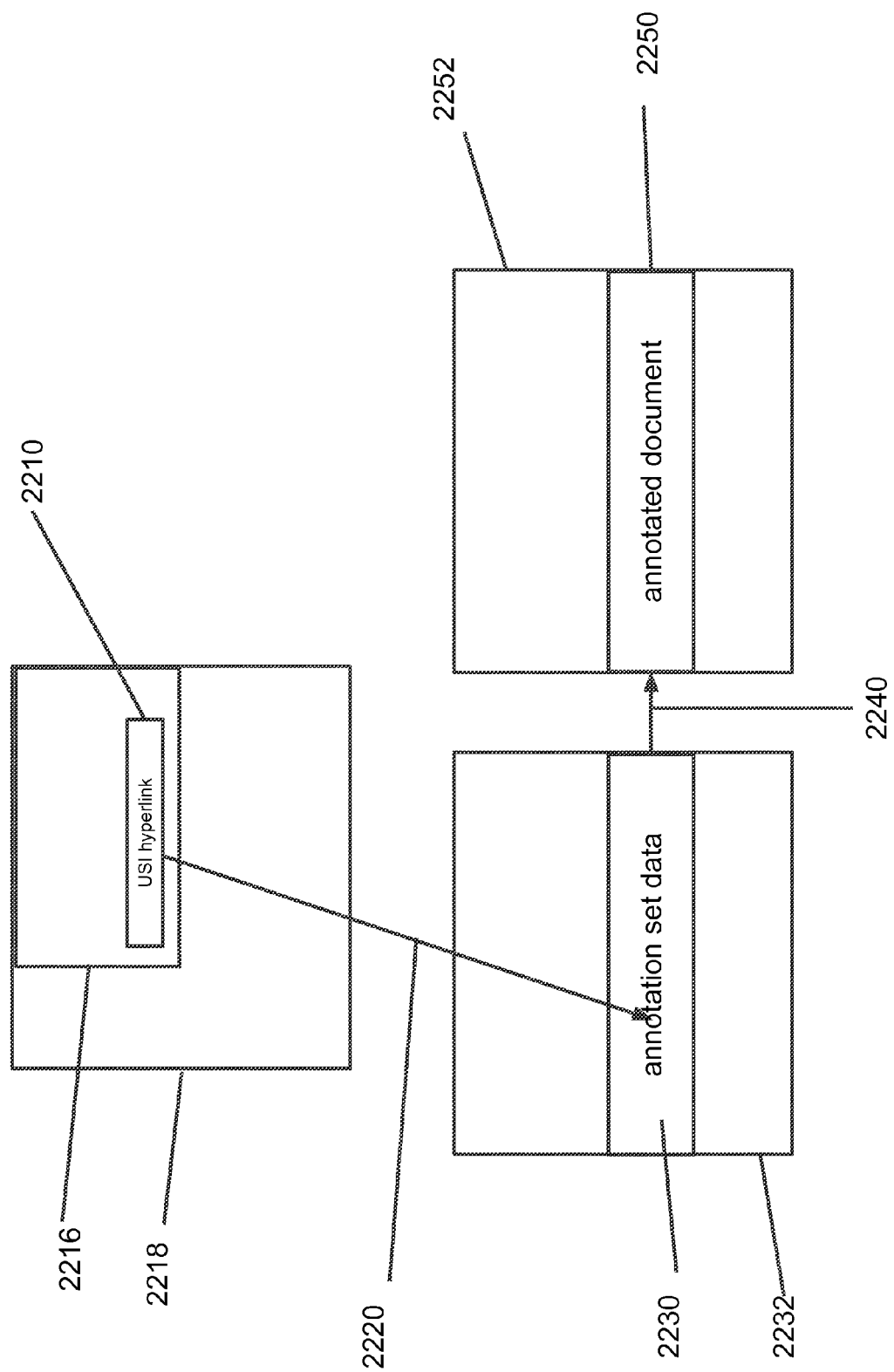
FIG. 16 is a depiction of the relationship between a USI hyperlink, the annotation set data, and the underlying document data according to one embodiment of the present invention.

FIG. 16 is a high level representation of the relationships between a USI anchor 2210, the annotation set data 2230 it refers to and the annotated document 2250. As the USI is a resource identifier string, just like a URL or URI, it may be used as the target of a hyperlink (HTML element <a>). Thus, USI anchor 2210 is an HTML <a> element embedded within web page object 2216 on web page 2218. The USI hyperlink destination is a reference 2220 to annotation set data 2230 in an annotation store 2232. The annotation set data 2230 includes a reference 2340 to the annotated document 2250 held in document store 2252.

Such annotation links use the same universal resource name format as web pages but with a unique scheme name to identify the protocol for retrieving web pages and associated annotation set. The 'Annotation Access Protocol' or 'AAP': for example the USI string would be of the form: aap://annotation_set_id. The core module installs a handler for the 'aap' scheme so that any reference to a USI is handled by the program. It will be recognised by those skilled in the art that a different scheme name may be used without compromising the architecture and that the scheme name must be registered with IANA (the Internet Assigned Numbers Authority). Traversal of an 'annotation link' is actioned by an annotation helper either as the result of user interaction with the annotation content or on receipt of an annotation event. The core module uses the USI to refresh the browser display with the referenced web page and immediately displays the annotations from the annotation set.

Those skilled in the art will recognize that the functionality whereby the program stores and manages information on the server represents the 'model' in the Model View Controller (MVC) architecture. The annotations model may be accessed by multiple controllers and the results displayed by many views. For example, annotations may be searched and retrieved and the results used in many ways, subject to access control. They may, for example, be forwarded to a user's computer to be displayed by the browser extension module, they may be displayed on a website (this view does not require use of the browser extension), they may be made available as a feed to other programs, and they may be analyzed and statistics abstracted for later display. By this means, annotations may be shared and commented on and may thereby become 'social objects', a term of art familiar to those skilled in the art.

It will be familiar to those skilled in the art, that the term 'server' may refer to a single computing device supporting all software required for provision of the necessary functions and it may also refer to a cooperating distributed network of computing devices each of which supports one or more of the required functions. The topology of the server implementation is not material to the feasibility of the invention.

It will further be recognised by those skilled in the art that whilst the program implementation describes program modules and components which are not only logical functional blocks but are in some cases discrete modules which may only be downloaded and integrated as needed it is perfectly possible to build alternative implementations which embody the described functionality but which do so in a more tightly integrated manner. Such integration can extend from combining semantic analyzers and helpers up to and including a version of the program in which all the described functionality is embodied in one huge program and in which case extending the program is done by updates to said monolithic program. The implementation described in detail here has advantages in terms of modularity, ease of maintenance, browser memory management and ease of extension and updates but such alternative implementations, employing the ideas described, whilst not novel or different in terms of core functionality, are perfectly feasible.

Program Operation

It will be described below how to install the browser extension, how to enable it, and how it is used and configured. It will further be explained how it operates and how its component modules cooperate to create, edit and attach an annotation set to a web page and how the browser extension cooperates with the server to save, retrieve and restore, and share annotation sets with semantic integrity.

(It will be appreciated by those skilled in the art that the description below focuses on the interaction between a human user and the program. It will further be appreciated that much such interaction is not required when a computer program user accesses the program and the annotation data structures by means of the Annotation API.)

At this point it is helpful to elaborate further on the notion of semantic integrity and the related notion of semantic analysis. Semantic integrity is derived from the spatial and/or temporal relationship of the annotation manifestation content to other page objects. Specifically from the relationship between the annotation content and the target. The program is designed to capture the semantic relationship which defines the location of the annotation in space and/or time so that it many be reproduced (and the user's intent thereby reproduced) in subsequent instances of the manifestation of the page with the annotation. To this end the program determines the target and hence the association between the content and target by content and structure analysis. This process is described hereinafter as 'semantic analysis' and program modules which perform such analysis are the above described 'semantic analyzers.'

Semantic analysis as described herein is the process whereby, when a user creates or edits an annotation and interactively specifies the annotation's target, they thereby express their intended semantic relationship between the annotation content and the underlying web page. The program analyses this relationship between manifested annotation content and target to enable the program to thereby capture the user's intended semantic relationship and reproduce this relationship in subsequent instances of the web page, thereby enabling the manifestation of subsequent annotations with semantic integrity. The results of semantic analysis are encapsulated within the Target Locating Data and stored as part of the Annotation Data.

Semantic analysis in the context of the program always involves the analysis of content to determine the association. It is thereby distinguished from any alternative indirect method that locates an element within the structure of a document. For example by means of capturing an element's xpath on the DOM tree. Such an approach uses the relationship between elements in metadata as a proxy for the actual relationship between manifested content. As those skilled in the art will appreciate, this approach may be successful for some pages but because the association is derived indirectly—the approach does not analyze the relationship between annotation content and target but rather between elements of metadata—it is susceptible to a class of errors arising from modifications to the page structure or modifications to object content and furthermore, it cannot address temporal association at all. Such an indirect approach, which undertakes no semantic analysis, can at best find the same node on the DOM tree as returned by evaluation of the xpath expression, and hence cannot be said to be providing semantic integrity in the sense described herein.

It will be recognised by those skilled in the art that whilst it is possible to take a copy of a web page, annotate that copy and then on request re-manifest the copied page with its annotation, such an implementation cannot address the challenge of web pages themselves changing. The annotated page displayed in the later instance is not the necessarily the page which would be displayed at the URL of the original instance of the page and indeed this page may differ radically in layout and content. Hence such an implementation cannot reliably annotate changing web pages and does not realize semantic analysis or semantic integrity as described herein.

Setup

The browser extension core module may be downloaded over the interne and once installed it adds a 'program icon' to the browser's 'Tools' or 'Options' menu bar. Those skilled in the art will know that the toolbar is known by different names on different web browsers but that such different naming conventions are not material to the operation of the program.

Selecting the program icon gives the user access to the program menu which offers top-level configuration options allowing him to: a) enable or disable the extension, b) provide user authentication information (login to the server) and c) access authorized server hosted support resources e.g. profile pages.

(a) Enable Program

When the user selects the program icon and selects 'enable program' from the program menu the core module undertakes the following actions to set up the program in readiness for the user to annotate: if the user is not already logged into the system the user logs in to authenticate himself and thereby gain access to program controlled resources. If the user does not already have an account on the server, he is prompted to create an account. Those skilled in the art will recognise that a variety of techniques are commonly used for creating and validating user accounts and for authenticating user logins and the technique employed is not material to the nature of the embodiment. The server allocates a unique identifier to the user's authenticated annotation session. This identifier is used whenever the core module communicates with the server and for inter-program communication. The core module then displays the annotation icon in the browser display area. This annotation icon provides access to the available annotation tools, a list of annotation sets that have been saved for the current page and for which the user has access and also to any annotations created by the user on the current page. The annotation program is now enabled and awaiting further user input. The user may disable the program at any time by selecting 'disable program' from the program menu. When disabled, the program no longer supports any annotation interaction nor does it communicate with the server.

The program menu also implements a 'configure' item which, when selected, provides access to the program configuration dialog. Program configuration data includes: user login name and (optionally) password; whether the program should auto-login when enabled; whether the program should auto-enable on browser startup; whether annotations should be auto-saved when added or modified; whether the user should be prompted when leaving a web page on which there are unsaved annotations.

The program menu also provide access to shared annotation sessions. A shared annotation session allows multiple users to co-operate in the creation of and interaction with annotations. Hence, for example, users Tom, Dick and Harry could view the same displayed web page with its associated manifested annotation set and could further cooperate in creating, editing or deleting annotations. This group of users may then save such an annotation set for later retrieval and restoration. At this point the group may jointly determine what the access control permissions are for such an object that has been cooperatively created.

Creating a shared annotation session causes the server to create a unique identifier for the session (hereinafter the 'share ID') and allocate a data set on the server to track session members. The share ID comprises a human readable string and it may be sent via any means to collaborators. The program menu also offers the ability to join active sessions using the share ID. Additional security for joining shared sessions may be implemented to avoid access by uninvited participants and those skilled in the art will recognise that there are many such authentication mechanisms and choice of any mechanism is not material to the validity of the embodiment.

The core module enables annotation auto-save when participating in a shared session. Annotations are saved to the server as soon as they have been attached. Annotation synchronisation is effected using messages sent from the server to all session participants. Annotation events are also distributed among session participants. As will be appreciated by those skilled in the art, such shared annotation may be implemented by such means as publish and subscribe messaging or a synchronous shared whiteboard but the selected mechanism is not material to the validity of the invention.

(b) Use Program

When using the browser extension the user may browse from page to page, annotate displayed pages and save such annotations. We describe this process below.

When enabled, the core module creates an annotation set container (hereinafter 'container') corresponding to the currently displayed web page. As the user annotates the page this container will be updated with information about the annotation set. Each tool creates an annotation data object (hereinafter 'annotation object') containing annotation content and related annotation data and the container supports objects generated by all tools.

Figure 9:
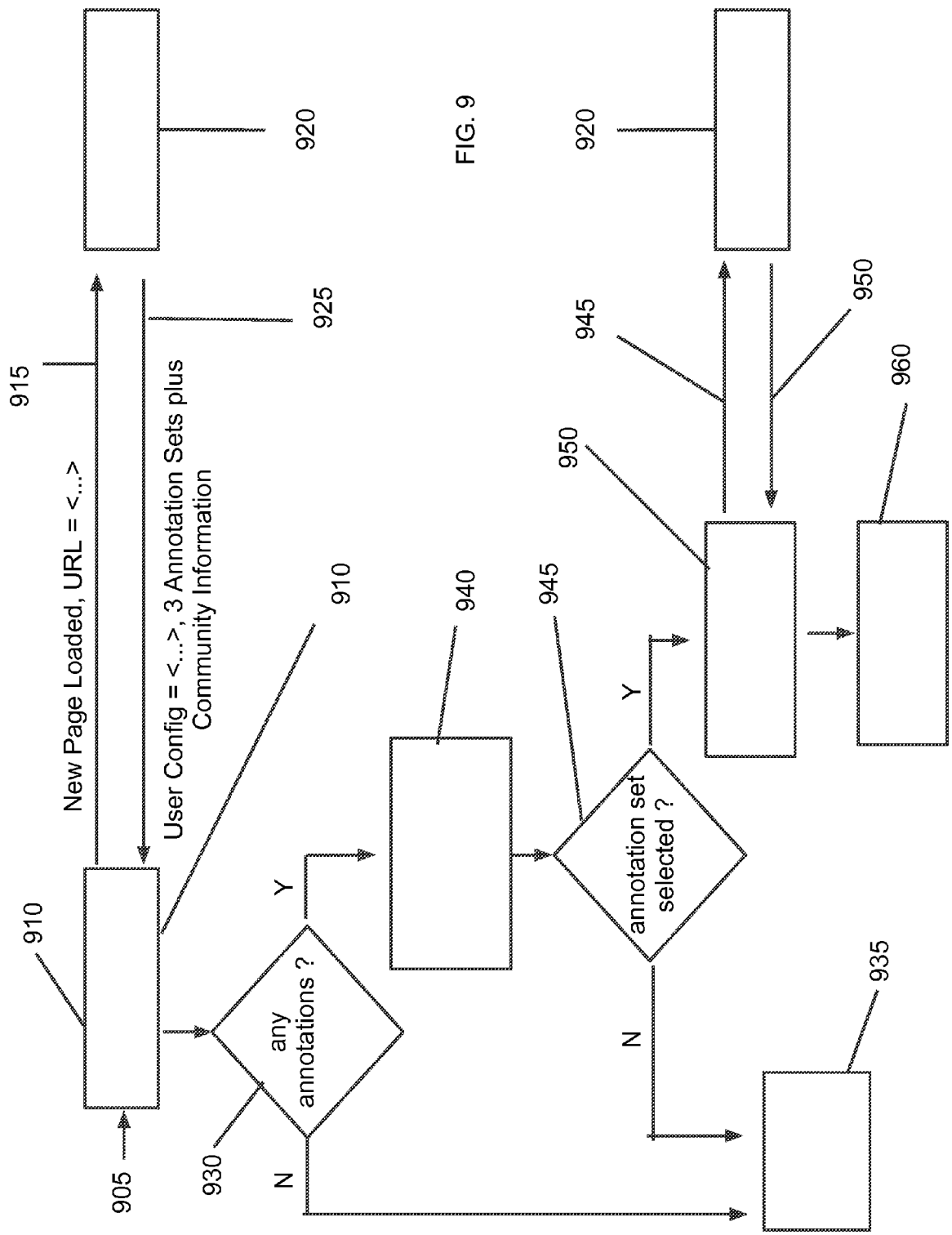
FIG. 9 is a flowchart depicting a high level view of the program's restore process according to one embodiment of the present invention.

FIG. 9 is a flowchart depicting a high level view of the program's restore process. Whenever the user displays a web page, e.g. by browsing to a new URL, or by clicking on a hyperlink in the currently displayed web page a page load event 905 is generated. This event is detected by the page load event handler 910, a component of the core module and the page load event handler 910 makes a call 915 to the annotation server 920 requesting (a) the user's current program configuration and (b) details of any annotation sets saved for the loaded web page which the current user has permission to access. The annotation server 920 transmits a response 925 with the requested configuration data and data about annotation sets with any associated community information on the current page that the current user has permission to access. Community information could include, for example, data as to which annotation sets were created by friends, which are the most recent, or which are the most popular in the community. Receipt of the response 925 initiates a process: the initial step 930 of this process determines if there are any annotations for the page. If there are no annotations the process terminates and the program awaits further input at 935. If there are annotations then the program displays a list of the annotations with any associated community information 940. Step 945 determines if the user has selected an annotation set for display. If the user has not selected a set then the process terminates and the program awaits further input at 935. If the user has selected a set then the program generates an annotation set data request at step 950 and transmits the request 945 to the annotation server 920. The annotation server 920 transmits its response 950 containing the requested annotation set data. The program then manifests the annotation set on the current web page at step 960 and then awaits further input.

If response 925 above from the server indicates that the user's program configuration has changed, e.g. through acquisition of additional tools or because of bug fixes or other updates to a program module, the core module makes further calls to the server to request the new or updated components. The server response is handled asynchronously to avoid delaying user interaction. By this means, for example, successfully downloaded new tools may be presented to the user on his next program menu access.

By means of the above described process, if there are saved annotation sets to which the user has permission to access the program can list them for the user and, if requested, display them. We now describe the creation of a new annotation set.

(c) Annotate

Whilst the implementation described below makes use of discrete activities cooperating to perform the annotation, it is perfectly possible to combine all these activities into one monolithic module, or otherwise distribute the functionality described into activities with a different division of labor than those described here, but those skilled in the art will recognise such a redistribution of the described functionality does not differ materially from the described implementation.

The process of creating an annotation with which to annotate a web page comprises five discrete activities: create, edit, handle, attach and (optionally) delete. Tool selection generates a new unique annotation object with an initial target as determined from any default target specification in the tool configuration information. As the editor is used to create annotation content, data about that content will be generated and will further populate the data object.

The full cycle of creating annotations prior to saving includes at least create and attach, which determines the target (the default may or may not be overridden by the user). The annotation association data is initialized by the core module using constraints provided by the helper. The user may change the annotation association data as required by moving the annotation in which case the core module recalculates the association data. Once an annotation has been created, attached and possibly handled other annotations may be created by repeating the process thereby creating a multi-member annotation set. Annotations and the annotation set may be deleted at any time by the user. The layout on the page of multiple annotation sets is determined in the first instance by the user but is subject to policies managed by the 'layout manager', an element of the core module. Create is always the first action and delete always the last; edit, move and attach may be invoked at any stage during the process. We shall now discuss the steps of annotation creation in more detail.

(c)(1) Annotation Create

When the user selects the annotation icon in the browser display area the core module detects the event and displays the annotation menu. A palette of available annotation tools is either contained within or accessed from the annotation menu. The annotation icon and user palette may, for example, be positioned at the bottom border of the screen, but it will be appreciated by those skilled in the art that neither the location of said icon, annotation menu and user palette nor their display criteria, nor their 'look and feel' are critical to the feasibility of the invention. The palette displays a set of icons representing the tools available for the user to annotate the currently loaded web page. Such icons may be displayed in accordance with various criteria. For example, favorites at the top level and additional tools via sub menus. The favorites collection could be determined by either user choice, recent use or frequency of use. If a tool cannot be applied to the current page—e.g. if no page objects match the tool's type selector or the page URL does not match the tool's page source URL—the icon is grayed out and the icon cannot be selected.

The user initiates a tool by selecting its annotation icon from the user palette. He may, for example, use a computer mouse device to drag the icon from the palette onto the browser's display area or he may click to select the tool and then click on the browser display area to place the annotation. When the user selects a tool the core module detects the event and instantiates the tool.

By whatever means, the annotation is placed and the helper is invoked to provide an initial annotation content, which may be blank, plus:

initial distance of annotation point from and position relative to the target optional maximum and minimum distance of annotation point from the target whether the annotation may be moved relative to the target whether the annotation can be resized As noted above, the invention enables annotations to be attached to (a) the whole page (b) a page object, (c) a collection of related page objects (d) a region of a page object (e) a region which spans a collection of related web page objects or (f) a point within a page object. From the moment of its creation an annotation is always attached to one of these targets. The program provides a default initial target appropriate to the type of the object being annotated. This initial target may be changed or its precision may be refined by the user by interaction with the core module.

To refine the annotation content the user interacts with the editor. The editor controls the 'annotation space'. The nature of this space will vary from tool to tool. For example, for annotations with a visual representation the editor works on a virtual canvas which overlays a portion of the display; for an audio annotation the editor works on a visualized audio timeline; for a video annotation the editor works on a canvas and a timeline and for a control annotation, a control script is used to express the actions to be taken on receipt of events.

Whereas generic 'annotation create' interaction is handled by the user interface component of the core module, thereby enforcing maximal consistency of user experience, the tool specific interaction generating content in the annotation space is handled by the tool itself and may vary a great deal from tool to tool. The process of dragging non-revisable clip art onto the display area is very different from the revisable process of free-form painting; consequently, the editor and associated user interface of these programs will be different. Clip art, for example, is naturally placed using a drag/drop process, whereas free-form painting is more naturally associated with a select/move/select process (e.g. click mouse button to select drawing tool, move mouse to where user wishes to start drawing, depress mouse button and 'draw' by moving the mouse and finally releasing the mouse button to end the drawing path).

Whereas the above description focuses on the user experience, below we describe how the browser extension modules cooperate during the process.

When the user initiates tool use by, for example, dragging the tool icon onto the display area, it may be that the tool can annotate every type of page object. Alternatively however it may be that its applicability is restricted to a subset of the displayed objects. In either case the core module determines which objects on the displayed page are eligible targets for the content created by the tool by the following process—a software factory in the core module selects and invokes a structure analyzer in accordance with the following priority:

1. the structure analyzer specified in the tool configuration of the selected tool 2. a structure analyzer with URL match pattern; if there are multiple matches, then the structure analyzer with the longest match is selected 3. the default structure analyzer If, for example, the type selector in the annotation tool configuration specifies a type or types, hence indicating that the selected tool may only be applied to content of the specified type(s), then the selected structure analyzer uses the Core API to explore the web page structure and find all candidate web page objects—i.e. those containing content which matches the type selector specified in the annotation tool configuration. In such a case, where the tool's application is restricted, the core module provides visual feedback to the user as to which page objects are valid targets. The type of visual feedback is managed by the core module and may be, for example, a border around the object's outline, by altering the object's background color or by dimming inapplicable objects. Hence, if a tool such as a text highlighter (which can only operate on text objects) is selected then feedback will make it clear which page objects are text blocks and hence valid targets.

Annotation Handle

Once created, the annotation may be handled by the core module. The annotation may, for example, be moved or resized, its temporal relationship to the target may be edited, its position within the layering of annotations may be altered, or the use of events to control manifestation may be managed. In the case of visual annotations, such operations are typically made available by user gestures on the border of the content—directly in the case of moving or resizing the annotation and via a core module implemented dialog for temporal and event relationships. Access to annotations (visual and non-visual) is available via the annotation menu. Some aspects of the MCD may be manipulated by the user directly from the annotation menu, these include start delay, manifestation time, blink, fade in/out. Other aspects (e.g. attribute exposure and event handling) are better manipulated by the helper. The annotation helper may install additional menu items to provide simple user controls for handling these more complex aspects of the MCD. The core module provides menu and dialog management facilities to support the annotation helper with creation of such user controls.

The core module places a visual border around the annotation space and this border contains a number of special regions for directly resizing and moving the annotation plus a region that provides access to a core module menu or dialog for changing an annotation. Those skilled in the art will further recognize that there are many user interface techniques whereby the user may interact to change such information but that such variance is not material to the invention.

(c)(3) Annotation Attach

As stated above, all annotations, created by the user interaction described above, have an initial target which may be modified by user interaction.

Where an annotation may be attached to a page object target or to the whole page, the program must provided a mechanism for the user to select the page as target. Those skilled in the art will recognise that there are many alternative ways of allowing the user to signal that it is his intent that the target be the whole page. An example implementation would be to provide a 'page icon' on the toolbar onto which the user drops the notelet. Another example is the use of a 'modifier' key that, when depressed during the user's mouse gesture, modifies the attachment behavior to make the page the only available target.

An example of an annotation which may only be attached to the whole page is one for which the tool's type selector specifies a target type that does not have a visual representation (e.g. audio). In this case the core module makes the whole page the only candidate target object and dropping the annotation icon anywhere on the displayed web page results in the display of a list of all page objects matching the target type and discovered by the structure analyzer. There are multiple possible ways to display such a list e.g. via a pop-up dialog, or via the annotation menu accessed from the annotation icon. The user selects one of the page objects to annotate. In the case where the annotation itself is non-visual, there is no spatial annotation point or spatial offset. In the case of a visual annotation, the default semantic content analyzer sets the target as the whole web page and uses the origin (0,0) as the target point. The layout manager modifies the spatial offset to position all such annotations according to a policy, either default or selected by the user. Examples of such a layout policy are: stacked vertically down the left hand side of the page; cascaded starting from the top left corner of the page.

The description below covers the case of a visual annotation being placed onto a visual page object. The core module instantiates a content analyzer appropriate to the page object as soon as the annotation has been placed during creation and the initial target is set to a default for that type of page object.

If the user does not elect to refine the target, this content analyzer is retained and it will capture sufficient information from the whole page or page object to ensure that the annotation may be later restored.

To attach an annotation to a specific location within a page object e.g. a block of pixels within an image, the user elects to refine the target within the current page object. In this case the content analyzer is invoked again to support the refinement process. During target refinement, the user may choose to move the target to a different page object—another from the set of candidate page objects found by the structure analyzer. In this case, the core module discards the original content analyzer then selects and instantiates a new content analyzer appropriate to the page object chosen by the user. Those skilled in the art will recognise that there are many methods for invoking specialist behaviour on a graphical representation and selection of a particular user interaction method is not material to the validity of the invention. For example:

i. the core module may decorate the annotation with visual borders that support mouse driven interaction either via gestures on specific portions of the border or via a menu accessed via a click on the border ii. the target may be visually represented (e.g. using a crosshair icon) and moving the icon invokes content analyzer selection.

Once the user so elects, the appropriate content analyzer is invoked—i.e. the content analyzer which 'understands' the page object within which the target will be located. It is the content analyzer's specialist knowledge of the page object that enables it to provide the more detailed information about the object that makes selecting a target at any degree of resolution possible. At this point the user enters into a further interaction which enables him to drill down into the page object and select whichever subset of the object he wishes to serve as the target.

The core module provides default interaction methods for selection of targets on text and image page objects. Target selection is made in a text block using the mouse cursor to 'sweep out' the required characters, words or phrases which are highlighted to show the selection. Target selection is made in an image by using the mouse cursor to reposition the edges of the 'rubber band' outline which is initially co-incident with the image boundaries. Those skilled into the art will recognise that other techniques are possible. A specific content analyzer may provide a bespoke interaction method—for example, to select a point on the time line for an audio or video page object. Those skilled in the art will recognise that implementation of such a behaviour override mechanism is a well understood method of art.

Page object data not contained within the web page itself but rather included by reference requires the support of a special component (hereinafter 'manifestation component') to manifest the content. Most web browsers have built-in such manifestation components for common media types such as bitmap images and audio streams. Other media types require the installation of a software component to read the data and manifest the content in a form appropriate for the user—e.g., by directing audio to the operating system sound system and by rendering an animation corresponding to a video stream. Some such components require installation but at the time of writing are extremely widespread e.g. Flash players. Those skilled in the art will recognise a component of this kind as a browser plug-in which consumes the data (hereinafter 'data consumer') and that it may be downloaded and installed by interaction with the browser Setup or Option menu.

Content analyzers for such page object data that is not contained within the web page may choose to substitute their own data consumer in order to generate annotation events derived from temporal aspects of the data. This data consumer is active during annotation creation to analyze the data and later during the manifestation of the annotation to generate target timeline related events. For example, the target on an audio or video data stream could be defined as when a certain musical phrase, or scene in the case of video, appears. Those skilled in the art will recognise that several techniques are possible for implementation and location of such a data consumer. For example an intermediate data filter could be inserted into the data stream via URI re-write. Streamed object data is referenced on its source using a URI (Uniform Resource Identifier) and this URI is encoded in the page object element. The content analyzer modifies the page object DOM element to substitute the URI of its own player output and uses the original URI to access the streamed data and generate annotation events derived from analysis of the data. The data consumer copies input to output so allowing the page embedded player to work as it would do on the unannotated page. (Such a data consumer could be installed on the user's computer or could be implemented as a server function.)

Browser plug-ins may have a visualisation and user interaction mechanism which is specific to the particular plug-in. An alternative (or enhancement) mechanism to the data consumer substitution for content analysis is to interpret the visualisation of the data. Examples of such visualisation are: a) an audio player which displays the timeline as a moving bar with values above the bar showing the current and total play time and b) a video player which displays the scene name and/or number plus current and total play time. Those skilled in the art will recognise that there are several mature techniques for analysis of such an animated image in order to extract contextual information as data and that the architecture of the described embodiment supports selection of a technique appropriate to the particular plug-in. As such data visualisation is logically outside the browser, the content analyzer requires access to the picture elements (hereinafter 'pixels') corresponding to the computer screen location of the plug-in within the browser display area. This is possible because all operating systems provide a method for accessing the display buffer and the core module can implement an abstraction of the operating system native API. By this means a content analyzer may request, via the Core API, access to the operating system's display buffer so it may, for example, take regular snapshots of the pixels in order to perform image analysis. By this means semantic analysers may identify targets by direct analysis of the manifestation of the web page content.

Some styles of annotation, such as the drawing of a line or arrow, may demand the definition of more than one target, one for the start of the line and another for the end of the line. In this case the first target defines the start, the annotation helper then requests a new target by calling the core module to track the mouse again, another content analyzer is created, and the second target is analyzed as was the first.

Once the target is determined it serves as an anchor about which the user may move the annotation at will, subject to the association constraints.

To implement the above described functionality the program needs to know the location of the displayed cursor. Those skilled in the art will recognise that DOM events, some specific to particular browsers, are available for tracking mouse movement. By this means the core module can determine which web page object is under the mouse cursor using the DOM event mechanism. Objects within the DOM representation of the web page support an event mechanism allowing interested program components to be notified about operations on the object. By setting up handlers to monitor such events and analyzing the resultant information stream the core module determines which page element type the mouse cursor is over and where the mouse cursor is in relation to the page element boundaries. As the cursor moves, the core module constantly updates this information, recognizing, for example, when the cursor crosses page object boundaries and is over a new element. If the mouse cursor is not currently over a page object of interest, then events associated with the page body can be used to determine the nearest page object of interest. If the mouse cursor is not over or near a valid candidate web page object when the user terminates the attachment process, the annotation operation can be aborted. Those skilled in the art will recognise that whilst the above description describes a mode of user interaction with mouse and cursor, there are alternative models of user interaction, such as touchpad and gestures, which may involve different hardware, and that these alternatives also generate event streams that may be used to implement the program's functionality.

At this stage of the process the user has created the annotation content and by means of his interaction with the program and calculations made by the program, the program has determined all required related annotation data. The user has, for example, determined the target (page, page object, region or point in the case of spatial, and instant or instants on the timeline for temporal) and the program has therefore generated the target locating data; has resized or moved the content as necessary to settle the display location (and the program has derived the spatial and/or temporal associations and has interacted with the program to specify any event driven behavior.

(c)(4) Annotation Edit

Annotation content may be derived from the content of the page object being annotated. An example of this is text highlighting where the region selected on the annotated page object is decorated to make it stand out from surrounding text. Another example is a notelet annotation which is pre-populated with some or all of the attached region text. The editor uses the Core API to request the content of the attached region.

The editor may need to display additional user interaction elements—e.g. a paint tool palette. Those skilled in the art will recognise that there are many techniques for the implementation of such user dialogs and associating the manifestation of such dialog with user interaction within the annotation space. Those skilled in the art will further recognise that choice of such technique is not material to the validity of the described embodiment.

(c)(5) Annotation Delete

At any point prior to saving the annotation it may be deleted. This may be done either by explicitly accessing a command on the program menu, via the core module maintained annotation border or by abandoning the annotation by navigating away from the displayed page without confirming that the annotation set be saved (assuming that annotation 'auto-save' has not been enabled via the program menu). Furthermore, saved annotation sets may be subsequently deleted.

(d) Annotation Save

The user may now either save the annotation as-is or select another tool and repeat the above process to further annotate the page thereby adding another member to the annotation set. Each member of the set that has a visual representation may be thought of as a layer over the content. Similarly non visual representations may be layered, audio may for example by layered on audio. Annotations may therefore overlay annotations. The layout manager implements policies which determine how annotations overlay each other and the user may modify this policy by editing the annotation set data—e.g. via a menu accessed via the core module maintained annotation border. In the described embodiment the data for all annotations are held in memory and any annotation may be repositioned by selecting its representation on the browser display. The order of such overlays (front to back) may be changed by the user, as in graphics drawing programs such as GIMP, in a manner familiar to those skilled in the art. In such cases the appropriate helper and content analyzer are automatically invoked and a selected annotation may be moved to a new location or otherwise modified as permitted by the tool. Such further annotation steps may be repeated, until the user is satisfied with his work and elects to save the annotation set created on the page.

Once the user elects to 'save' by selecting an icon or menu item in the user interface, the stored state of the set of annotation objects may be saved to server storage. Should the user browse to a different web page, all data corresponding to the annotations on the previously displayed web page is deleted from memory. The user may choose to save the annotations before displaying a new web page. If the user does not save, the core module displays a dialogue pop-up window to ask him if he wishes to save his annotation. Annotations within a shared session are automatically saved by the core module as soon as the annotation has been attached and whenever the editor has changed the annotation content.

When the user saves the annotation set he does so with associated information that enables the program to search, browse, and share it. Examples of such information are permissions, which may be more or less permissive and are used by the server to control access to annotations, and tags which enable users to search and browse annotations.

Figure 10:
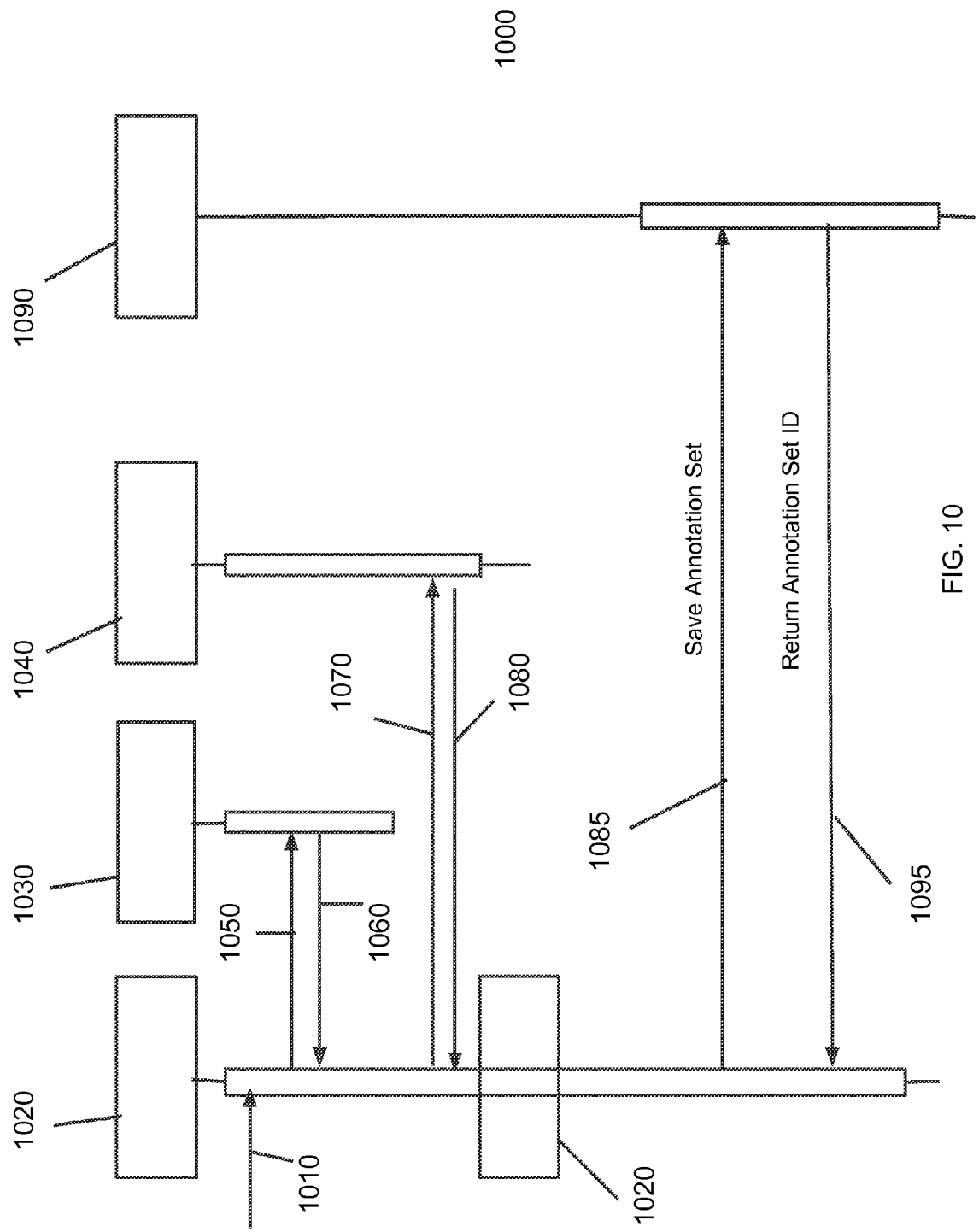
FIG. 10 is a diagram depicting the annotation save process according to one embodiment of the present invention.

The save is implemented by the core module and results in serialized copies of each annotation object state being transmitted to the server which allocates a unique ID to the annotation set. Each annotation triple has an associated structure and content analyzer. The internal state of these analyzer objects encapsulate the target locating data which comprises sufficient data for finding and restoring the target. FIG. 10 is a diagram depicting the annotation save process 1000. The core module 1020 receives an annotation set save request 1010 and sends 'save state' events (a) 1050 to the semantic analyser module 1030, and (b) 1070 to the annotation module 1040. The semantic analyser module 1030 serializes the state of all structure and content analyzers and transmits 1060 that serialized data back to the core module 1020. The annotation module serializes the state of all helpers and transmits 1080 that serialized data back to the core module 1020. The core module 1020 marshalls this annotation content data for all members of the annotation set, with all associated target locating data and association data, together with the annotation set attribute data, comprising such data as user credentials, web page URL, permissions data and tag data (annotation set attributes are described in more detail below), to the serialized component data and transmits the entire data payload to the annotation server 1090 as the annotation save operation 1085. The annotation server 1090 responds 1095 by returning an annotation set ID to the core module.

Those skilled in the art will recognise that there are many techniques for associating such state data, as embodied within the target locating data, with a module or collection of related executable code that manipulates the data; that the described encapsulation within an object is just one such technique; and that the choice of technique is not material to the feasibility of the invention. Those skilled in the art will further recognise that the term 'serialized' refers to a method of freezing the state of an object and converting it into a sequence of bits so that it may be stored in a file or memory buffer and later restored to create a semantically identical clone of the original object. They will further recognise that the method for creation of such serialized copies depends on the programming language employed and is an accepted technique of art. The precise method used for serialization of the annotation components is not material to the feasibility of the invention.

Although the serialized annotation set data may be opaque to the server, those skilled in the art will recognise 'serialized' data is data which may appear opaque but which may be parsed and its underlying data reconstituted. The 'annotation set' may be represented, for example, by an XML document which encapsulates the attributes and serialized object data for each annotation member. It would be perfectly possible to implement alternative embodiments in which the server does understand the structure of the annotation set data.

In the case of multiple annotations on a single page the described embodiment may elect to automatically save each annotation member on a page in turn as they are created. By this means, an incomplete set may be recovered and completed should the user's browser crash or network connection fail during a sequence of annotations.

The implementation gives the user the option of specifying tags to be associated with the annotation set. As is familiar to those skilled in the art, tags may be described as text used to categorize objects, in a free form manner i.e. there is not necessarily a pre-defined ontology. Those skilled in the art will further recognise that there are many means of associating information with the annotation to enable future searching and browsing of such annotations and that the chosen scheme is not material to the feasibility of the invention.

Annotation sets are saved to the server by storing the data for each annotation in the form of serialized opaque annotation object(s) plus any information required to reproduce the annotation set faithfully as manifested at the time of creation, plus information to control access to the set. Such information will therefore include, for example:
 unique annotation set ID
 annotation set name and/or title
 authenticated ID of logged-in user
 URL of underlying annotated document
 annotation ordering, layering and layout information
 permissions and sharing data
 annotation set description
 tags Such data is referred to as the 'annotation set attributes'.

It will be appreciated by those skilled in the art that the above described process for storing an annotation set represents an annotation storage means for storing annotations.

(e) Annotation Retrieve Restore

An important consequence of storing the full annotation data for all annotations is that annotations may be faithfully recreated. The content will be manifested as created, the spatial relationship to the target will be restored (determined by the spatial offset subject to spatial constraints and layout policies), the temporal relationship to the object timeline will be observed (determined by the temporal offset subject to temporal constraints) and the manifestation will behave in accordance with the MCD. This ability of the described embodiment to faithfully restore annotations in this manner is the property of semantic integrity.

Hence, for example, because visualized annotations have spatial and temporal offsets and event specifications even if, for whatever reason, targets move around on the screen, or vanish from and then reappear on the screen, a displayed annotation retains a defined spatial and temporal relationship to its target and will track the target moving on the screen, vanish with the target and reappear with it.

For the purpose of simplifying the description below, we assume that the annotation being restored has a single target. For annotations with multiple targets, the process is repeated for each target. The processes described below are presented for the purpose of illustrating the workflow for restoring a target. They do not represent the only possible mechanism nor are they complete. Those skilled in the art will recognise where additional logic is required in order to produce complete structure and content analyzers for support of generic target handling. Those skilled in the art will further recognise how to use the skeleton descriptions below to build more advanced analyzers using the architecture of the program described herein.

When enabled, the extension module accesses the browser API to request notification whenever a web page is loaded and the program manifests related annotation sets as requested and using a process as described above. Community generated information returned by the annotation server results from community accesses to and comments on the annotation set and includes, but is not limited to: free-form commentary on the annotation set; number of views of the annotation set; results of voting on the annotation set; messages from a community review process.

Browsing to a page in this way could come about due to simple browsing activity or the result of a search of annotations. In the latter case, the search results will comprise a collection of USIs (Unique Set Identifiers) which, when accessed by an enabled program, will result in the display of the web page and associated annotation set. The web page and associated annotation set will also be displayed if the user clicks on a hyperlink whose target is a USI. In this case, the core module first loads the web page and then manifests the annotation set.

In the case of browsing to a normal web page with saved annotation sets which the user has permission to access the server responds with a list of such annotations. Access is determined by user profile data stored on the server and the logged-in user's access may, for example, be restricted by:

annotation type—the user may not have the right to view all types permissions—the creator of the annotation may have set permissions that exclude the current user Data in the list returned from the server comprises:

number and type of annotation sets the user has permission to access name of authenticated user who created and saved the annotation set date and time annotation was saved or last updated tags providing information with respect to the nature of the annotation community related information If the number of accessible annotation sets is greater than zero the extension module uses its icon in the browser display area to indicate that the current web page has been annotated. Clicking on the icon gives access to a display of information about the annotation sets on the current page accessible to the user.

The core module may use one of a number of techniques for providing this information—for example, displaying a number representing the number of annotations, changing shape and/or color, animation in combination with an audible signal or any combination thereof. Furthermore, any associated community related information may be displayed immediately within the list or it may be hidden from view until requested by the user and it may be organised in a number of ways, e.g. by time of creation or according to the user's community groups. Those skilled in the art will recognise that such incorporation of community generated information into the annotation set is essential to the sharing of annotations and that the described mechanism is extensible to support of a wide variety of such community information.

This list may be ordered in a variety of ways e.g. most recent, friends first, favorite type. The user may browse the list of available annotations or search for annotations by tag. If the user selects an annotation for display, the extension module retrieves the serialized annotation set data from the server. The data is de-serialized to recreate the annotation components (content, triples, helper and semantic analyzer objects). The process for deserialization and recreation of the objects depends on the programming language used for implementation of the objects and those skilled in the art will recognise that there are several techniques for such de-serialization and recreation and that the precise technique used is not material to the feasibility of the invention.

Figure 11:
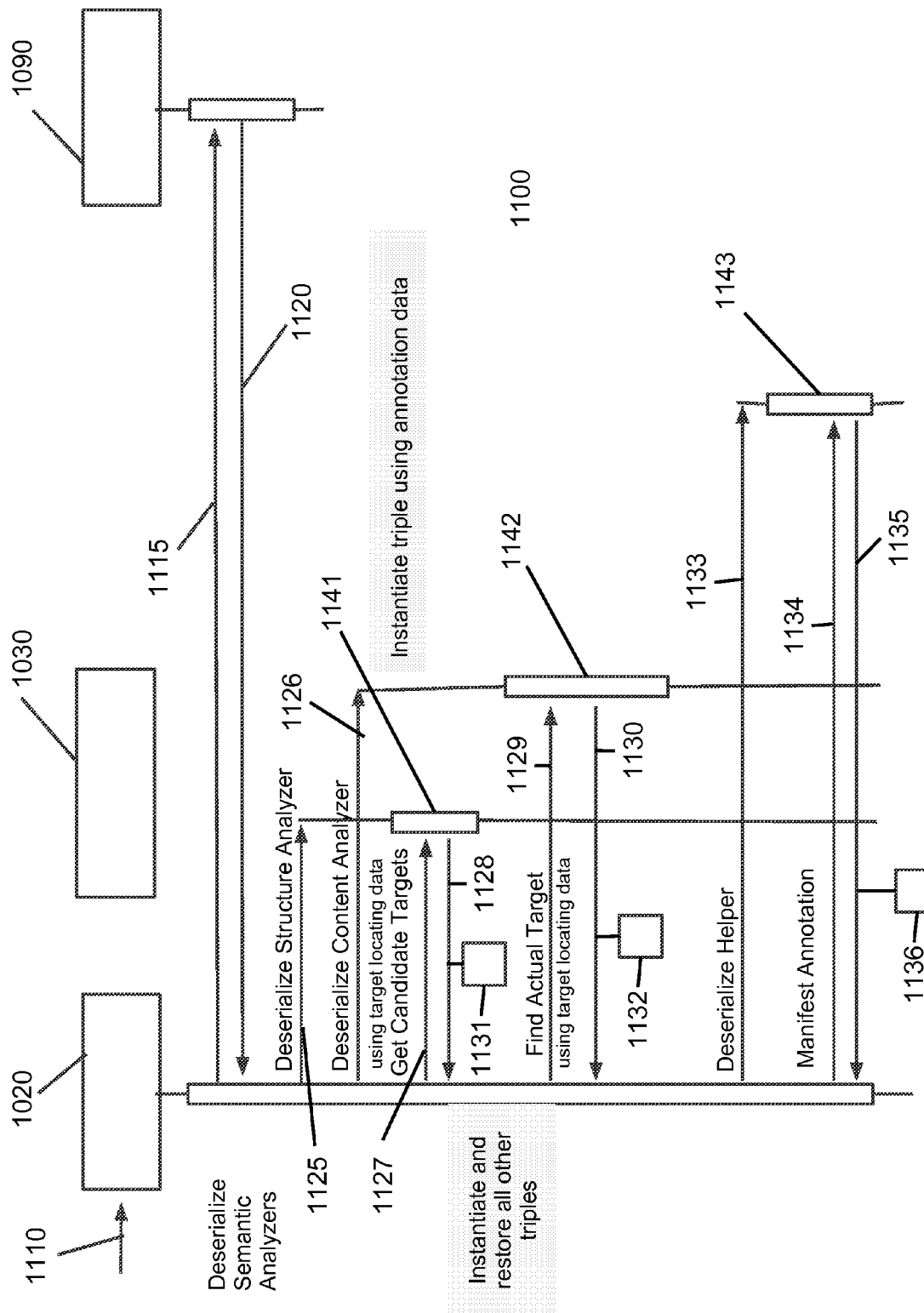
FIG. 11 is a high level overview of how an annotation set is restored according to one embodiment of the present invention.

FIG. 11 is a high level overview of how an annotation set is restored. It shows the data flow between the annotation server 1090, the core module 1020 and semantic analyzers 1030 for each annotation triple when a previously saved annotation is re-manifested.

The core module 1020 receives an annotation set restore request 1110 and transmits an annotation set retrieve request 1115 to the annotation server 1090. The annotation server 1090 uses the annotation set ID to retrieve the annotation set data and transmits the data back 1120 to the core module 1020. The next step is for the core module 1020 to initiate the deserialization and reinstantiation of serialized annotation components.

The core module 1020 sends requests 1125 and 1126 to the semantic analyser factory 1030 to restore the structure analysers 1141 and content analyser 1142. Request 1125 contains the deserialized structure analyser state and request 1126 contains the deserialized content analyser state. The core module 1020 then sends a request 1127 to the structure analyser 1141 to use its restored target locating data to identify target candidates in the web page document. The structure analyser responds 1128 with a set of candidate target document object references 1131. The core module 1020 then sends a request 1129 to the content analyser 1142, the request contains the set of candidate target document object references 1131 returned by the structure analyser 1141 in response 1128. The content analyser 1142 uses its restored target locating data to filter each of the candidate target document object references 1131 to identify the actual target. The content analyser 1142 responds 1130 by returning the document object reference 1132 of the identified target. If the content analyser 1142 fails to find a match within the set of candidate target document object references 1121 using its restored target locating data the document object reference 1132 is null. In this case, the core module 1020 degrades gracefully by notifying the user that the restored annotation could not be placed. In the case that the document object reference 1132 is not null the core module 1020 instantiates 1133 the annotation helper object using its deserialized state.

The core module 1020 then sends a request to the restored helper 1143 to retrieve the restored annotation. The restored helper 1143 responds 1135 with a data set 1136 containing the annotation content and constraints for annotation association. The core module 1020 then creates the annotation triple data and manifests the annotation content in association with the identified target.

By this means the annotation set members are manifested and the core module has access to the annotation set attribute data described above.

The restoration workflow deserializes and reconstitutes the structure and content analyzer objects for each annotation triple of each annotation set member and also deserializes and reconstitutes the annotation helper object. These objects are restored to the same state that existed when the object was serialized for saving the annotation. As each semantic object was responsible for ensuring that target locating data was saved to the object state, this data is also restored and is used to restore the target. These objects are used to find the target within the new instance of the web page, to re-calculate the target point and, hence, to use the association data to locate and manifest the restored annotation.

The process whereby the reconstituted semantic analyzers find candidates for the target and progressively filters these candidates to identify the target is described below. The restored target locating data contains information about the type of target and sufficient context information to enable a) the reconstituted structure analyzer to find a set of candidate targets on the new instance of the web page and b) the reconstituted content analyser to filter the set of candidate target objects to identity the actual target and thence to regenerate the target point. The candidate targets are page objects which match the target type, which may be: the web page itself; simple types such as text or image; a more complex type such as a video stream; or a system defined type such as a collection of page objects.

The first step in the annotation restore process is performed by the reconstituted structure analyzer which scans the web page employing the same algorithm as was used during annotation create, but this time looking for page objects which match the single type specified in the restored target locating data. For example, to find the correct text block on a page that may very well be composed of multiple objects. As the reconstituted structure analyser is effectively the same object that was used for annotation create, it 'understands' the target object type. The core module calls the structure analyzer which finds all possible candidate page objects matching the target object type and returns this set to the core module. This is done rather than attempting to find the exact page object, for example by position within the DOM tree, as the target page object in the current instance of the web page may have moved due to the addition or deletion of other page objects since the web page was annotated. If the structure analyser fails to find any candidate objects, the returned set will be empty and the core module stops the annotation restore process at this point. In this case the program will not be able to attach the annotation and must degrade gracefully. If the structure analyzer finds just one object of the correct type then this may be the object to which the annotation was attached but the structure analyzer does not perform any content analysis and so this one candidate target must be passed on to the content analyzer for confirmation. If there are multiple matches by type then these objects are all valid candidates and the structure analyzer returns the set of objects which must be filtered to find the correct candidate. By this means of selecting page objects by type the program determines any viable matches for the annotated object.

The second step in the annotation restore process, performed by the reconstituted content analyzer, is to filter the set of candidate target objects to identity the actual target. The core module calls the content analyser passing in the set of candidates found by the reconstituted structure analyzer. The content analyser scans each candidate in turn to find a match using the restored target locating data. The precise algorithm for implementation of this matching process will depend on the object type. If there is no match, the content analyzer returns a 'match fail' result to the core module which stops the annotation restore process at this point.

The third step in the annotation restore process is performed by the reconstituted helper which recreates the annotation content and annotation point using data from its restored state. The core module then manifests the annotation content at a location (spatial and/or temporal) determined using the target point, annotation point and restored association data.

It will be recognized by those skilled in the art that the annotation restore process described above may be used to match target locating data with data extracted from candidate objects of whatever type and that by this means targets may be identified whatever the media type and whether the target be the page, a page object, a collection of page objects, a region of a page object or a point on a page object. It will further be recognized that the process may result in cases in which either the target is not found or that multiple matches are found. If the page has changed so that the target is no longer on the page or that characteristics of the target have changed radically then it may be that the target cannot be found. It is also possible that the page may change so that there are multiple precise matches and the semantic analyser cannot determine which is the correct match. Multiple recovery policies are possible at this point in order that the program degrades gracefully. For example, the multiple options may be presented to the user or to the creator of the annotation.

Should the page content change during manifestation, annotations which were previously manifested may no longer be valid due to changes to, or removal of, the target object. Also, annotations which previously could not be manifested due to failure of the reconstituted structure or content analyzers to find a match may now be manifested due to appearance of the target object or content. In the event that the web page changes, the core module will re-invoke the restoration analysis process to test if the web page change resulted in the appearance (or disappearance) of a page object matching the target locating data type. The DOM provides several events for the purpose of notifying about DOM structure changes.

The form and content of the target locating data is specific to each type of analyzer and comprises sufficient data to allow the analyzer to find the original target. The amount of data that a content analyzer will need to store in order to be able to positively locate the original target will vary and the purpose of the decoupled architecture described in this embodiment is to allow refinement of the content analysis process without invalidating annotation tools already implemented and annotation sets already saved. This should not however be taken to imply that monolithic versions of the program could not be implemented that would be able to operate without invalidating existing tools and saved annotation sets. The detailed treatment of algorithms for analysing content and content matching is also outside the scope of this embodiment description, but several examples will be given to illustrate the process.

A simple example of the annotation restore process is to find a single word or phrase within the correct text block on a web page that may very well be composed of multiple text blocks. The target locating data will consist of the target word or phrase plus additional data from the annotated text block to provide context for the target. This context could be a number of preceding words and following words. The structure analyser simply locates all text objects on the manifested web page. When the content analyser scans each of the candidate target objects, it first eliminates those that do not contain the target word or phrase. Then it uses the context data (preceding and following words) to eliminate text blocks that do not contain the correct context. Any remaining candidate target objects are matches for the target locating data. If there is only one match, then this is the target for the annotation and the target point may be calculated. If there are multiple matches the restore process has failed and the program degrades gracefully.

In a second example, the target may be a location within an image. In this case, the target locating data will consist of data about the image in which the target is to be found. Such data could include a calculated digest of the whole image data plus the location of a single point relative to the origin (top left corner) of the image. 'Digest value' is a term familiar to those skilled in the art.

In a third example, the target may be a region within an image. In this case, the target locating data will consist of data about the image and about the image region in which the target is to be found. This type of image content analyzer would be used, for example, if the image content is expected to change slightly yet the region the annotation is attached to will remain the same. The region specific target locating data allows the target to be found through use of fuzzy image matching. Examples of such data could include the dimensions of a region (width and height). calculated digest of the region, calculated digest(s) of sampled subset(s) of the image (e.g. 10 pixel block samples at known positions).

Those skilled in the art will recognize that such target locating data may be collected and saved for the restore process for any type and that there are many variables for any type which may be so saved to later identify the correct candidate. They will further recognize that whilst it is impossible to create an algorithm which is one hundred percent foolproof it is possible to devise algorithms which are highly reliable. Furthermore, such algorithms may use such techniques as fuzzy logic to deal with borderline cases and improve performance. The architecture of the described embodiment enables the application of appropriate fuzzy matching logic to web pages and objects sourced from different websites and also enables fuzzy logic content analyzers to be deployed with no impact on annotation tools.

If the content analyzer cannot find a match the target cannot be restored. There are several possible reasons for a failure to match:

the original content no longer exists on the displayed web page or the content has changed materially the content is within an element not yet updated by JavaScript the content is not yet loaded In the first case, the annotation cannot be displayed and the user may be notified via an information dialog. This case is discussed further below and necessitates graceful degradation. In the latter two cases, the annotation may be displayed only when the content has been updated. As described above, the DOM supports several events for notification when content or attributes are changed. The core module tracks these events on page objects of interest to detect when the page objects have been modified—for example, when a JavaScript managed scrolling region has new content or when a new URL is loaded into an <img> element. The core module uses these events to determine if:

a displayed annotation should be removed if the content to which it was attached has now been removed an annotation which previously could not be displayed because of a content match fail may now be displayed a currently displayed annotation must be moved because of content change When such events are received, the core module invokes the semantic analyzer module again to search for the target.

By the above described means the invention will use the target locating data to accurately find targets and will be able to reconstruct the overwhelming majority of annotations in appropriate semantic relationship with the underlying page if the only change is to page layout. If the target is still there, the structure and content analyzers will find it and the helper will render the reconstituted annotation.

By this means too, the invention will also be able to accurately reconstruct a high percentage of cases of annotation even if the underlying content has been changed. Because algorithms may be devised to recognize page objects and targets within predetermined bounds of statistical accuracy as the page changes the program is tolerant of change across a great deal of the page. It will be evident to those skilled in the art that by this means the algorithms used to select data points for page object selection and recognition and target selection and recognition may be made extremely sophisticated and it will also be evident that the algorithm(s) selected are not material to the feasibility of the invention.

If the user has permission to edit any of the restored annotations, visual feedback is used to indicate which of the annotations may be modified. Should the user choose to modify an annotation, the editor is invoked to handle changes to the content and the core module supports changes to the annotation data in the same way as when the annotation was created. A modified annotation set may be re-saved to the server allowing all other users with permission to view the annotation set to access the updated annotations.

The described architecture enables the invention to annotate appropriately in ways never before even considered. For example, say a web page has a carousel of five images that cycles through the images and our user selects one of the images and annotates it then the program will only display the annotation when the appropriate image is displayed. The content analyzer recognizes that the other images are not a match (e.g. by comparing their digest value with the digest value stored when the target was defined) and signals the helper via the core module to only display the annotation when the correct page object (image) is being displayed.

If the page has changed so radically that the program cannot confidently find the target it must degrade gracefully. For example, if the text content analyzer cannot find the specific set of words to which the annotation was originally saved, it uses its stored signature data to attempt to find the closest phrase and, if that fails, it returns the location of the content object itself. If nothing can be found, the content analyzer returns a status to indicate that the annotation media cannot be placed. This may be because the web page has changed dramatically and the original content object has been removed entirely or changed to such an extent that it cannot be recognised or the object is too large for its allocated display area and so must be scrolled. If the page has changed so radically that no match can be found the program informs the user that one or more of the annotations cannot be recreated. This result is then saved on the server and can be communicated to the creator of the annotation who may elect to rework the annotation. By this means the program degrades gracefully.

It will be appreciated by those skilled in the art that the above described process represents an annotation manifestation means for manifesting restored annotations with semantic integrity on a second instance of the web page.

It will further be appreciated that whilst the above described process talks of 'the user' it is essentially the same for a group of users sharing the process of creating, editing, saving and restoring an annotation.

(f) Annotation Sharing

Once the annotation data is stored in a database on the server this data may be used to provide further functionality to users. The annotations may be queried in accordance with multiple criteria; for example, the user who created the annotation, the date of creation or the website annotated. Because the database may be searched by any registered user and annotations may be retrieved by that user (subject to access control) annotations may be shared by members of the community. This ability to support the sharing of annotations amongst community members means that annotations are social objects.

Those skilled in the art will recognize that there are many community websites organized around social objects. Examples of such websites include flickr (photos), youtube (videos) and facebook (status information). Such sites provide sophisticated facilities to browse and search such objects, communicate with other members of the community and view interesting site statistics and recommendations. The invention envisages such a community organized around annotations. Those skilled in the art will recognize that the technology for implementing such community functionality is relatively mature and there are no insuperable technical obstacles to developing such community support facilities.

The sharing of annotations may take place on a website via a website add-on or URL redirect, as is familiar to those skilled in the art. It may also take place by means of the functionality of the browser extension as described above.

(g) Developing New Annotation Tools and Annotation Tool Support

The process of creating a new tool to create and edit annotations depends upon whether the program already supports the types or structures required by the new tool. In the event that the types and structures are already supported the process is relatively straightforward. The developer creates the tool icon, media (if appropriate), editor and helper. This tool can access support from the program via the Core API and SA API. This support means that for the existing types and structures already supported by the program and required by the new tool, accessing this support and thereby accessing the ability to work with events and semantic integrity is already supported and hence this implementation burden is removed from the developer. It is anticipated that as a relatively small number of media types are used on a very large number of web pages many tools may be written which will have all required type and structure support.

In the event that unsupported types are required by the tool it is necessary to put such support in place by implementing additional structure and/or content analysers. This process is one of developing as many new analyzers as necessary. It will be recognized that having created such support for new types this support is now available for future tools, thereby further extending the support platform.

Once the new tool has been created and any required tool support is in place all that is required is to put in place the necessary tool configuration information and register the tool with the server. Such configuration information includes: name, icon, default target, default timing, default event handling, type selector, page source URL pattern, page object URL pattern, any information related to the sale of tools e.g. price. The server allocates a tool identifier and adds this to the configuration information when the tool is registered.

Those skilled in the art will appreciate that the above described means of creating and installing new tools is a well defined process with the following advantages: (a) it is easier for developers to create tools with semantic integrity (spatial and temporal) and event handling support, (b) new types and structures may be readily accommodated and accommodated in a way that extends the program to further ease future tool development.

(h) Annotation Programming

As discussed above, the behavior of an individual annotation may be programmed by means of the Annotation API. And as also noted above, the MCD includes the ability to respond to and emit events and control which annotation attributes are exposed for modification. Hence annotations can respond to and emit events to influence the behaviour of other annotations. Such dynamic behaviour may be implemented in the annotation helper and/or in the annotation manifestation data (for example as a Flash ActionScript). By this means an annotation may, for example, be displayed on the screen and then await user input, such as clicking on an area of the annotation display space. On receiving notification of this event the annotation may then trigger other action(s) by, for example, manifesting a different annotation content. If annotation behaviour is implemented in the manifestation data, the helper provides an interface to the annotation event mechanism.

Control scripts are specialised annotations that have no visual manifestation and consist only of programmable content which comprises blocks of actions associated with an event. Actions are executed in sequence and comprise one or more of (a) sending an event, (b) modifying annotation triple data. The triggering event data payload, comprising key/value pairs, is used to construct a new event or to update an annotation triple. It will be recognised by those skilled in the art that such action scripts can be expressed as either a text based or a visual programming language and choice of expression is not material to the implementation of the event/action mechanism. Alternative implementations of the control tool may be provided with different control script expressions.

Figure 12:
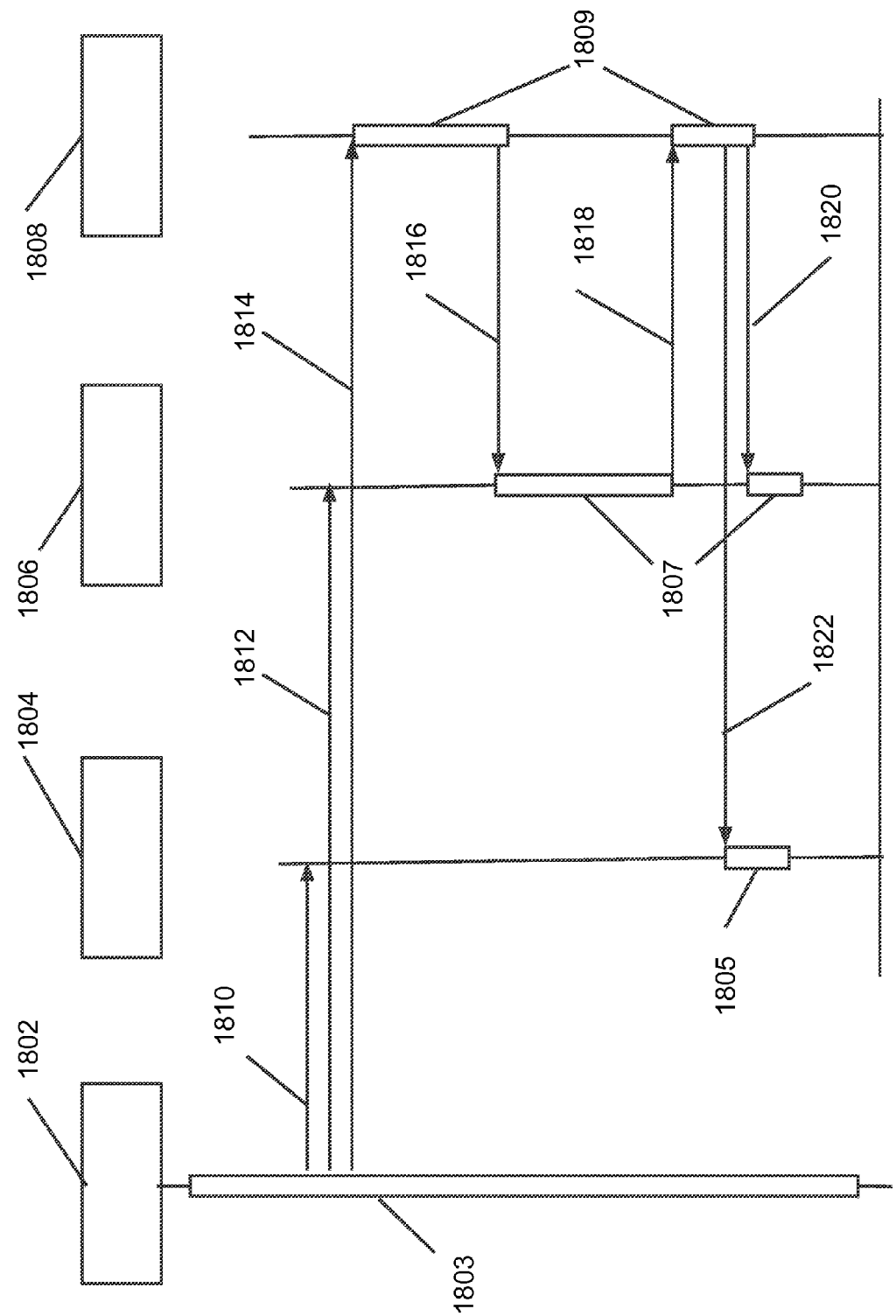
FIG. 12 is a diagram showing a simple example of how annotation programming and communication between cooperating annotations can be used to implement a dynamic manifestation according to one embodiment of the present invention.
Figure 18:
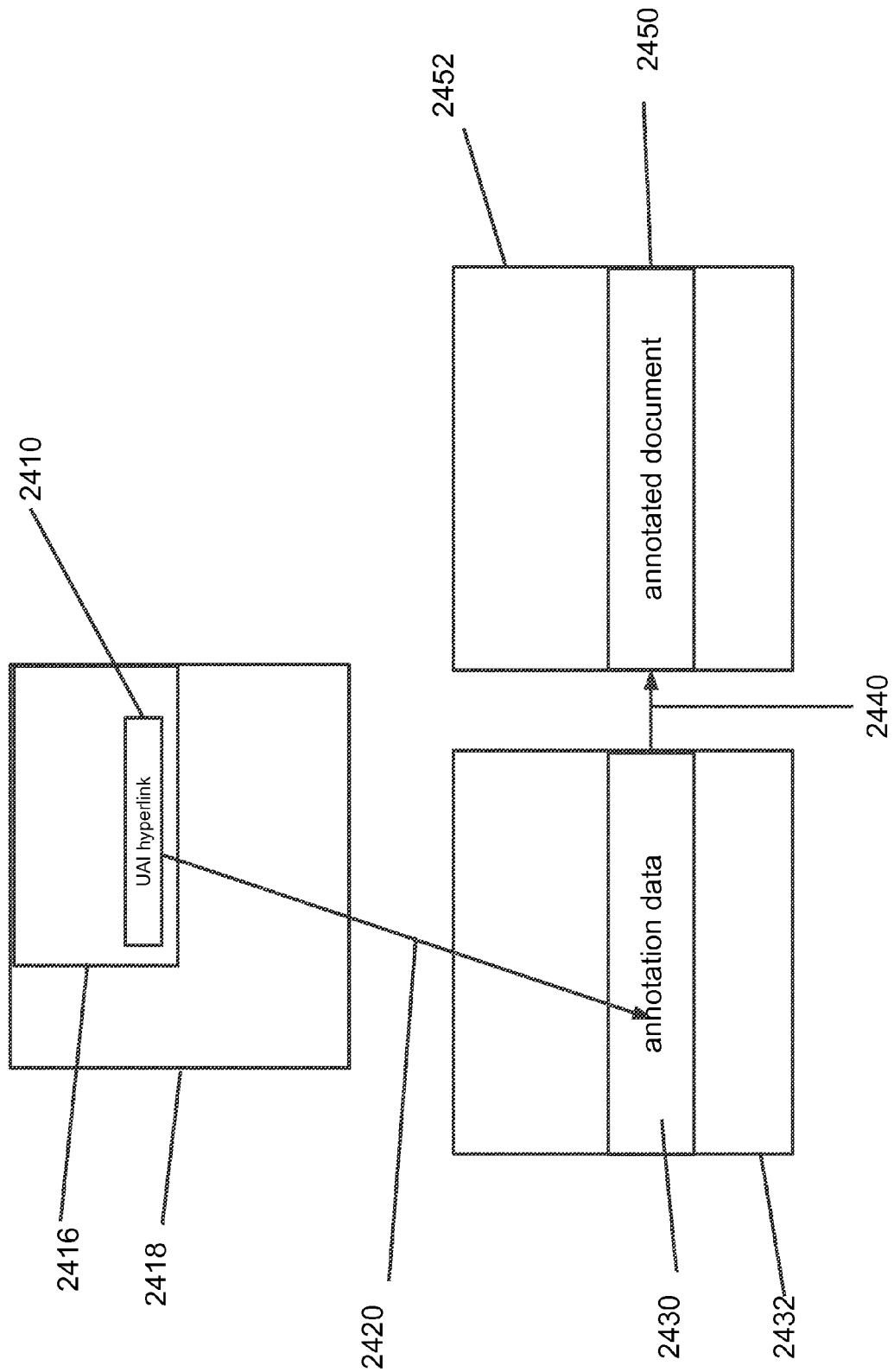
FIG. 18 is a depiction of the relationship between a UAI hyperlink, the annotation data, and the underlying document data according to one embodiment of the present invention.

FIG. 12 shows a simple example of how annotation programming and communication between cooperating annotations can be used to implement a dynamic manifestation coordinated by communication via the core module 1802. The annotation set comprises three annotations: 1804 whose content is a bitmap image which is attached to the center of an image on the web page, 1806 a flash movie which is attached to the whole web page and 1808 a control annotation. Execution of code within the core module is represented by 1803, execution of code within the helper for annotation 1804 is represented by 1805, execution of code within the flash ActionScript and helper for annotation 1806 is represented by 1807 and execution of code within helper for annotation 1808 is represented by 1809. Although FIG. 18 depicts execution control as being transferred directly between 1803, 1805 and 1809, the mechanism for this communication uses events which are dispatched via the Annotation API and routed via the core module. Annotation 1804 is initially not visible (its MCD specifies that the annotation's visibility attribute should be set to 'hidden'), the flash animation of annotation 1806 is configured to not auto-start and control annotation 1808 starts as soon as the annotation set is manifested. The animation of 1806 comprises a number of alternative elements all of which depict a stick character carrying a hammer; one element has the character walking from left to right and another element has the character walking from right to left. At the end of each sequence, the stick character stops walking and strikes the hammer onto a point near its feet. The flow of event information coordinating this simple sequence is as follows. The core module 1802 instantiates the annotation set with member annotations 1804, 1806 and 1808 and sends the start events 1810, 1812 and 1814 to these member annotations respectively. The control annotation 1808 has a control script that immediately uses the Core API to discover the web page window dimensions and the location of the currently non-visible bitmap image annotation 1804. The control annotation 1808 then uses this information to determine whether the currently non-visible bitmap image annotation 1804 is nearer to the left or right hand edge of the window. The control annotation 1808 then dispatches an event 1816 with payload comprising the window dimensions, the keyword 'left' or 'right' to identify the edge of the browser window furthest away from the currently non-visible bitmap image annotation 1804 and the X,Y coordinates of this annotation 1804. The currently halted flash animation annotation 1806 is listening for the event and, on receipt of the event, uses the payload data to resize its display 'canvas' and select the appropriate animation sequence to show the stick character walking from the edge of the screen toward the location of the currently invisible bitmap image annotation 1804. When the stick character reaches the location of annotation 1804, the flash animation annotation 1806 runs its hammer strike animation and dispatches another event 1818 to notify the control animation 1808 of the animation sequence termination. On receipt of the event, control animation 1808 dispatches two events: the first 1822 is sent to the currently non-visible bitmap image annotation 1804 and causes it to be made visible and the second 1820 is sent to the terminated flash animation animation 1806 and causes it to be made invisible. By this means, in this example, the core module 1802 invokes three cooperating annotations 1804, 1806 and 1808 to create the described effect.

Although events are shown as travelling directly between annotations, their physical path is always via the core module which is responsible for event distribution. The annotation MDC specifies which named events an annotation may generate and which events the annotation wishes to receive. The Annotation API defines an event handler registration method whereby all events (both core generated and originated by other annotations) may be received and processed within a single helper function.

By the above described means, the set of annotations on a particular page may co-operate to create a dynamic manifestation controlled by events. These annotation events may also be propagated via the network to annotations manifested on other user's computers. The annotation server provides services to authenticate and route such inter-annotation communication.

Annotation set data may also be accessed and modified, for example to: create or delete annotations; or to search for an annotation using a query on the annotation data (e.g. get the set of annotations created using a particular tool). Hence it will be appreciated by those skilled in the art that annotation sets are also programmable.

It will be understood by those skilled in the art that the provision of the API means that the "user" of the program may be human or a computer. A human user will interface with the program via the core module that enables interaction to undertake such tasks as to select an annotation tool, use it to create or modify an annotation, to fix the target, to save the annotation, to restore it and to edit it and resave it. A computer may also interface with the program, but will not require the same interaction modules required for a human user. It will undertake annotation tasks by accessing the API. For example, a human user can interact with the program by using a mouse to move a cursor to move an annotation around the screen and move crosshairs to identify the annotation target whereas a computer can access the API to select an annotation, edit its content and locate it and define its target. It can for example, define the target by expressing it in a Target Locating Data Specification Language. Statements in this language are interpreted by the semantic analyzer module to select an appropriate set of structure and content analyzers to explore the web page for a matching page object and, if required, specific page object content.

(i) Functional Independent of Program from Annotated Websites/Pages

As noted above, the document system and the annotation system are distinct systems. The document system can exist without the annotation system and would be entirely unchanged if there were no annotation system in place, which is to say that no components of the system would be changed and no aspects of the functionality of the system would be changed. Similarly the annotation system demands no changes of the document system for its operation; no components of the document system need by changed and no aspects of the functionality of the document system or of the documents it manages need be changed. The two systems neither share API's nor state by contract and as will be discussed below their only point of common contact is the DOM API.

As described earlier, FIG. 2 depicts a document system 100 and an annotation system 200 manifesting via the rendering engine of a common DOM implementation within a web browser 120. Those skilled in the art will recognise that these two systems are distinct and whilst they may be implemented in various ways with more or less complex combinations of servers and communications technology such differences do not change the basic functionality or distinct nature of these two systems.

This is an important point which warrants further elaboration: as described herein the means by which the web page is annotated is that the program accesses the DOM to analyse the content of the representation of the page to be annotated, makes use of the results of this analysis to interface with the user as he creates and edits annotations, and accesses the DOM to integrate the required representations of the user generated annotations with the web page representation resident in the DOM. The rendering engine then manifests the composite representation of the annotated page. The two systems which result in an annotated document (web page) share some resources as noted above (the client computer, the web browser, the communication channel) but their use of these resources is distinct and separate. They overlap only in their access to those objects accessible by the DOM. Those skilled in the art will therefore recognise that these systems are indeed functionally distinct and independent. This property of the program is hereinafter known as 'functional independence.' Those skilled in the art will appreciate that there can be no functional independence as defined herein if the document system and the annotation system share state of any kind by contract. In the described implementation the two systems share no such state and are truly functionally independent.

The program's functional independence extends to embedded objects in XML documents. Such objects are referenced in the DOM. The program recognises such references, analyses the object in question and such content as is served by such an object, and integrates any appropriate annotation XML fragments with the content in precisely the same way.

It will further be recognized by those skilled in the art that the above described implementation requires no modification of the document system. Specifically, it requires no changes to the website whose content is being annotated. It requires neither changes to the software supporting the website nor to the content of the website, nor does it require any special permissions from the site publisher. Finally, it will be noted that the system does not copy or store a copy of the content from the document system.

It will be recognized that, whilst the described implementation achieves annotation with functional independence there are alternative means of annotating documents with functional independence. It would, for example, be possible to edit documents in the document buffer of the browser or even to intercept and manipulate the representation of the rendered page. It will further be recognised that the described process of semantic analysis which results in the annotation triple with the locating data necessary to provide semantic integrity is consistent with such a different means of providing functional independence.

(j) Annotating Documents Other than Web Pages

The embodiment described above is for web page annotation. Those skilled in the art will however recognise that the components, mechanisms and workflows described above can equally well be applied to annotation in a proprietary application (one for which the interfaces and protocols to internal operations are not published and freely available to third party developers rendering the application a closed rather than open environment) that uses XML for document structure and in which the described components, mechanisms and workflows must be expressed in the programming language of the proprietary application and compiled into this closed application. An example of such a proprietary application is a word processor that uses XML to encode its document files. A good use of the annotation described above in this example would be to support multi-author document creation: annotations can be used to place comments on existing document content to make suggestions for changes or to mark revisions. A further example is one in which the application user interface is described using XML allowing the user interface presentation and/or semantics to be altered—a procedure known to those skilled in the art as 'skinning' The components, mechanisms and workflows described above can be applied to such an application allowing modification for accessibility or for integration into a larger system.

(k) URL Mapping

It will be recognized by those skilled in the art that a web page for a particular URL may display different content for independent or successive manifestations of the web page. Such content may be determined according to the ID of a logged-in user or may be determined by the execution of in-page JavaScript. The latter mechanism is often employed for performance reasons such that some websites redraw subsets of a page rather than the whole page to present what the user sees as a new page. An example of such a website is www.facebook.com that makes use of what it terms 'BigPipe' to redraw subsections of pages that it terms 'pagelets.' (BigPipe is described in a Facebook Engineering Notes: http://www.facebook.com/note.php?note_id=307069903919 and http://www.facebook.com/note.php?note_id=389414033919). This redrawn page may have a different URL, and hence appear to be a new page, and yet it is in fact the same page.

The net effect of these mechanisms is that the structure and/or content of the manifested web page is not directly related to the URL of the page. In the above description it has been explained how the system uses the page URL to recognise that a page has changed so that the system may remove annotations, inform users about annotations on the current page and add annotation as appropriate. In the case of sites where the URL may change and yet the underlying page does not, however, the URL is not a sufficient indicator that the content has changed and hence the relationship of the annotation to the underlying content must be reviewed.

In the case of such websites the system generates a unique page identifier which encapsulates the web page state. This identifier is derived from an inspection of page structure and/or content and the algorithm for its generation is dependent on the web site. Those skilled in the art will recognise that such identifier generation may be implemented using an additional category of component, the URL mapper, instances of which are selected by pattern matching on the web site URL and invoked whenever the system requires a web page identifier—i.e. whenever the system detects that page content has changed. Support for new web sites, for which there is a non-unique relationship between web page URL and web page state, is achieved by creating a URL mapper for the web site—in much the same manner as a web site specific structure analyser may be provided.

(l) Applications of Annotation Widgets

The invention enables a new class of web widgets. Such widgets are annotations of the kind described above that may be apparently incorporated into any web page(s), and located on any desired location on the page, offering the functionality of the widget to the user on the page in question.

In the example below we consider the case of the web widget known to those skilled in the art as the social plugin. Such social plugins are provided by the social networking site provider e.g. facebook, are installed into publishers' sites and communicate with the social networking site. By this means, a user of the social networking site may for example login to the social network from the publisher's site and interact with social data exchanged between the publisher's site and the user's computer but which originates in and is hosted by the social networking site.

Figure 13:
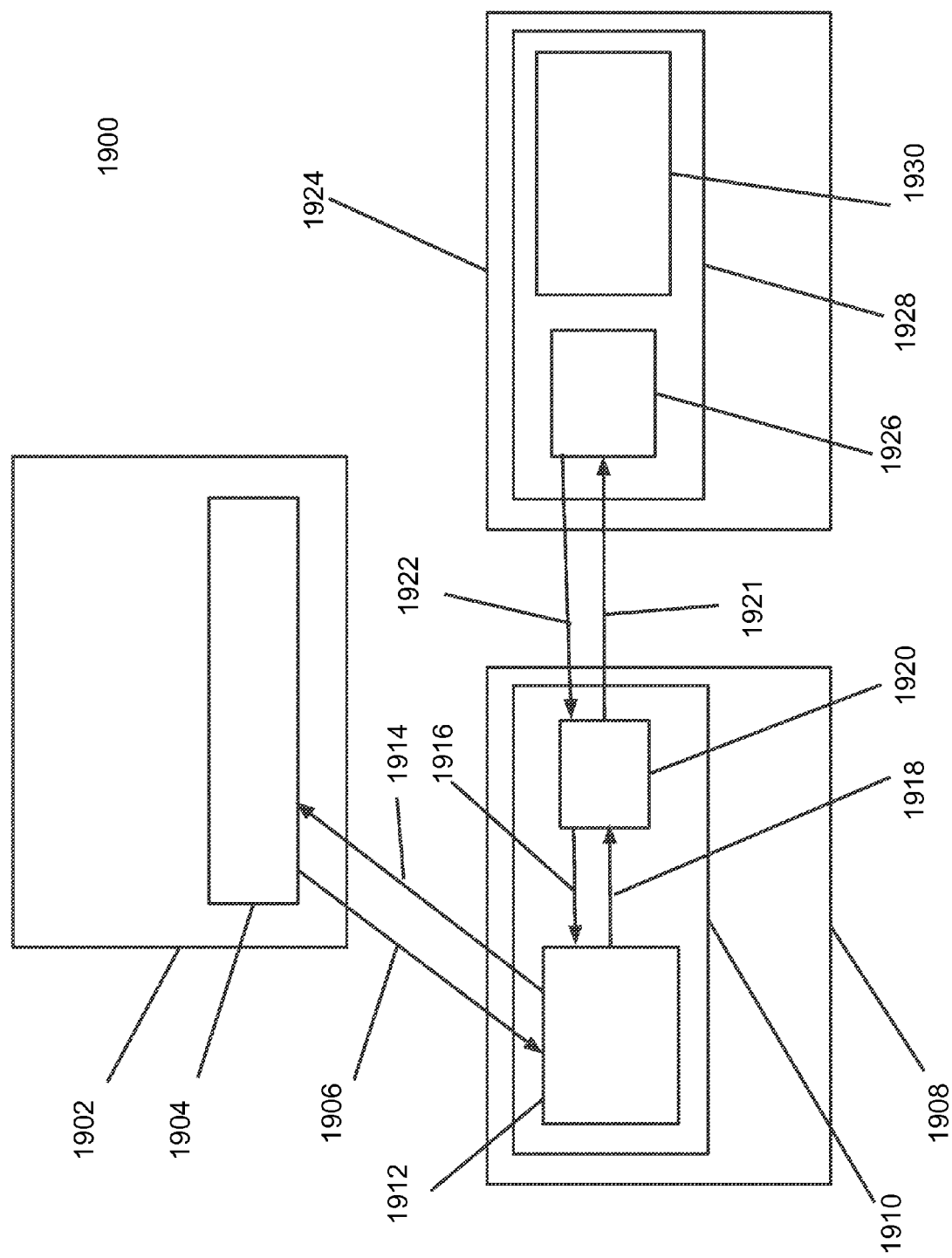
FIG. 13 is a high level diagram of the system architecture of contemporary social plugins that may be used in connection with one embodiment of the present invention.

FIG. 13 is a high level diagram of the system architecture implied by such social plugins. A description of the operation of this system 1900 follows. A user on a client computer 1902 interacts with a web browser 1904 installed on the client computer 1902. This web browser 1904 communicates with a web server 1910 on a website publisher server computer 1908. This communication takes place by means of requests 1906 and responses 1914. This web server has two components: component 1912 is the website software which generates the publisher's website and component 1920 is the social plugin. For many interactions with the website, the requests 1906 and responses 1914 may be satisfied entirely by the publisher's website software 1912. For requests which require interaction with social data stored on the social network computer 1924 further communication is required. If the website software 1912 detects that such social information is required that must be served by the social network computer 1924 then it communicates with the social plugin 1920 installed with the website software 1912 on the website publisher server computer 1908. It communicates with the social plugin 1920 by means of requests 1918 and responses 1916. The social plugin 1920, in turn, communicates with the social network computer 1924 by means of requests 1921 and responses 1922. When the social network computer 1924 receives a request (for social network data or an update to social network data) this request is communicated to the social networking server 1928 and that request is given access to that segment of the social network data 1926 which is available to social plugins. Not all social network data is accessible to social plugins in this way. 1930 represents social network data which is accessible directly by users interacting with the social networking site but which is not accessible by means of the social plugin 1920. Those skilled in the art will recognise that the proportion of such data that may be made available may vary. When the social network server 1928 has satisfied the request it communicates its response 1922 to the social plugin 1920 which in turn communicates the response to the website software 1912 which communicates its response 1914 to the user's web browser 1904 on the user computer 1902. By this means, the system 1900 is able to make social data 1926 stored on a social networking website available on a third party publisher's server 1908 and hence to a user interacting with the publisher's site. By means of such user interactions users may view and update social data whilst on third party website (sites other than that of the social network).

Figure 14:
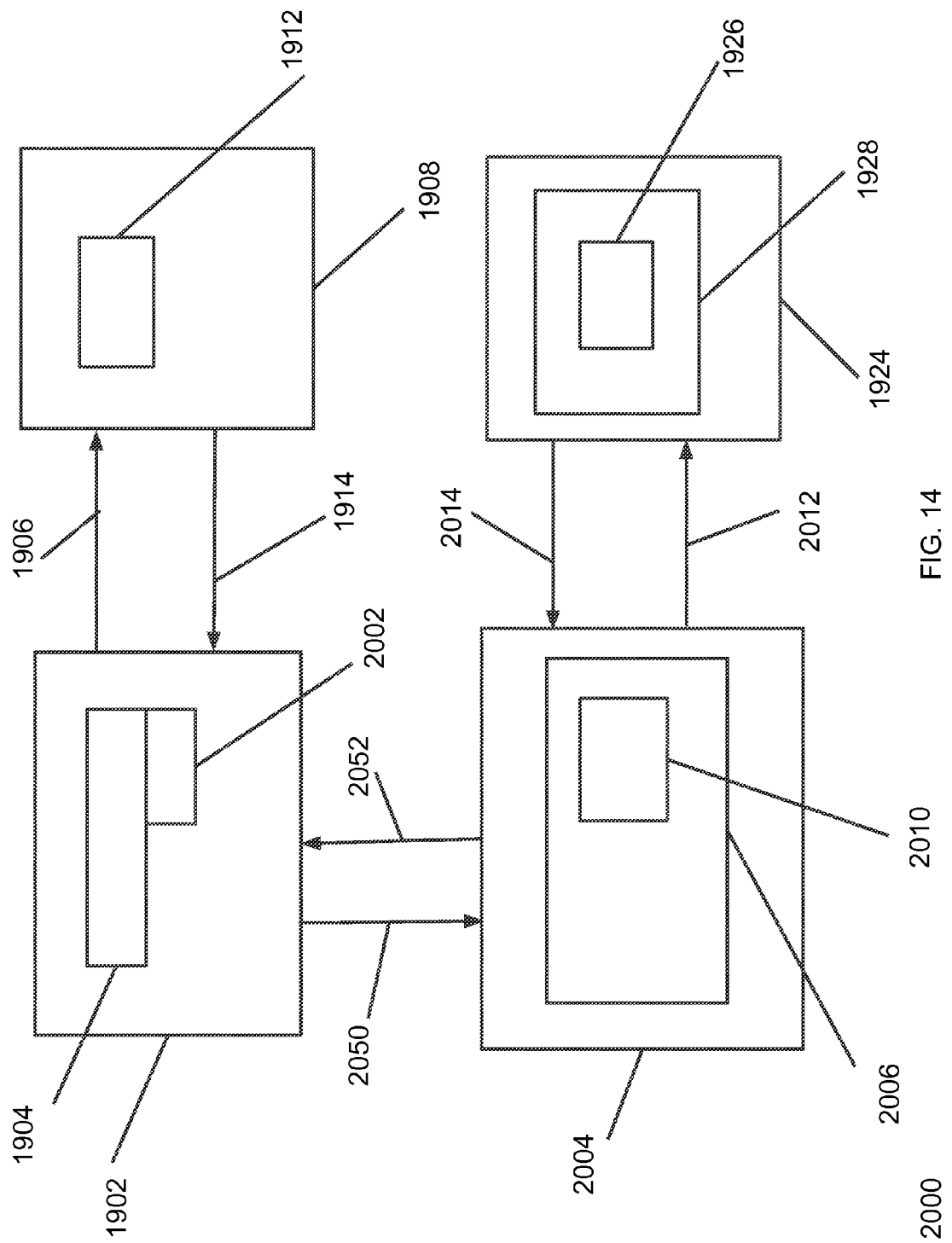
FIG. 14 is a high level diagram of a novel system architecture for the incorporation of social data into third party websites by means of novel annotations implemented according to embodiments of the present invention.

Contrast the above with the example system architecture 2000 illustrated in FIG. 14 which employs a social plugin implemented in the form of an annotation as described herein. A description of the operation of this system 2000 follows. A user on a client computer 1902 interacts with a web browser 1904 installed on the client computer 1902. In contrast to system 1900, in system 2000 the web browser has an additional component: the annotation system's browser extension 2002. The user's interaction with the web browser 1904 generates communication with a web server 1910 on a publisher's website server computer 1908. This communication takes place by means of requests 1906 and responses 1914. The website server computer 1908 hosts the website software 1912 which generates the publisher's website, but in contrast to system 1900 it does not include the social plugin 1920. Hence, in contrast to system 1900, the website computer 1908 is unable to directly communicate with the social network computer 1924 and thereby unable to directly access social data 1926. The publisher of website 1912 need have no knowledge of the existence of social network server 1928. For those interactions between the client computer 1902 and the website server computer 1908 that do not require such social data the requests 1906 and responses 1914 may be satisfied entirely by the publisher's website software 1912. Such communications cannot however access the social data 1926 because this data is not hosted on the website server computer 1908 and, as noted above, the website server computer 1908 cannot communicate directly with the social network computer 1924 to access this social data 1926. For user interactions which require interaction with social data stored on the social network computer 1924, as will be described below, such communication is routed through the annotation server 2004. User interaction with social data is managed via an annotation which is either created and placed by the user or is part of an annotation set that the user has selected for manifestation. Requests for social interaction are generated by the annotation and routed via the browser extension 2002 which detects that information is required that must be served by the social network computer 1924. The browser extension 2002 then communicates with the annotation server 2006 hosted on the annotation server computer 2004. Such communication takes the form of requests 2050 for social data and for notifications of updates to social data and of responses 2052 to such requests. Any such request 2050 is routed by the annotation server 2006 to the annotation server social media extension 2010, which communicates the request 2012 to the social network server 1928 on the social network site computer 1924. The social network server 1928 accesses the social data resource 1926 for update or retrieval. The social network server 1928 then sends a response 2014 to the annotation server social media extension 2010 on the annotation server 2006 and this response is forwarded as a response 2052 to the browser extension 2002 on the user computer 1902. The browser extension then uses the Annotation API to forward the result of social media interaction to the requesting annotation for manifestation on the user's computer 1902. By means of such user interactions, users may, as with system 1900, view and update social data whilst on third party website (sites other than that of the social network). As the figures make clear there is a striking difference between system 1900 in FIG. 13 and system 2000 in FIG. 14. In the latter case the plugin does not have to be installed on the publisher's website. Instead of every publisher that wishes to support such social interaction having to install a social plugin on every page on every website by means of social plugins, all that is required is the browser extension be installed on user computers, a social media extension installed on the annotation server and provision of social annotations. The annotation server thereafter can place the social content from the social media site 'on' any web page on any publisher's site. The term of art used to describe such active content 'placed' onto a publisher's website is a 'widget'. In the example of FIG. 13, such widgets are integrated into the website content. In the example of FIG. 14 such widgets are annotations. The user on his client computer who elects to see such widgets and who views a page on the publisher's site will then see the annotation widget and may interact with this novel form of social plugin. His interaction is routed though the annotation server to the social network site. As those skilled in the art will recognize, there are alternative architectures employing such annotation widgets, but all may obviate the need for direct integration of the social plugin into the publisher's website.

The use of this novel annotation widget requires no editing of the web page code and does not even require the permission of the publisher. It will be recognized by those skilled in the art that social plugins are one example of a whole class of widgets or other rich media objects that may be apparently incorporated onto web pages.

A further such example of a novel application of annotation widgets is in advertising. As noted above, annotation widgets as described herein may be placed anywhere on any web page without requiring any cooperation from the page publisher. Hence it is possible to place advertisements on any web page. Furthermore, because such advertisements may employ any of the capabilities of the annotations described herein they may have novel properties. For example, advertisements may include branded content which may be copied from the ad and used as content for annotations, thereby virally spreading advertising content.

In a further such example, annotation widgets may be used to implement games which could be available at all times on all web pages. The game context and play behavior may include content from the annotated web page accessed via the SA API. Through use of USI and inter-annotation communication via the Annotation API, the game play may encompass many web pages. Because annotations may be shared such games could be multi-user. And because they can incorporate social content, as described above, they can be social games.

(m) Divisions of Labor

As noted above, as is obvious to one skilled in the art, the program may be implemented with different divisions of labor between the browser, the browser extension and the server.

It is helpful to separate the annotation process into creation and consumption phases: creation is the set of tasks whereby annotation tools and semantic analysers are used to create the annotation; consumption is the process of the user experiencing the manifestation of the annotated document. Creation may involve user interaction or it may be performed solely under the direction of an application using the Annotation API. In the former case, a browser client component is required to support interaction with the user. In the latter case, a client component is not mandatory as all of the functionality to support the Annotation API may be implemented on a server. A client component is however essential for the consumption phase.

We may distinguish between those instances wherein a human user interacts, with the annotation(s) and those cases where the user does not interact and simply passively experiences the manifestation of a previously created annotation.

i. User Interacts with Annotation.

In this case there must be a program component on the client to support such interactions. Hence the functionality of the client side of the program must support programmable annotation content, for example written in the JavaScript language. Such programmable content will receive user input and perform one or more of: modify annotation content media; interact with other annotations via the Annotation API. As those skilled in the art will recognise, a possible implementation topology would be to support all annotation rendering on the server, including execution of such programmable annotation content. In this case a minimal client layer would nonetheless be required to forward all user input to the server.

ii. User Passively Experiences Annotation Manifestation.

In this case the client is simply being used as an output device to manifest annotations composed on the server. Hence the functionality of the client side of the program need only support rendering of the annotation media.

If we now consider how possible divisions of labor between the client and server sides of the program we can discuss two boundary cases:

i. Maximal Implementation in Client

In this case the program functionality in the client supports user interaction for the creation and modification of annotations and annotation sets. It further supports, in a manner which is functionally independent of the document system components such as the document server, all functionality required for semantic analysis and semantic integrity and the interaction with such annotations not just by means of the client program but by other programs by means of the Annotation API.

The server functionality in this case enables storing, searching and browsing such annotations and thereby the presentation of annotations as a social object to a community who share annotations.

ii. Maximal Implementation in Server

If the user is only passively consuming annotations then the program in the client supports only the functionality to manifest annotations composed on the server. If the user needs to interact with annotations then the program in the client must further provide a proxy for input and functionality executing on the server.

The server would in this case include all functionality required for semantic analysis and semantic integrity and the interaction with such annotations not just by means of the (minimal) client program but by other programs by means of the Annotation API. It would support the ability to create a composite annotated document from the document being annotated and the annotation data and the ability to transmit this composite to the client for display. It would further support the storing, searching and browsing of such annotations and thereby the presentation of annotations as a social object to a community who can share annotations.

It will be understood by those skilled in the art that the above described boundary cases represent extremes and that there are many possible divisions of labor, between the client and server sides, of the above described program functionality. It will further be recognised by those skilled in the art that any such redistribution of labor is simply another implementation of the program. At any given time the distribution of functionality of the implementation may vary, depending upon technical factors such as the software and hardware available on client computers, the bandwidth of prevalent computer networks, and the power and economics of server computers.

(n) Alternative Document Encoding Schemes

Whilst XML is the dominant mechanism for encoding documents and document fragments, at the time of writing there are alternatives, for example JSON. There are currently document systems wherein the document server responds to requests by sending JSON encoded data to the client where they are processed by JavaScript to transform the JSON into a form which may be entered into the DOM by means of the DOM API.

Those skilled in the art will however recognise that whilst much of the above description refers to XML formatted documents the described implementation is in fact agnostic with respect to encoding schemes. Any document, whatever encoding scheme is employed, must at some point be represented in the DOM and it is only at this point that the program functionally intervenes to annotate the document. The program functions not by operating on the encoded document but by manipulating DOM data structures (for example by inserting DOM fragments representing annotations) to create a composite of the original document and the annotation which is rendered and displayed. Hence whilst the implementation described above has talked of XML documents the format of the document prior to the DOM is irrelevant to the program.

(o) Browser Tabs and the Browser as Target

Whilst the above implementation has described how the page and parts of or points on the page may be the target of annotations there are two other targets:

1. a browser tab session
2. the browser session

An annotation attached to either of the above targets will be persistent across all manifested web pages and will terminate only when:

1. deleted by user interaction by interaction with the control menu
2. deleted programmatically by means of the Annotation API
3. the user closes the browser tab to which the annotation is attached
4. the user terminates the browser session to which the annotation is attached Those skilled in the art will recognise that the above targets may readily be implemented by extension of the mechanisms described above.

(p) Alternative Implementation of Annotation Linking

It will be recalled that in the above described implementation the server allocates a unique identifier to the stored annotation set: the Unique Set Identifier (hereinafter 'USI'). This unique resource identifier enables:

the annotation set creator to later access, download and update the set or to delete it if required
    annotation set sharing
    annotation set linking It will be understood by those skilled in the art that this above implementation implements linking at the level of the annotation set. In this implementation it is annotation sets, rather than individual annotations, that are linked to the underlying content. There are however other implementations which link individual annotations rather than annotation sets to the underlying content. Directly linking annotations rather than annotation sets can also implement a linked annotation space 'on top of' the world wide web. Hence, as in the above described implementation, users may navigate from annotated web page to annotated web page by clicking on displayed annotation link objects. This implementation is perfectly viable and is described below.

In this implementation the server allocates a unique identifier to each stored annotation: the Unique Annotation Identifier (hereinafter 'UAI'). This unique resource identifier enables:

the annotation creator to later access, download and update the annotation or to delete it if required
    annotation sharing
    annotation linking In this case the annotation link object is a web page <anchor> element with a UAI as its 'href' attribute value). If, for example, a user is on the page www.zzz999.com/456 and actions a UAI link on this page then the user's browser will change the displayed page from www.zzz999.com/456 and will instead display the web page and associated annotation referenced by the UAI. This linked-to new page could be any properly addressed web page e.g. www.zzz999X.com/678.

FIG. 18 is a high level representation of the relationships between a UAI anchor 2410, the annotation data 2430 of the individual annotation it refers to and the document 2450 annotated by that annotation described by annotation data 2430. As the UAI is a resource identifier string, just like a URL or URI, it may be used as the target of a hyperlink (HTML element <a>). Thus, UAI anchor 2410 is an HTML <a> element embedded within web page object 2416 on web page 2418. The UAI hyperlink destination is a reference 2420 to annotation data 2430 in an annotation store 2432. The annotation data 2430 includes a reference 2440 to the annotated document 2450 held in document store 2452.

Traversal of an 'annotation link' is actioned by an annotation helper either as the result of user interaction with the annotation content or on receipt of an annotation event. The core module uses the UAI to refresh the browser display with the referenced web page and immediately displays the annotations from the annotation set.

Annotation links use the same universal resource name format as web pages but with a unique scheme name to identify the protocol for retrieving web pages and associated annotations. The 'Annotation Access Protocol' or 'AAP': for example the UAI string would be of the form: aap://annotation_id. The core module installs a handler for the 'aap' scheme so that any reference to a UAI is handled by the program. It will be recognised by those skilled in the art that a different scheme name may be used without compromising the architecture and that the scheme name must be registered with IANA (the Internet Assigned Numbers Authority).

Those skilled in the art will recognize that in the case of the above described alternative implementation, annotations may be linked to document elements which may themselves be incorporated by reference.

Although it is possible to see a single annotation as a case of the annotation set wherein there is only one member this is not strictly accurate. The annotation set with only one member still incorporates annotation set data which would not be necessary in the case of the described alternative implementation for linking individual annotations.

The USI and the UAI are both means of referencing information about annotations. In the case of the USI, a set of annotations. In the case of the UAI, an individual annotation. The USI and the UAI may be considered cases of the more general notion of a Unique Annotation Link Identifier (hereinafter 'UALI').

(q) Other Embodiments

A further alternative implementation exploits the linking of annotations to page elements. Annotations which are associated with page elements containing content associated with a URL other than the page URL are implicitly linked to that content via the Target Locating Data. By making this link explicit and storing as an accessible part of the Annotation Data, it is possible to query for individual annotations using the URL.

When a new web page is loaded into the browser, the core module uses a structure analyser to collect all URLs embedded within page elements. This list is used to query the annotation server for annotation sets and individual annotations linked to the displayed web page and its content. The user is presented with the results of the query and they can choose to manifest an annotation set and/or combinations of individual annotations.

The described program is capable of many further variations in detailed implementation that can be derived from the description contained herein by a person skilled in the art. All such variations and modifications are considered to be within the scope and spirit of the present invention as defined by the following claims.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Embodiments of the present invention have a variety of advantages. For example, embodiments of the present invention address the semantics of annotation. More specifically, embodiments of the present invention introduce a well defined process of semantic analysis to analyse the web page being annotated by a user, determine the location on the page that the user is attaching the annotation content to, and generate data sufficient to find this location in later instances of the page (despite changes in page layout and content). This ability of semantic analysis to find the location that the user placed the annotation is the key to associated property of semantic integrity which ensures that wherever possible annotated web pages will appear with the user's annotations in the correct location (in time and space) as intended by the annotating user so that the meaning of the user's annotation is preserved. This provision of semantic integrity, independent of annotation type, dealing with spatial and temporal integrity, is extensible to new media types and styles of annotation. As changes to a web page become more profound the program degrades gracefully and in the event the original page changes out of recognition the program informs the user that it cannot meaningfully render the previously annotated page. This extensible process of semantic analysis to analyze non-text page content and the associated provision of general semantic integrity is novel to the invention.

Another advantage of embodiments of the present invention is that they provide support for new media types and tools. Whereas annotation tools in existing systems have very limited functionality, embodiments of the present invention support tools that can access and annotate all elements and media types of any web page with semantic integrity. The framework supports tools for example to add animation, edit audio, change images, spray paint over the page, change links and applets; copy elements from the underlying web page or elsewhere and reuse such elements at will; and annotate any page element (or region of any such page element) include elements of the page that have no visual/spatial correlate such as music that plays when the page is displayed. As it is impossible to anticipate all media types that may become web page content, and as one may reasonably anticipate that annotation requirements will continue to evolve, embodiments of the present invention provide an extensible media model and a Tools API so that the inventor or third parties may design, build and plug in new tools to address the requirements of new needs or media types as they emerge.

Another advantage of embodiments of the present invention is that they enable annotations with radical new properties that redefine what is possible of annotations.

Yet another advantage of embodiments of the present invention is that they enable temporal annotations. Such annotations include, for example, annotations with semantic integrity that appear and disappear at the right time(s) as intended by the user.

Yet another advantage of embodiments of the present invention is that they treat annotations as programmable objects all properties of which may be addressed and edited by means of an API. The provision of an annotation API eases the task of developers, who can build sophisticated annotation applications with semantic integrity on top of the platform. Such developers do not need to know how semantic integrity is provided as the implementation is hidden behind the API interface.

Yet another advantage of embodiments of the present invention is that they enable annotations to be linked to and from along with their associated underlying web pages.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use with an annotation system:
　wherein the annotation system includes first data for annotating a manifestation of a first instance of a first XML document;
　wherein the first data comprises:
　　a first XML document identifier for the first XML document; and
　　first annotation data representing a first association between:
　　　(a) a first manifestation of first annotation content in connection with the manifestation of the first instance of the first XML document and
　　　(b) a manifestation of a first instance of a first target in the manifestation of the first instance of a first XML document;
　　wherein at least one of the first annotation content and the first target is not text;

wherein the first data is uniquely identified by a first Unique Annotation Link Identifier (UALI);
wherein the first instance of the first XML document is served by a document system;
wherein the annotation system is functionally independent of the document system, wherein the annotation system and the document system share no state by contract;
wherein the document system is configured to respond to a request containing the first XML document identifier with a manifestation of a second instance of the first XML document;
the method comprising:
(A) receiving a first request containing the first UALI;
(B) in response to the first request containing the first UALI, issuing a second request to the document system, wherein the second request contains the first XML document identifier; and
(C) in response to the first request containing the first UALI, manifesting the first annotation data in connection with the manifestation of the second instance of the first XML document.

2. The method of claim 1:
wherein the first UALI comprises a first Unique Annotation Identifier (UAI) that uniquely identifies the first annotation data;
wherein (A) comprises receiving a request containing the first UAI; and
wherein (C) comprises, in response to the request containing the first UAI, manifesting the first annotation data in connection with a manifestation of the second instance of the first XML document.

3. The method of claim 2, wherein the first annotation data comprises first annotation content data representing the first annotation content, first target locating data for locating the second instance of the first target, and first association data representing the first association.

4. The method of claim 1,
wherein the first data comprises first annotation set data representing a first annotation set;
wherein the first UALI comprises a first Unique Set Identifier (USI) that uniquely identifies the first annotation set;
wherein (A) comprises receiving a request containing the first USI; and
wherein (C) comprises, in response to the request containing the first USI, manifesting the first annotation set data in connection with a manifestation of the second instance of the first XML document.

5. The method of claim 4,
wherein the first annotation set further contains second annotation data for annotating the first instance of the first XML document; and
wherein (C) further comprises, in response to the request containing the first USI, manifesting the second annotation data in connection with the manifestation of the second instance of the first XML document.

6. The method of claim 1, wherein (A) comprises:
(A)(1) at a client device:
(A)(1)(a) receiving input containing the first UALI;
(A) (1)(b) retrieving the first data from storage;
(A)(1)(c) requesting the second instance of the first XML document from the document server; and
(A)(1)(d) manifesting the first data in connection with the manifestation of the second instance of the first XML document.

7. The method of claim 1, wherein (A) comprises:
(A)(1) at a client device:
(A)(1)(a) receiving input containing the first UALI;
(A)(1)(b) transmitting a request containing the first UALI to an annotation server;
(A)(2) at the annotation server:
(A)(2)(a) requesting the second instance of the first XML document from the document server;
(A)(2)(b) creating a composite of the first data and the second instance of the first XML document;
(A)(2)(c) transmitting the composite to the client device; and
(A) (3) at the client device:
(A)(3)(a) manifesting the composite.

8. The method of claim 1, wherein (A) comprises:
(A)(1) at a client device:
(A)(1)(a) receiving input containing the first UALI;
(A)(1)(b) transmitting a request containing the first UALI to an annotation server;
(A)(1)(c) requesting the second instance of the first XML document from the document server;
(A)(1)(d) transmitting the first data and the second instance of the first XML document to the annotation server;
(A)(2) at the annotation server:
(A)(2)(a) creating a composite of the first data and the first XML document;
(A)(2)(b) transmitting the composite to the client device; and
(A)(3) at the client device:
(A)(3)(a) manifesting the composite.

9. The method of claim 1, wherein the first annotation content is not text.

10. The method of claim 1, wherein the first target is not text.

11. A computer system comprising at least one computer-readable medium tangibly storing computer program instructions, wherein the computer program instructions are executable by at least one computer processor to perform a computer-implemented method for use with an annotation system:
wherein the annotation system includes first data for annotating a manifestation of a first instance of a first XML document;
wherein the first data comprises:
a first XML document identifier for the first XML document; and
first annotation data representing a first association between:
(a) a first manifestation of first annotation content in connection with the manifestation of the first instance of the first XML document and
(b) a manifestation of a first instance of a first target in the manifestation of the first instance of a first XML document;
wherein at least one of the first annotation content and the first target is not text;
wherein the first data is uniquely identified by a first Unique Annotation Link Identifier (UALI);
wherein the first instance of the first XML document is served by a document system;
wherein the annotation system is functionally independent of the document system, wherein the annotation system and the document system share no state by contract;

wherein the document system is configured to respond to a request containing the first XML document identifier with a manifestation of a second instance of the first XML document;
the method comprising:
(A) receiving a first request containing the first UALI;
(B) in response to the first request containing the first UALI, issuing a second request to the document system, wherein the second request contains the first XML document identifier; and
(C) in response to the first request containing the first UALI, manifesting the first annotation data in connection with the manifestation of the second instance of the first XML document.

12. The computer system of claim 11:
wherein the first UALI comprises a first Unique Annotation Identifier (UAI) that uniquely identifies the first annotation data;
wherein (A) comprises receiving a request containing the first UAI; and
wherein (C) comprises, in response to the request containing the first UAI, manifesting the first annotation data in connection with a manifestation of the second instance of the first XML document.

13. The computer system of claim 12, wherein the first annotation data comprises first annotation content data representing the first annotation content, first target locating data for locating the second instance of the first target, and first association data representing the first association.

14. The computer system of claim 11,
wherein the first data comprises first annotation set data representing a first annotation set;
wherein the first UALI comprises a first Unique Set Identifier (USI) that uniquely identifies the first annotation set;
wherein (A) comprises receiving a request containing the first USI; and
wherein (C) comprises, in response to the request containing the first USI, manifesting the first annotation set data in connection with a manifestation of the second instance of the first XML document.

15. The computer system of claim 14,
wherein the first annotation set further contains second annotation data for annotating the first instance of the first XML document; and
wherein (C) further comprises, in response to the request containing the first USI, manifesting the second annotation data in connection with the manifestation of the second instance of the first XML document.

16. The computer system of claim 11, wherein (A) comprises:
(A)(1) at a client device:
(A)(1)(a) receiving input containing the first UALI;
(A)(1)(b) retrieving the first data from storage;
(A)(1)(c) requesting the second instance of the first XML document from the document server; and
(A)(1)(d) manifesting the first data in connection with the manifestation of the second instance of the first XML document.

17. The computer system of claim 11, wherein (A) comprises:
(A)(1) at a client device:
(A)(1)(a) receiving input containing the first UALI;
(A)(1)(b) transmitting a request containing the first UALI to an annotation server;
(A)(2) at the annotation server:
(A)(2)(a) requesting the second instance of the first XML document from the document server;
(A)(2)(b) creating a composite of the first data and the second instance of the first XML document;
(A)(2)(c) transmitting the composite to the client device; and
(A) (3) at the client device:
(A)(3)(a) manifesting the composite.

18. The computer system of claim 11, wherein (A) comprises:
(A)(1) at a client device:
(A)(1)(a) receiving input containing the first UALI;
(A)(1)(b) transmitting a request containing the first UALI to an annotation server;
(A)(1)(c) requesting the second instance of the first XML document from the document server;
(A)(1)(d) transmitting the first data and the second instance of the first XML document to the annotation server;
(A)(2) at the annotation server:
(A)(2)(a) creating a composite of the first data and the first XML document;
(A)(2)(b) transmitting the composite to the client device; and
(A)(3) at the client device:
(A)(3)(a) manifesting the composite.

19. The computer system of claim 11, wherein the first annotation content is not text.

20. The computer system of claim 11, wherein the first target is not text.

* * * * *

UNITED STATES PATENT AND TRADEMARK OFFICE
CERTIFICATE OF CORRECTION

| | | |
|---|---|---|
| PATENT NO. | : 8,539,336 B2 | |
| APPLICATION NO. | : 13/252512 | |
| DATED | : September 17, 2013 | |
| INVENTOR(S) | : Peter Griffiths et al. | |

It is certified that error appears in the above-identified patent and that said Letters Patent is hereby corrected as shown below:

On Title page 2, in column 2, item (56), under "Other Publications", line 4, Delete "On-line" and insert -- Online --, therefor.

In the Specification

In column 8, line 14, Delete "a" and insert -- as --, therefor.

In column 9, line 52, Delete "interne," and insert -- internet, --, therefor.

In column 11, line 33, Delete "and or" and insert -- and/or --, therefor.

In column 13, line 41, After "modification" insert -- . --.

In column 14, line 9, After ">" insert -- . --.

In column 14, line 14, Delete "programatically" and insert -- programmatically --, therefor.

In column 15, line 57, After "actioned" insert -- . --.

In column 19, line 26, Delete "may" and insert -- may be --, therefor.

In column 22, line 7, Delete "programatically" and insert -- programmatically --, therefor.

In column 25, line 6, After "candidates" insert -- . --.

In column 26, line 62, After ")" insert -- . --.

In column 28, line 53, After ")" insert -- . --.

In column 30, line 9, After "linking" insert -- . --.

In column 31, line 53, Delete "many" and insert -- may --, therefor.

In column 32, line 42, Delete "interne" and insert -- internet --, therefor.

In column 35, line 57, After "resized" insert -- . --.

In column 36, line 44, After "analyzer" insert -- . --.

In column 37, line 33, Delete "must" and insert -- must be --, therefor.

In column 43, line 61, After "information" insert -- . --.

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,539,336 B2

In column 47, line 58, After "loaded" insert -- . --.

In column 48, line 9, After "change" insert -- . --.

In column 51, line 41, Delete "animation animation" and insert -- animation --, therefor.

In column 57, line 28, Delete "phase," and insert -- phase. --, therefor.

In column 59, line 2, After "session" insert -- . --.

In column 59, line 13, After "attached" insert -- . --.

In column 59, line 28, After "linking" insert -- . --.

In column 59, line 49, After "linking" insert -- . --.